(12) United States Patent
Kageyama et al.

(10) Patent No.: US 9,669,869 B2
(45) Date of Patent: *Jun. 6, 2017

(54) MOTOR VEHICLE AND STEER CONTROL METHOD FOR STEERABLE WHEEL

(75) Inventors: Yusuke Kageyama, Isehara (JP); Yutaka Mikuriya, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/005,130

(22) PCT Filed: Mar. 1, 2012

(86) PCT No.: PCT/JP2012/001404
§ 371 (c)(1),
(2), (4) Date: Sep. 13, 2013

(87) PCT Pub. No.: WO2012/124272
PCT Pub. Date: Sep. 20, 2012

(65) Prior Publication Data
US 2014/0008141 A1    Jan. 9, 2014

(30) Foreign Application Priority Data

Mar. 16, 2011  (JP) ................. 2011-058373
Jun. 27, 2011  (JP) ................. 2011-141959
(Continued)

(51) Int. Cl.
*B62D 6/00* (2006.01)
*B62D 5/04* (2006.01)
(Continued)

(52) U.S. Cl.
CPC .............. *B62D 6/008* (2013.01); *B60G 3/20* (2013.01); *B62D 5/00* (2013.01); *B62D 5/0463* (2013.01);
(Continued)

(58) Field of Classification Search
CPC ... B62D 7/18; B62D 7/14; B62D 7/16; B62D 7/163; B62D 15/021; B62D 15/0245;
(Continued)

(56) References Cited

U.S. PATENT DOCUMENTS 2,979,148 A * 4/1961 Bidwell ...................... 180/422
3,240,285 A * 3/1966 Williamson ................ 180/433
(Continued)

FOREIGN PATENT DOCUMENTS

DE    102006025558 A1 * 12/2007
DE    102007047786 A1 *  5/2009
(Continued)

OTHER PUBLICATIONS

Japanese Office Action, Sep. 24, 2013, 3 pages.
(Continued)

*Primary Examiner* — Joseph Rocca
*Assistant Examiner* — Daniel Yeagley
(74) *Attorney, Agent, or Firm* — Foley & Lardner LLP

(57) ABSTRACT

A vehicle suspension apparatus is constructed to improve stability and controllability. Suspension apparatus includes; a tire wheel to be equipped with a tire; a wheel hub mechanism to support the tire wheel; a first link member connecting the wheel hub mechanism and a vehicle body on a lower side of an axle in an vehicle up and down direction; a second link member connecting the wheel hub mechanism and the vehicle body on the lower side of the axle in the vehicle up and down direction and intersecting the first link member in a vehicle top view; and a steering rack moving in a vehicle widthwise direction and steering the wheel hub mechanism.

39 Claims, 42 Drawing Sheets

(30) Foreign Application Priority Data

| Jun. 27, 2011 | (JP) | 2011-141960 |
|---|---|---|
| Oct. 24, 2011 | (JP) | 2011-232879 |
| Feb. 16, 2012 | (JP) | 2012-031303 |

(51) Int. Cl.
- *B62D 7/15* (2006.01)
- *B60G 3/20* (2006.01)
- *B62D 5/00* (2006.01)
- *B62D 7/18* (2006.01)

(52) U.S. Cl.
CPC .............. *B62D 7/159* (2013.01); *B62D 7/18* (2013.01); *B60G 2200/18* (2013.01); *B60G 2200/44* (2013.01)

(58) Field of Classification Search
CPC ........ B62D 5/008; B62D 5/046; B62D 5/001; B62D 6/04; B62D 7/228; B62D 5/0466; B62D 5/0457; B62D 5/0463; B62D 7/259; B62D 6/00; B62D 6/008; B60G 3/20; B60G 3/26; B60G 3/225; B60G 7/00; B60G 7/008; F16C 11/00
USPC .......... 180/402; 280/93.51, 93.512, 124.135, 280/124.136, 124.138
See application file for complete search history.

(56) References Cited

U.S. PATENT DOCUMENTS

| 3,485,506 | A | * | 12/1969 | Melbar et al. ............. 280/5.521 |
|---|---|---|---|---|
| 4,664,412 | A | | 5/1987 | Matschinsky |
| 4,842,296 | A | | 6/1989 | Kubo |
| 4,878,688 | A | * | 11/1989 | Kubo ...................... 280/124.138 |
| 4,951,199 | A | * | 8/1990 | Whitehead ...................... 701/41 |
| 5,102,159 | A | * | 4/1992 | Sato et al. .................. 280/86.75 |
| 5,754,966 | A | * | 5/1998 | Ichikawa ............... B62D 7/159 180/410 |
| 5,941,338 | A | | 8/1999 | Miller et al. |
| 6,675,928 | B2 | | 1/2004 | Takai et al. |
| 7,222,431 | B1 | | 5/2007 | Norton et al. |
| 7,571,033 | B2 | * | 8/2009 | Fujioka et al. .............. 701/33.8 |
| 7,974,752 | B2 | | 7/2011 | Yamashita et al. |
| 2003/0196849 | A1 | | 10/2003 | Menjak et al. |
| 2004/0016594 | A1 | * | 1/2004 | Yasui et al. .................... 180/446 |
| 2004/0046350 | A1 | * | 3/2004 | Wagner et al. ......... 280/124.135 |
| 2004/0148078 | A1 | * | 7/2004 | Nakano et al. .................. 701/41 |
| 2006/0006623 | A1 | | 1/2006 | Leclair |
| 2006/0070794 | A1 | * | 4/2006 | Fujita ................. B62D 15/0245 180/446 |
| 2007/0284180 | A1 | | 12/2007 | Suehiro et al. |
| 2008/0196966 | A1 | * | 8/2008 | Maruyama et al. .......... 180/446 |
| 2009/0095562 | A1 | * | 4/2009 | Yasui .................. B60W 30/045 180/412 |
| 2009/0194965 | A1 | * | 8/2009 | Boston ................... 280/124.136 |
| 2010/0106372 | A1 | * | 4/2010 | Watanabe .......... B62D 15/0285 701/41 |
| 2011/0022270 | A1 | | 1/2011 | Tamaizumi et al. |
| 2011/0224874 | A1 | | 9/2011 | Pattok et al. |
| 2013/0245890 | A1 | | 9/2013 | Kageyama et al. |
| 2014/0014433 | A1 | | 1/2014 | Kageyama et al. |

FOREIGN PATENT DOCUMENTS

| DE | 102007047787 A1 | * | 5/2009 |
|---|---|---|---|
| DE | 102007047788 A1 | * | 5/2009 |
| DE | 102007047789 A1 | * | 5/2009 |
| DE | 102007047790 A1 | * | 5/2009 |
| DE | 102007047791 A1 | * | 5/2009 |
| DE | 102007047792 A1 | * | 5/2009 |
| DE | 102008044103 A1 | * | 6/2010 |
| EP | 1 864 886 A2 | | 12/2007 |
| EP | 2 119 616 A1 | | 11/2009 |
| EP | 2207690 B1 | * | 2/2013 |
| JP | 60-151181 A | | 8/1985 |
| JP | 63-166610 A | | 7/1988 |
| JP | 2-204173 A | | 8/1990 |
| JP | 03-057709 A | | 3/1991 |
| JP | 04108083 A | * | 4/1992 |
| JP | 5-169941 A | | 7/1993 |
| JP | 11-129926 A | | 5/1999 |
| JP | 3076541 B2 | | 8/2000 |
| JP | 2007-038976 A | | 2/2007 |
| JP | 2007-118672 A | | 5/2007 |
| JP | 2007-237840 A | | 9/2007 |
| JP | 2008-18924 A | | 1/2008 |
| JP | 2008265489 A | * | 11/2008 |
| JP | 2009-90762 A | | 4/2009 |
| JP | 2009-248649 A | | 10/2009 |
| JP | 2010-047193 A | | 3/2010 |
| JP | 2010-058588 A | | 3/2010 |
| JP | 2010-058619 A | | 3/2010 |
| JP | 2010-126014 A | | 6/2010 |
| JP | 4664412 B2 | | 1/2011 |
| RU | 2008104696 A | | 8/2009 |
| WO | WO 2005091699 A1 | * | 10/2005 |
| WO | WO 2005092644 A1 | * | 10/2005 |
| WO | WO 2009/062823 A1 | | 5/2009 |
| WO | WO 2009062824 A1 | * | 5/2009 |
| WO | WO 2009062825 A1 | * | 5/2009 |
| WO | WO-2009/113642 A1 | | 9/2009 |

OTHER PUBLICATIONS

Japanese Office Action Feb. 12, 2014, 2 pages.
Russian Decision on Grant, Jul. 31, 2014, 23 pages.
USPTO Office Action, U.S. Appl. No. 13/989,908, Aug. 21, 2014, 23 pages.
USPTO Office Action, U.S. Appl. No. 14/030,503, Aug. 21, 2014, 10 pages.
USPTO Office Action, U.S. Appl. No. 14/030,503, May 12, 2015, 18 pages.
USPTO Office Action, U.S. Appl. No. 13/989,908, May 12, 2015, 34 pages.
USPTO Office Action, U.S. Appl. No. 13/989,908, Aug. 19, 2015, 31 pages.
USPTO Office Action, U.S. Appl. No. 14/030,503, Aug. 19, 2015, 15 pages.
USPTO Office Action, U.S. Appl. No. 14/030,503, Dec. 4, 2015, 22 pages.
USPTO Office Action, U.S. Appl. No. 13/989,908, Dec. 7, 2015, 40 pages.
USPTO Office Action, U.S. Appl. No. 14/030,503, Jun. 13, 2016, 8 pages.
Chinese Office Action, Feb. 28, 2015, 7 pages.
USPTO Notice of Allowance, U.S. Appl. No. 13/989,908, Jul. 12, 2016, 16 pages.
USPTO Office Action, U.S. Appl. No. 14/030,503, Mar. 2, 2017, 12 pages.

* cited by examiner

MOTOR VEHICLE AND STEER CONTROL METHOD FOR STEERABLE WHEEL

TECHNICAL FIELD

The present invention relates to a motor vehicle having a vehicle suspension apparatus supporting a vehicle body, and a steer control method for steerable wheel.

BACKGROUND ART

In a vehicle suspension apparatus, an intended suspension characteristic has been realized by setting of a kingpin axis.

In the technique disclosed in a patent document 1, for example, links are arranged to restrain movement in the vehicle front and rear direction, of upper and lower pivot points forming a kingpin at the time of steering, and thereby to improve the stability and controllability.

PRIOR ART LITERATURE

Patent Document

Patent Document 1: JP 2010-126014 A.

SUMMARY OF THE INVENTION

Problem to be Solved by the Invention

However, the technique of this patent document takes no account of influence of a side force inputted at a tire ground contact point in accordance with a running speed of a vehicle in the case of a steer operation during running motion of the vehicle. Accordingly, there is room for improvement for reducing a moment about the kingpin axis at the time of steer operation. Thus, in the conventional vehicle suspension apparatus, there is room for improvement for improving the stability and controllability.

It is an object of the present invention to improve the stability and controllability of a motor vehicle including a suspension apparatus.

Means for Solving the Problem

To solve the above-mentioned problem, a motor vehicle according to the present invention includes a suspension apparatus comprising first and second link members connecting a wheel hub mechanism and a vehicle body on a lower side of an axle in a vehicle up and down direction, in a crossing arrangement in which the first and second link members intersect each other as viewed in a vehicle top view.

Moreover, a kingpin axis passing through an upper pivot point of the suspension apparatus and a lower pivot point located at an intersection point of the first link member and the second link member is set to pass through a tire ground contact surface or contact patch at a neutral position of the steering wheel.

Moreover, there is provided a steer control apparatus to steer a steerable wheel by producing a restoring force for self-aligning in the steerable wheel by actuating an actuator.

Effect of the Invention

According to the present invention, it is possible to set an imaginary lower pivot point at a position closer to a vehicle in board side in the vehicle widthwise direction, and therefore to decrease a moment about a kingpin axis. Therefore, it is possible to perform a steer operation with a smaller rack axial force and control the direction of a wheel with a smaller force.

Moreover, it is possible to secure a straightness of the vehicle by imparting the restoring force for self-aligning to the steerable wheel by actuating the actuator.

Consequently, it is possible to improve the stability and controllability of the motor vehicle.

BRIEF DESCRIPTION OF THE DRAWINGS

FIG. 19 shows characteristics of the suspension apparatus.

FIG. 20 shows a steer response characteristic.

MODE(S) FOR CARRYING OUT THE INVENTION

Following is explanation on motor vehicles or automobiles according to embodiments of the present invention with reference to drawings.

First Embodiment

Figure 1:
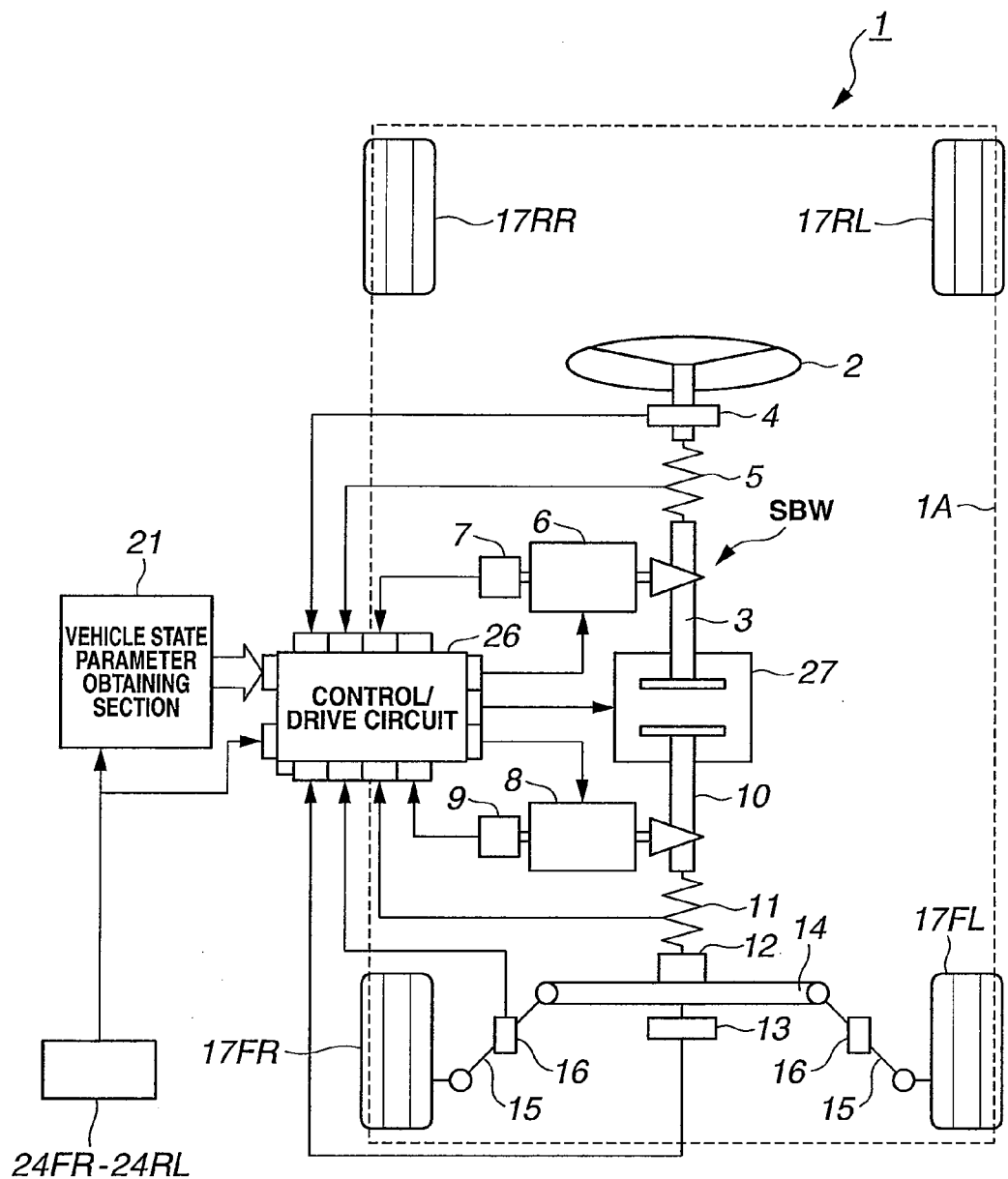
FIG. 1 is a schematic view showing the construction of a motor vehicle 1 according to a first embodiment of the present invention.

FIG. 1 is a schematic view showing the construction of a motor vehicle 1 according to a first embodiment of the present invention.

As shown in FIG. 1, the motor vehicle 1 includes a vehicle body 1A, a steering wheel 2, an input-side steering shaft 3, a steering angle sensor 4, a steering torque sensor 5, a steering reaction (or reaction force) actuator 6, a steering reaction actuator angle sensor 7, a steering actuator 8, a steering actuator angle sensor 9, an output-side steering shaft 10, a steering or turning torque sensor 11, a pinion gear 12, a pinion angle sensor 13, a steering rack member 14, tie rods 15, tie rod shaft force (or axial force) sensors 16, wheels 17FR, 17FL, 17RR and 17RL, a vehicle state parameter obtaining (or acquiring) section 21, wheel speed sensors 24FR, 24FL, 24RR and 24RL, a control/drive circuit unit or device 26, and a mechanical backup 27.

Steering wheel 2 is constructed to rotate as a unit with the input-side steering shaft 3, and to transmit a steering input inputted by the driver, to input-side steering shaft 3.

Input-side steering shaft 3 is provided with the steering reaction actuator 6, which add a steering reaction or reaction force to the steering input inputted from the steering wheel 2.

Steering angle sensor 4 is provided in the input-side steering shaft 3, and arranged to sense a rotational angle of input-side steering shaft 3 (that is, a steering input angle inputted to steering wheel 2 by the driver). Steering angle sensor 4 sends the sensed rotational angle of input-side steering shaft 3, to the control/drive circuit unit 26.

Steering torque sensor 5 is provided in the input-side steering shaft 3, and arranged to sense a rotational torque of input-side steering shaft 3 (that is, a steering input torque inputted to steering wheel 2). Steering torque sensor 5 sends the sensed rotational torque of input-side steering shaft 3, to the control/drive circuit unit 26.

Steering reaction actuator 6 includes a gear which is arranged to rotate as a unit with a motor shaft, and which is engaged with a gear formed in a part of input side steering shaft 3. Under command of control/drive circuit unit 26, the steering reaction actuator 6 imparts a reaction force to the rotation of input-side steering shaft 3 rotated by steering wheel 2.

Steering reaction actuator angle sensor 7 senses the rotational angle of steering reaction actuator 6 (that is, a rotational angle produced by the steering put, transmitted to steering reaction actuator 6), and sends the sensed rotational angle to control/drive circuit unit 26.

Steer actuator 8 includes a gear which is arranged to rotate as a unit with a motor shaft and which is engaged with a gear formed in a part of output-side steering shaft 10. Under command of control/drive circuit unit 26, the steer actuator 8 rotates to output-side steering shaft 10.

Steer actuator angle sensor 9 senses the rotational angle of steer actuator 8 (that is, a rotational angle produced by steer actuator 8 to steer the wheels), and sends the sensed rotational angle to control/drive circuit unit 26.

Output-side steering shaft 10 is provided with the steer actuator 8, and arranged to transmit the rotation inputted from steer actuator 8, to the pinion gear 12.

Steer torque sensor 11 is provided in the output-side steering shaft 10, and arranged to sense a rotational torque of output-side steering shaft 10 (that is, a steer torque to steer the wheels 17FR and 17FL through steering rack member 14). Steer torque sensor 11 sends the sensed rotational torque of output-side steering shaft 10, to the control/drive circuit unit 26.

Pinion gear 12 is engaged with a spur gear formed in steering rack member 14 formed by a rack shaft or rack bar, for example, and arranged to transmit the rotation inputted from output-side steering shaft 10, to steering rack member 14.

Pinion angle sensor 13 senses the rotational angle of pinion gear 12 (that is, the steer angle of wheels 17FR and 17FL outputted through steering rack member 14), and sends the sensed rotational angle of pinion gear 12, to the control/drive circuit unit 26.

Steering rack member 14 includes the spur gear engaged with pinion gear 12, and converts the rotational motion of pinion gear 12 into a linear (or rectilinear) motion in the vehicle widthwise direction. In this embodiment, the steering rack member 14 is located on a front side or vehicle forward side of the axles of the front wheels, toward the front of the vehicle.

Tie rods 15 connect both ends of steering rack member 14, respectively, with knuckle arms of wheels 17FR and 17FL through ball joints.

Tie rod axial force sensor 16 is provided in each of the tie rods 15 disposed on both ends of steering rack member 14, and arranged to sense the axial force acting on the tie rod 15. Tie rod axial force sensors 16 sends the sensed axial forces of the respective tie rods 15, to the control/drive circuit unit 26.

A steer-by-wire system SWB is formed by the steering reaction actuator 6, steer actuator 8, pinion gear 12, steering rack member 14, tie rods 15 and control/drive circuit unit 26.

Each of the wheels 17FR, 17FL, 17RR and 17RL is constructed by attaching a tire to a tire wheel, and connected with the vehicle body 1A, through the suspension system or apparatus 1B. The front wheels (17FR, 17FL) are arranged to vary the directions of wheels 17FR and 17FL with respect to vehicle body 1A, with the knuckle arms swung by the tie rods 15 forming the steer-by-wire system SWB.

The vehicle state parameter obtaining section 21 obtains a vehicle speed from pulse signals representing wheel rotational speeds, sent from the wheel speed sensors 24FR, 24FL, 24 RR and 24RL. Moreover, vehicle state parameter obtaining section 21 obtains a slip rate of each wheel, from the vehicle speed and the rotational speed of each wheel. Vehicle state parameter obtaining section 21 sends the thus-obtained parameters to the control/drive circuit unit 26.

Wheel speed sensors 24FR, 24FL, 24RR and 24RL send the respective pulse signals representing the rotational speeds of the wheels, to the vehicle state parameter obtaining section 21 and control/drive circuit unit 26.

The control/drive circuit unit or device 26 is a unit to control the whole of motor vehicle 1. On the basis of signals received from the sensors provided at various parts, the control/drive circuit unit 26 outputs various control signals about the steering reaction of input-side steering shaft 3, the front wheel steer angle, or the connection of the mechanical backup 27, to the steering reaction actuator 6, steer actuator 8 or mechanical backup 27.

The control/drive circuit unit 26 is further configured to convert the quantities or values sensed by the sensors into quantities or values adequate for intended purposes. For example, control/drive circuit unit 26 converts the rotational angle sensed by steering reaction actuator angle sensor 7 into a steering input angle, converts the rotational angle sensed by the steer actuator angle sensor 9 into a wheel steer angle, and converts the rotational angle of pinion gear 12 sensed by pinion angle sensor 13 into the wheel steer angle.

Control/drive circuit unit 26 can monitor the rotational angle of input-side steering shaft 3 sensed by steering angle sensor 4, the rotational angle of steering reaction actuator 6 sensed by steering reaction actuator angle sensor 7, the rotational angle of steer actuator 8 sensed by steer actuator angle sensor 9 and the rotational angle of pinion gear 12 sensed by pinion angle sensor 13, and detect a failure in the steering system from a relationship among these angles. Upon detection of a failure in the steering system, the control/drive circuit unit 26 outputs a command signal to the mechanical backup 27 to connect the input-side steering shaft 3 and output-side steering shaft 10.

Mechanical backup 27 is a mechanism to connect the input-side steering shaft 3 and output-side steering shaft 10 in response to the command of control/drive circuit unit 26, and thereby to secure transmission of a force from input-side steering shaft 3 to output-side steering shaft 10. Normally, the control/drive circuit unit 26 commands a non-connection state not connecting the input-side steering shaft 3 and output-side steering shaft 10, to the mechanical backup 27. The connection command to connect the input-side steering shaft 3 and output-side steering shaft 10 is inputted from control/drive circuit unit 26 to mechanical backup 27 if, because of occurrence of a failure in the steering system, there arises a need for a steering operation without intervention of the steering angle sensor 4, steering torque sensor 5, steer actuator 8 etc.

The mechanical backup 27 can be constructed by a cable-type steering mechanism, for example.

Figure 2:
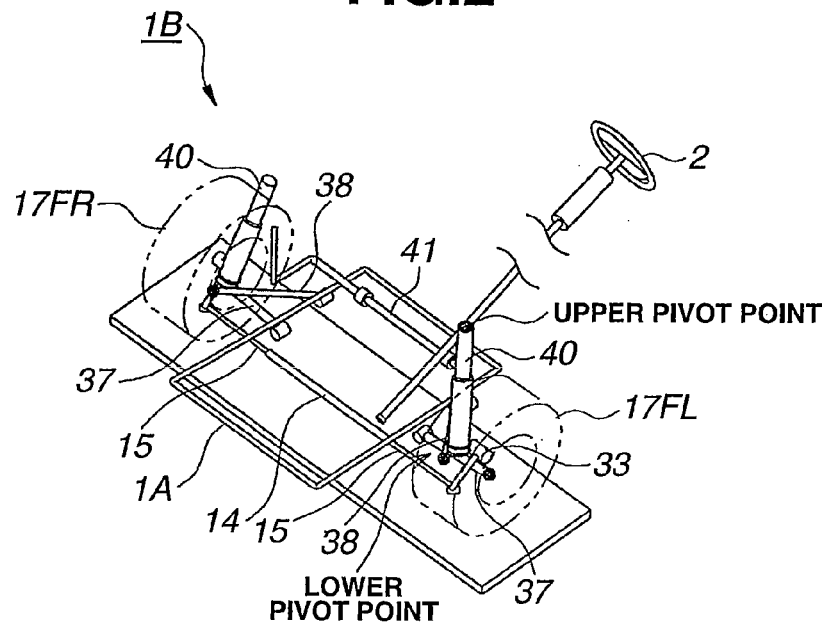
FIG. 2 is a perspective view schematically showing the construction of a suspension apparatus 1B.
Figure 3:
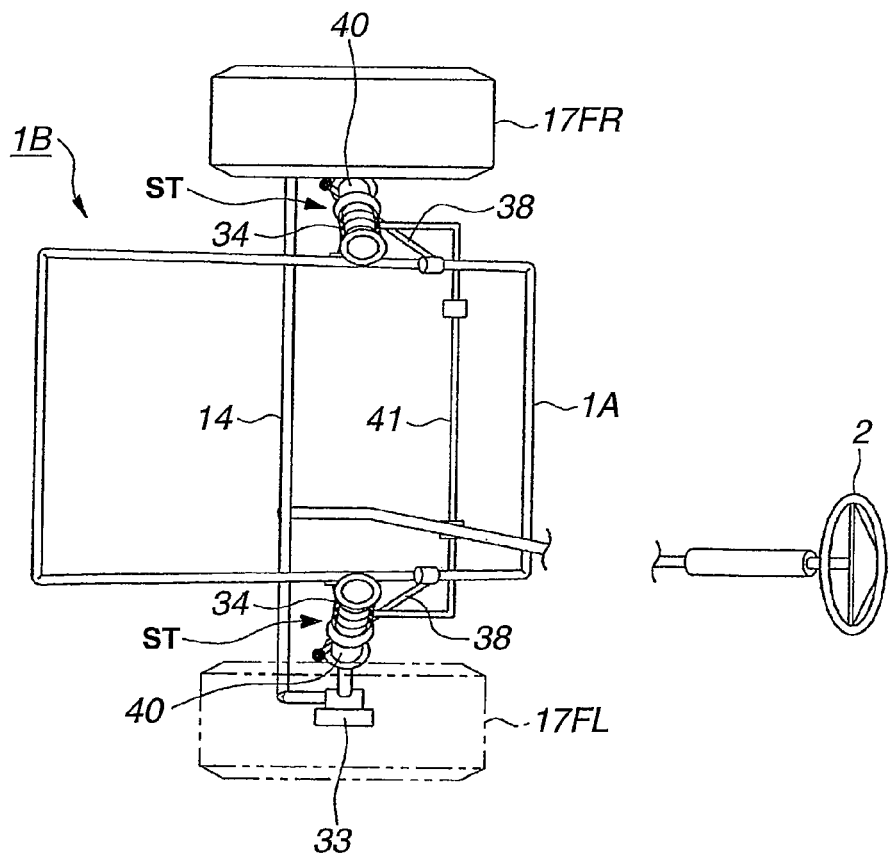
FIG. 3 is a plan view schematically showing the construction of the suspension apparatus 1B.
Figure 4A:
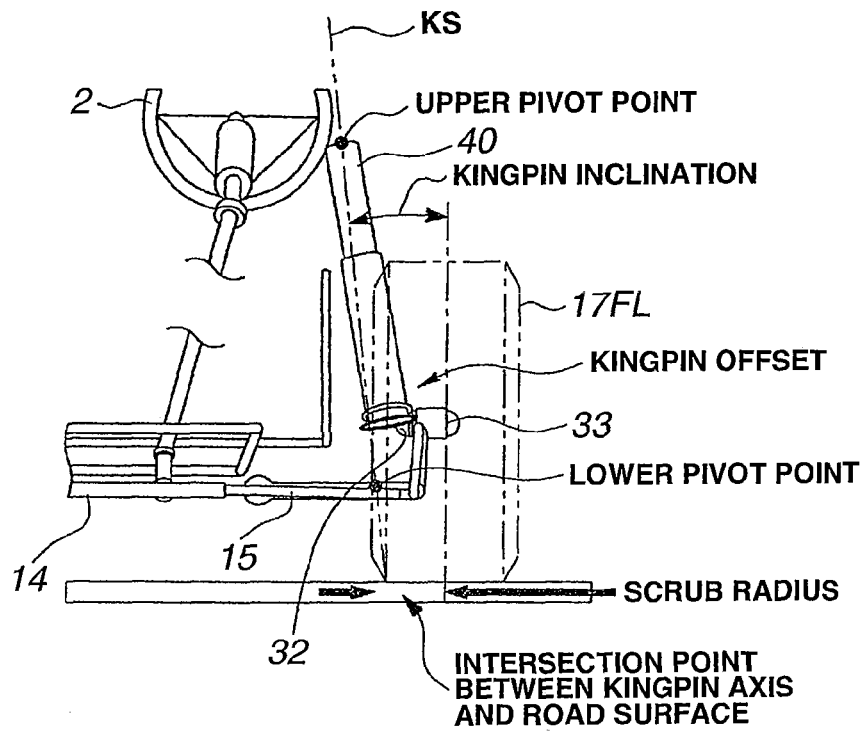
FIGS. 4(a) and 4(b) show partial front view and partial side view schematically showing the construction of the suspension apparatus 1B.
Figure 4B:
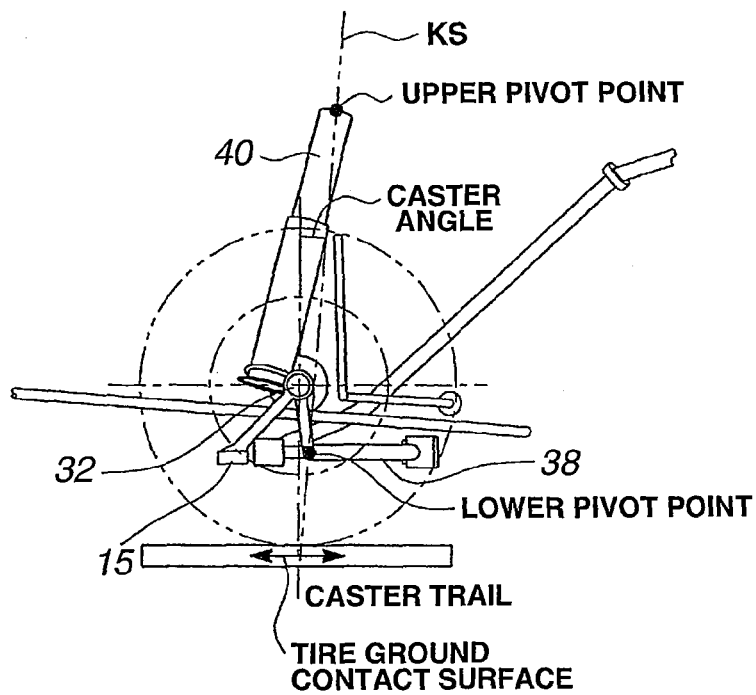

FIG. 2 is a perspective view schematically showing the construction of a suspension apparatus or suspension system 1B according to the first embodiment. FIG. 3 is a plan view schematically showing the construction of the suspension apparatus 1B of FIG. 2. FIG. 4(a) and FIG. 4(b) are partial front view and partial side view schematically showing the construction of the suspension apparatus 1B of FIG. 2.

As shown in FIGS. 2~4, the suspension apparatus or suspension system 1B supports wheels 17FR and 17FL attached to wheel hub mechanisms WH, and includes, on each of the right and left sides, an axle carrier 33 including an axis or shaft of the wheel (axle) 32 supporting the wheel 17FR or 17FL rotatably, a plurality of link members disposed in a vehicle body widthwise direction from a support portion on the vehicle body's side and connected with the axle carrier 33, and a spring member 34 such as a coil spring.

The link members include a first link (first link member) 37 and a second link (second link member) 38 which are lower link members, a tie rod (tie rod member) 15 and a strut (spring member 34 and a shock absorber 40). In this embodiment, the suspension apparatus 1B is a strut type suspension system, and the strut ST formed as a unit by the spring member 34 and shock absorber 40 extends to an upper end connected with the vehicle body's side support portion located above the axle 32 (hereinafter, the upper end of the strut ST is referred to as "upper pivot point" suitably).

The first link 37 and second link 38 forming the lower links, connect the vehicle body's side support portion located below the axle 32, with a lower end of the axle carrier 33. In this embodiment, the first link 37 and second link 38 are in the form of I arm independent from each other. The first link 37 and second link 38 are connected with the vehicle body at two respective support portions, and connected with the axle 32's side at two respective support portions (connect portions). Moreover, the first link 37 and second link 38 in this embodiment are arranged to connect the vehicle body 1A and the axle 32's side (axle carrier 33) with each other in a crossing or intersecting state in which first and second links 37 and 38 intersect each other (hereinafter, an intersection point between imaginary links formed by first link 37 and second link 38 is referred to as "lower pivot point" suitably).

Tie rod 15 is located on a lower side of axle 32, and arranged to connect the rack shaft 14 with axle carrier 33. Rack shaft 14 is arranged to transmit a rotational force (steering force) inputted from steering wheel 2 and thereby to produce a shaft force or axial force for turning or steering the wheels. Therefore, the axle carrier 33 receives the shaft force in the vehicle widthwise direction from tie rod 15 through rack shaft 14 in accordance with the rotation of steering wheel 2, and thereby turns or steer the wheel 17FR or 17FL. The rack shaft 14 is located on a front side of axle 32 in the vehicle front and rear direction.

Furthermore, a stabilizer 41 is provided between the tubes of left and right shock absorbers 40.

In the suspension apparatus 1B according to this embodiment, a kingpin axis KS is so set as to pass through a tire ground contact surface or contact patch. Furthermore, the kingpin axis is so set that a caster trail passes through the tire ground contact surface. Specifically, in the suspension apparatus 1B of this embodiment, the caster angle is set equal to a value close to zero, and the kingpin axis is so set that the caster trail approaches zero. This setting makes it possible to reduce a tire torsional torque or tire twisting torque at the time of steer operation to steer the wheel, and reduce a moment about the kingpin axis KS. Moreover, the scrub radius is set as a positive scrub in which the scrub radius is greater than or equal to zero. With this setting, the caster trail is generated in an amount corresponding to the scrub radius with respect to a tire side slip angle at the time of steer operation to steer the wheel, and hence the suspension system can ensure a straightness or straight-line running performance.

In this embodiment, the first link 37 and second link 38 serving as the lower link members connect the vehicle body 1 and the axle 32's side (the lower end of axle carrier 33) with each other in the crossing or intersecting state in which first and second links 37 and 38 intersect each other. This crossing arrangement makes it possible to make the kingpin inclination (angle) smaller, and make the scrub radius greater to the positive scrub side, as compared to the non-crossing arrangement in which first and second links 37 and 38 do not intersect each other. Therefore, the suspension system can decrease the tire twisting torque at the time of steer operation, and reduce the rack axial force required for the steer operation. Furthermore, according to this embodiment, the imaginary lower pivot point is moved to the inner or inboard side of the vehicle body by the side force acting on the wheel at the time of steer operation, so that it is possible to improve the straightness due to the self-aligning torque (SAT).

Hereinafter, the suspension geometry in the suspension apparatus 1B is examined in detail.

(Analysis of Rack Axial Force Component)

Figure 5:
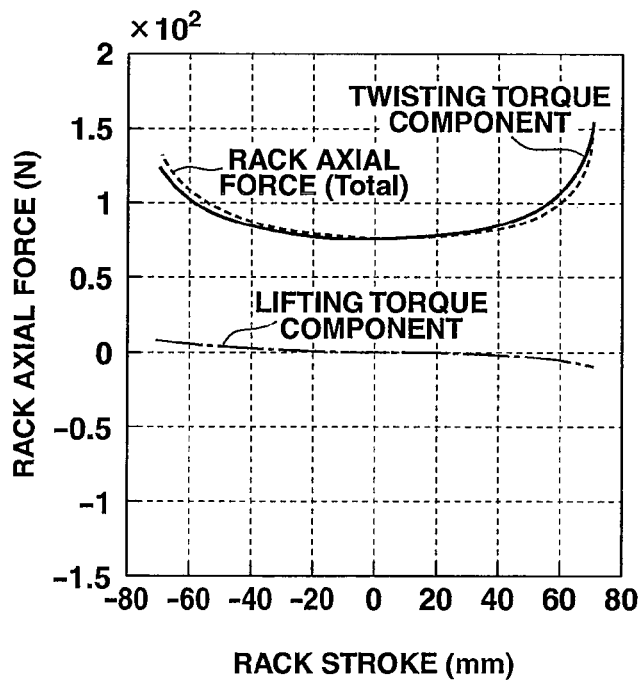
FIG. 5 is a view showing a relationship between a rack stroke and a rack axial force at the time of steer operation.

FIG. 5 is a view showing a relationship between a rack stroke and a rack axial force at the time of steer operation.

As shown in FIG. 5, the rack axial force contains a tire twisting torque and a wheel lifting torque mainly. Among these components of the rack axial force, the tire twisting torque is predominant.

Therefore, it is possible to reduce the rack axial force by decreasing the tire twisting torque.

(Minimization of the Tire Twisting Torque)

Figure 6:
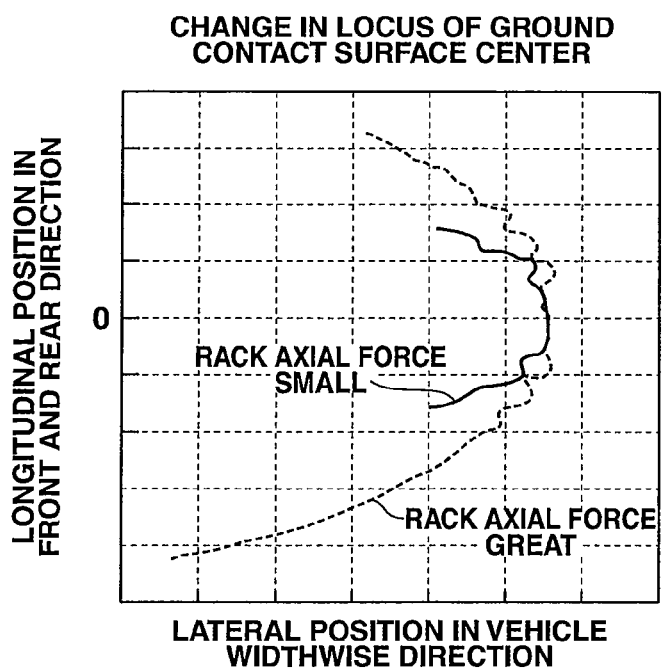
FIG. 6 is a view showing a locus or trace of the center of the tire ground contact surface or contact patch at the time of steer operation

FIG. 6 is a view showing a locus or trace of the center of the tire ground contact surface at the time of steer operation. FIG. 6 shows a characteristic in the case that the movement of the tire ground contact surface center or the center of the tire ground contact patch is great in the steer operation, and a characteristic in the case that the movement of tire ground contact surface center is small in the steer operation.

As evident from the above-mentioned result of the rack axial force components, it is effective to minimize the tire twisting torque at the time of steer operation, in order to reduce the rack axial force. In order to minimize the tire twisting torque in the steer operation, it is appropriate to decrease the locus of the tire ground contact surface center as shown in FIG. 6. Namely, it is possible to minimize the tire twisting torque by setting the tire ground contact surface center and a kingpin ground contact point or intercept point in agreement or at the same position. Concretely, it is effective to set the caster trail equal to 0 mm and the scrub radius equal to or greater than 0 mm.

(Influence of Kingpin Inclination)

Figure 7:
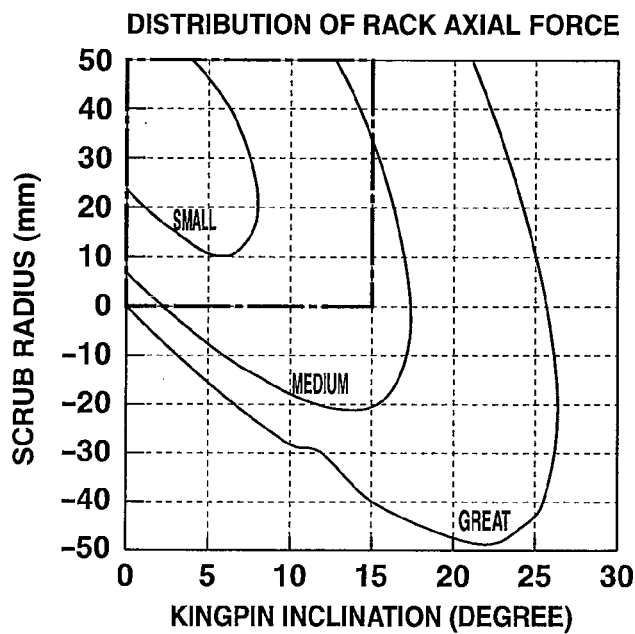
FIG. 7 is a view of isoplethic diagram showing one example of distribution of the rack axial force in a coordinate system using, as axes, the king pin inclination and the scrub radius.

FIG. 7 is a view of isoline or isoplethic diagram showing one example of distribution of the rack axial force in a coordinate system using, as axes, the kingpin inclination and the scrub radius. FIG. 7 shows three isoplethic lines or equal-value lines for small, medium and great values of the rack axial force. With respect to input of the tire twisting torque, as the kingpin inclination becomes greater, its rotation moment becomes greater, and the rack axial force becomes greater. Accordingly, it is desirable to set the kingpin inclination smaller than a predetermined value. However, from the relationship with the scrub radius, it is possible to decrease the rack axial force to a desirable level by setting the kingpin inclination smaller than or equal to 15 degrees, for example.

A region surrounded by one-dot chain lines (boundary lines) in FIG. 7 is a region in which the kingpin inclination is smaller than an angle of 15 degrees which is a value estimated to be a value at which the side force exceeds a limit of friction, and at the same time the scrub radius is greater than or equal to 0 mm from the above-mentioned viewpoint of the tire twisting torque. In this embodiment, this region (in the direction decreasing the kingpin inclination from 15 degrees in the horizontal axis, and in the direction increasing the scrub radius from zero in the vertical axis) is treated as a region more suitable for setting. However, even in a region in which the scrub radius is negative, it is possible to obtain a certain effect by showing other condition in this embodiment.

Concretely, in determining the scrub radius and kingpin inclination, for example, it is possible to approximate an isoplethic line or equal-value line representing the distribution of the rack axial force, with a n-degree curve (n is an integer greater than or equal to 2), and to employ a value determined in accordance with the position of an inflexion point of the n-degree curve (or peak value) within the region surrounded by the one dot chain lines.

(Concrete Construction Examples)

Following is explanation on concrete examples of constructions implementing or realizing the suspension apparatus 1B.

Figure 8:
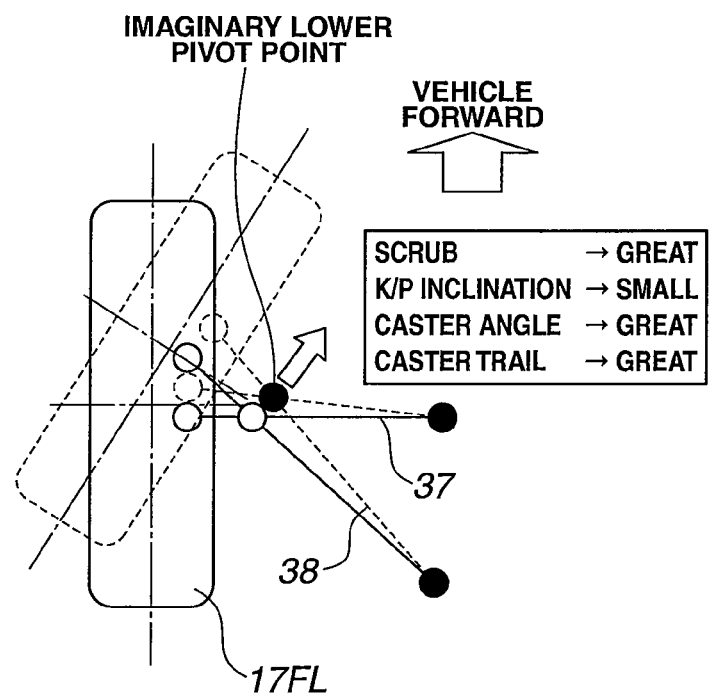
FIG. 8 is a schematic view showing an example in which the suspension apparatus 1B is formed with a compression type suspension system.

FIG. 8 is a schematic view showing an example constructing the suspension apparatus 1B with a suspension apparatus of a compression type (the type in which the lower link members are located on the rear side of the axle in the vehicle top view). In the example shown in FIG. 8, in the vehicle top view, a tension rod (the first link 37) extends along the axle, and a compression rod (the second link 38) is extended rearwards from the axle and connected with the vehicle body at a position on the rear side of the axle.

As shown in FIG. 8, in the arrangement of a double pivot type in which the lower link members are arranged to intersect each other in the compression type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension arrangement can set the imaginary lower pivot point at the position on the vehicle body inner side or inboard side as compared to the non-crossing type suspension arrangement in which the lower link members do not intersect. Therefore, this suspension arrangement can make an initial scrub radius greater in the positive scrub direction.

In the compression type suspension system shown in FIG. 8, because the rotation angle of the compression rod is great in the steer operation, the imaginary lower pivot point is shifted to the inboard side. In this case, in the vehicle top view, the distance from the tire center line in the tire front and rear direction to the imaginary lower pivot point is moved in the inboard direction from the tire center line on the inboard side of the tire center line, and therefore the scrub radius becomes greater in the direction to the positive scrub. Therefore, in the compression type suspension system, when this embodiment is applied, the rack axial force is decreased by the steer operation as the turning outer wheel.

In the case of the compression type suspension system in which the lower link members do not intersect, because the rotation angle of the compression rod is great in the steer operation, the imaginary lower pivot point is shifted to the outboard side. In this case, in the vehicle top view, the distance from the tire center line in the tire front and rear direction to the imaginary lower pivot point is located on the outboard side of the tire center line, and therefore the scrub radius becomes greater in the direction to the negative scrub. Therefore, the rack axial force is increased by the steer operation.

Furthermore, in the example shown in FIG. 8, in the vehicle top view, the wheel center is moved to the inner side of the vehicle turning motion at the time of steer operation. Therefore, the suspension system can enhance the effect of reducing the rack axial force with the arrangement placing the rack shaft 14 on the front side, or in front, of the axle as in this embodiment.

Figure 9:
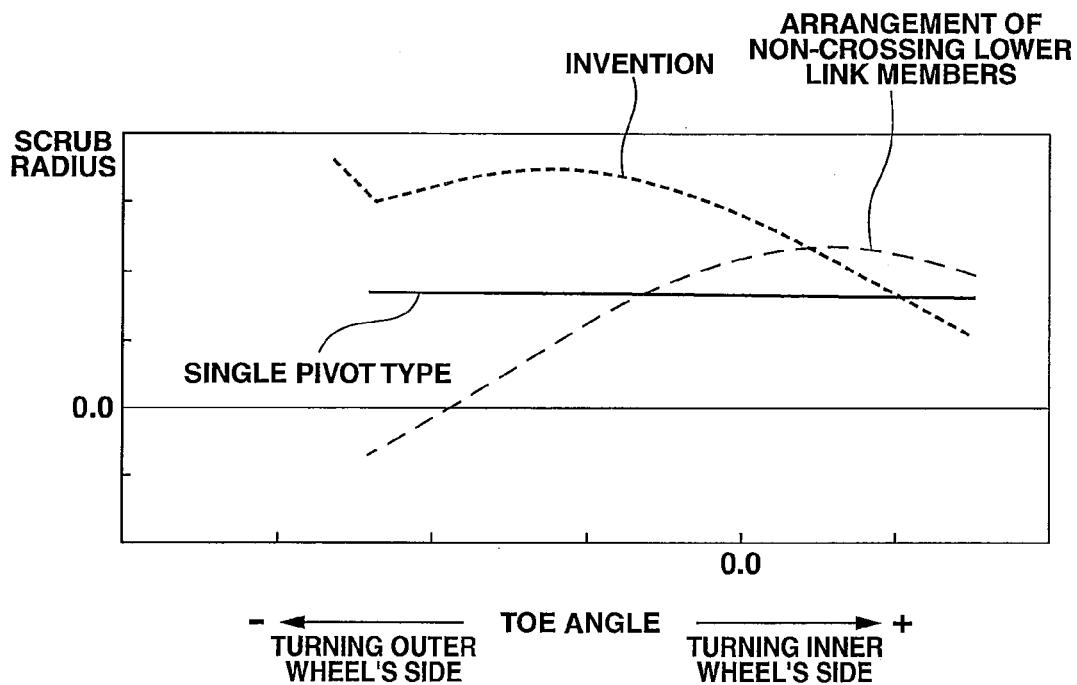
FIG. 9 is a view showing a relationship between the toe angle and the scrub radius in the compression type suspension system including the lower link members in the non-crossing arrangement, and the suspension system according to the first embodiment.

FIG. 9 is a view showing a relationship between the toe angle and the scrub radius in the compression type suspension system including the lower link members in the non-crossing arrangement, and the suspension system according to this embodiment.

As shown in FIG. 9, as compared to the non-crossing arrangement of the lower link members, the arrangement according to this embodiment can increase the scrub radius further in the vicinity of the neutral position (where the toe angle is zero). Moreover, in the direction increasing the steer angle at the turning outer wheel ("-" direction in FIG. 9), the scrub radius is increased and it is possible to decrease the rack axial force.

Figure 10:
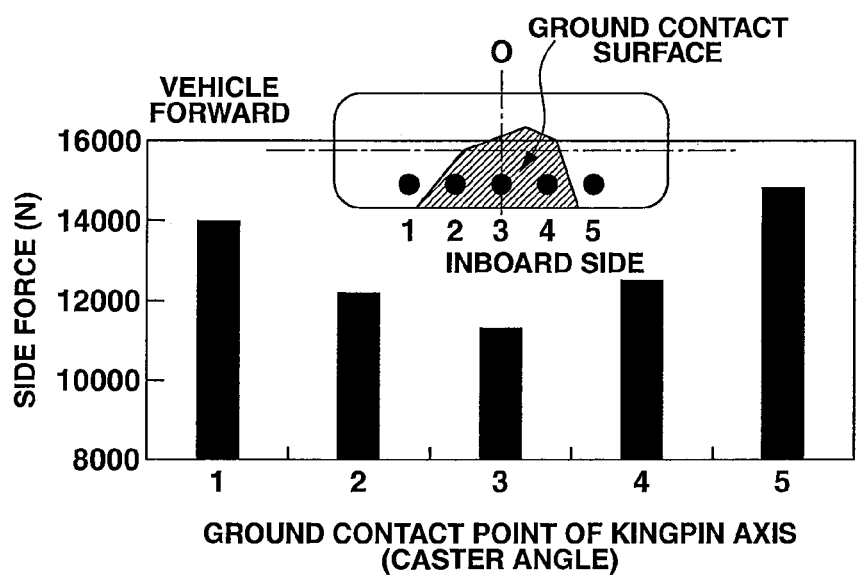
FIG. 10 is a graphic view showing a relationship between a ground intersection or intercept point of a kingpin axis and a side force.

Furthermore, the arrangement of setting the caster angle equal to 0 degree makes it possible to improve the suspension stiffness. Moreover, the setting of the caster trail equal to 0 mm means the arrangement of setting the ground intersection point of kingpin axis KS at the tire ground contract center O of the tire ground contact surface (force application point), as shown a reference numeral 3 in FIG. 10 showing a relationship between the ground intersection point of kingpin axis KS and the side force. With this setting, the suspension system can improve the great effect of reducing the side force.

It is possible to decrease the side force even in the case that the ground contact or intersection point of kingpin axis KS lies at a position indicated by 2 or 4 within the tire ground contact surface including the tire ground contact center (force application point) O, in comparison with the case that the ground contact point of kingpin axis KS lies at a position indicated by 1 or 5 outside the tire ground contact surface, on the front side or the rear side of the tire ground contact surface. Specifically, the suspension system can reduce the side force effectively in the arrangement in which the ground contact point of kingpin axis KS is located on the vehicle forward side of the tire ground contact center (force application point), in comparison with the ground contact point of kingpin axis KS is located on the vehicle rearward side of the tire ground contact center (force application point).

(Straightness with Positive Scrub)

Figure 11:
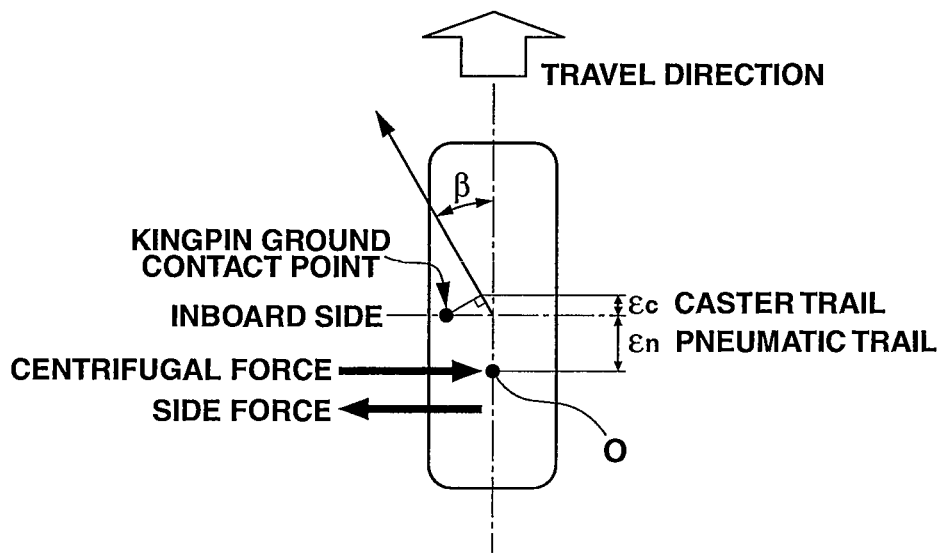
FIG. 11 is a concept view for illustrating a self-aligning torque in the positive scrub setting.

FIG. 11 is a concept view for illustrating a self-aligning torque in the positive scrub setting. In FIG. 11, a centrifugal force acts at the tire ground contact center (force application point) O in the direction to the turning outer side of the vehicle at the time of steer operation, and a side force is produced in the direction toward the turning center, against the centrifugal force. In FIG. 11, β is a side slip angle.

As shown in FIG. 11, a restoring force (the self-aligning torque) acting on the tire increases in proportion to the sum of the caster trail and the pneumatic trail.

In the case of the positive scrub, it is possible to regard, as the caster trail, the distance $\epsilon c$ (cf. FIG. 11) from the wheel center, determined by the position of a foot of a perpendicular line drawn from the ground contact point of the kingpin axis, to a straight line extending, through the tire ground contact center, in the direction of the tire side slip angle β.

Therefore, the restoring force acting on the tire at the time of steer operation become greater as the scrub radius of the positive scrub becomes greater.

In this embodiment, the kingpin axis is set in the positive scrub arrangement, and it is possible to secure the initial scrub radius at a large level in comparison with the arrangement of the non-crossing lower link members. Therefore, the suspension system of this embodiment can reduce the influence on the straightness by the setting of the caster angle closer to zero. Moreover, by the use of the steer-by-wire mode, the suspension system can ensure the intended straightness with the steer actuator 8 finally.

(Operation of the Suspension Apparatus)

Following is explanation on operation of the suspension apparatus 1B according to this embodiment.

In the suspension system 1B according to this embodiment, the two lower link members are in the form of I arm. The compression rod is arranged to extend in the vehicle widthwise direction from axle carrier 33, and the tension rod is arranged to extend obliquely toward the rear of the vehicle from the lower end of axle carrier 33, in the crossing state intersecting the compression rod.

In this arrangement, for each of the lower link members, a straight line is imagined to connect the support point on the vehicle body 1A's side with the support point on the axles 32's side. An intersection point of these imaginary straight lines serves as the imaginary lower pivot point. The kingpin axis is the straight line connecting this imaginary lower pivot point with the upper pivot point formed by the upper end of the strut.

In this embodiment, the kingpin axis is set to pass through a point inside the tire ground contact surface of tire contact patch in the state in which the steering wheel 2 is at the neutral position, and the caster trail is set to lie inside the tire ground contact surface.

For example, the kingpin axis is so set that the caster angle is equal to 0 degree, the caster trail is equal to 0 mm, and the scrub radius is a positive scrub value greater than or equal to 0 mm. Moreover, the kingpin inclination is set in a range (smaller than or equal to 15 degrees, for example) to make the kingpin inclination small within the range capable of making the scrub radius positive.

With the thus-set suspension geometry, the suspension system can make smaller the trace or locus of the tire ground contact surface center during the steer operation, and reduce the tire twisting torque.

Therefore, the suspension system can reduce the rack axial force, hence reduce the moment about the kingpin axis, and reduce the output of steer actuator 8. Moreover, the suspension system can control the direction of the wheel with a smaller force, and thereby improve the stability and controllability.

In the suspension system 1B according to this embodiment, the two lower link members are arranged in the crossing state intersecting each other. In this structure, it is easier to dispose the imaginary lower pivot point on the inboard side of the tire ground contact surface center.

Therefore, it is easier to set the kingpin inclination at a value closer to 0 degree, and to increase the scrub radius on the positive scrub side.

Furthermore, despite of the possibility of the influence on the straightness in terms of the suspension structure, by the setting of the caster angle at 0 degree and the caster trail at 0 mm, the setting of the positive scrub reduces the influence. Moreover, the suspension system secures the straightness by adding the control with the steer actuator 8. Thus, the suspension system can improve the stability and controllability.

Furthermore, as to the limitation of the kingpin inclination to a predetermined range, with the steer operation of steer actuator 8, it is possible to avoid heavy feeling from being imparted to the driver. As to the kickback by an external force from the road surface, the suspension system can cope with the external force with steer actuator 8, and thereby avoid influence to the driver. Thus, the suspension system can improve the stability and controllability.

As mentioned above, the suspension system 1B according to this embodiment makes it possible to set the imaginary lower pivot point toward the inboard side in the vehicle widthwise direction because of the crossing arrangement of the lower link members intersecting each other in the vehicle top view. Furthermore, the kingpin axis defined by this imaginary lower pivot point is set so that the kingpin inclination is small, the kingpin axis passes through the tire ground contact surface or patch in the state of the steering wheel SW at the neutral position, and the caster trail is formed inside the tire ground contact surface or patch. Therefore, the suspension system can decrease the moment about the kingpin axis.

Therefore, the steering system can steer the wheels with a smaller rack axial force, and control the directions of the wheels with a smaller force, so that it is possible to improve the stability and controllability.

As the result of the decrease of the moment about the kingpin axis, the suspension system can reduce the load applied on the rack shaft 14 and tie rod(s) 15, so that it is possible to simplify the component parts.

Moreover, it is possible to use an actuator of lower driving ability as the steer actuator 8 realizing the steer-by-wire system SBW, and thereby to reduce the cost and weight of the vehicle.

For example, in comparison with a conventional steer-by-wire type suspension system, the construction according to the present invention makes it possible to reduce the weight by about 10%, and reduce the cost by about 50% mainly by simplifying the lower link members and reducing the size of steer actuator 8.

Moreover, the suspension system employs the structure to increase the caster trail at the time of steer operation.

Therefore, the suspension system can retrain an increase of the steer angle in a cornering operation producing a high lateral acceleration or side acceleration.

Furthermore, since the imaginary lower pivot point is moved to the inboard side by the action of the side force acting on the wheel at the time of steer operation, the scrub radius is increased, and the straightness by the self-aligning torque (SAT) can be improved.

With the crossing arrangement of the lower link members, the connection point of the lower link member can be placed near the wheel center, so that it is possible to reduce the weight of axle carrier 33.

Figure 12:
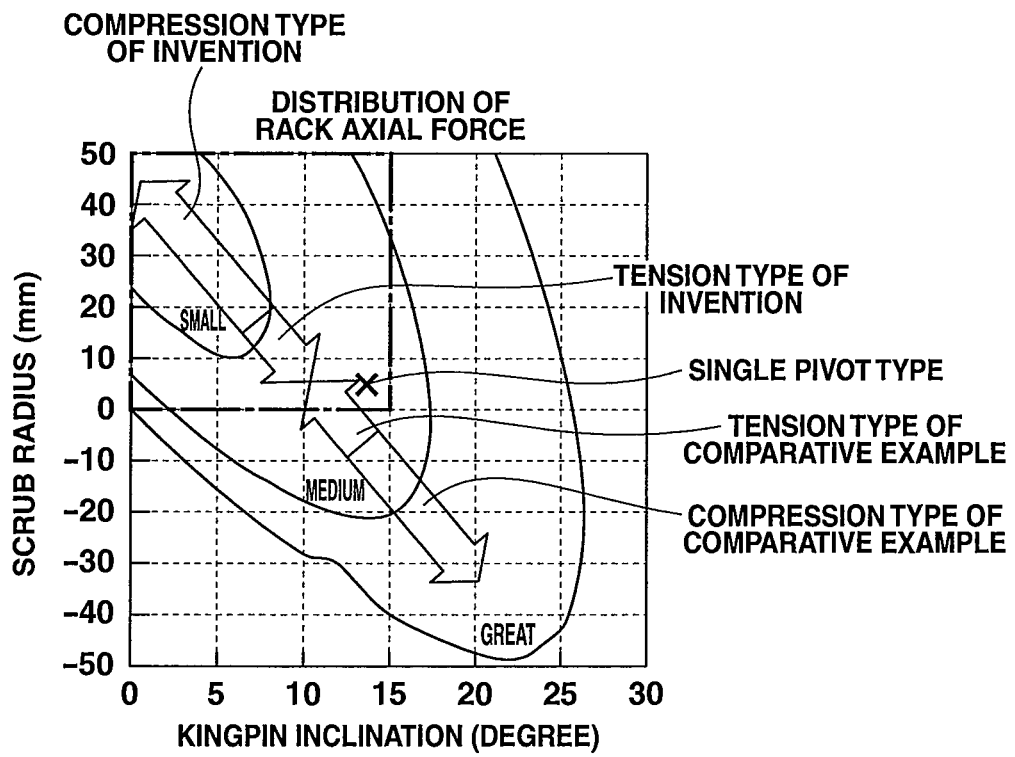
FIG. 12 is a view schematically showing a relationship between the kingpin inclination (angle) and the scrub radius.

FIG. 12 is a view schematically showing a relationship between the kingpin inclination (angle) and the scrub radius in this embodiment. FIG. 12 shows, in addition to the above-mentioned compression type arrangement according to this embodiment, a tension type arrangement according to this embodiment, and further shows, as comparative examples, compression type and tension type non-crossing arrangements of the non-crossing lower link members (see an application example 1) and a single pivot type arrangement.

As shown in FIG. 12, in the practical examples of the compression type and the tension type according to this embodiment, it is possible to set the kingpin inclination at an angle closer to 0 degree and to set the scrub radius at a greater value on the positive scrub side, in comparison with the single pivot type example and the double pivot type non-crossing comparative examples of the non-crossing lower link members.

Specifically, in the practical example of the compression type according to this embodiment, it is possible to obtain the higher effects in the effect of decreasing the kingpin inclination to zero degree and the effect of increasing the scrub radius on the positive scrub side.

The suspension system 1B according to this embodiment is applicable to the suspension system of other types other than the strut type.

Figure 13:
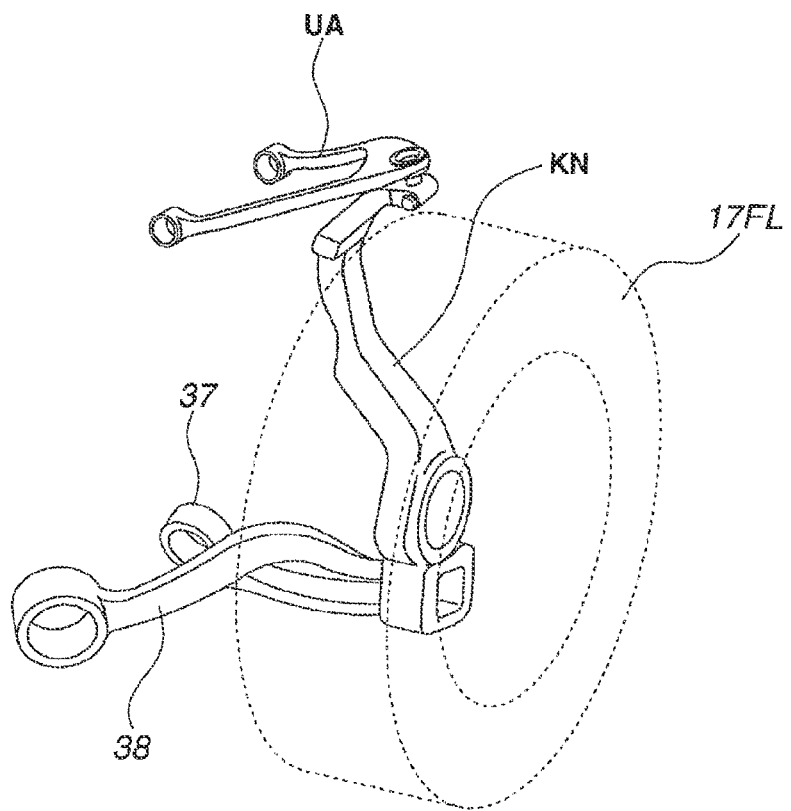
FIG. 13 is a view showing a construction example in which the first embodiment is applied to a suspension system having a knuckle.

FIG. 13 is a view showing a construction example in which this embodiment is applied to a suspension system having a knuckle.

In the example shown in FIG. 13, an upper end of a knuckle KN is connected with an upper arm member UA, and a second link (compression rod) 38 straddles a first link (tension rod) 37 and thereby forms the crossing arrangement of the first and second links intersecting each other in the vehicle top. The upper end of knuckle KN serves as the imaginary upper pivot point, and the intersection point between first link 37 and second 38 serves as the imaginary lower pivot point.

With this construction, like the strut type, the imaginary lower pivot point can be set closer to the inboard side toward the vehicle longitudinal center line in the vehicle widthwise direction. With the setting of the kingpin axis defined by this imaginary lower pivot point to pass through the tire ground contact surface at the neutral position of the steering wheel, and the caster trail located inside the tire ground contact surface, it is possible to decrease the moment about the kingpin axis.

Figure 14:
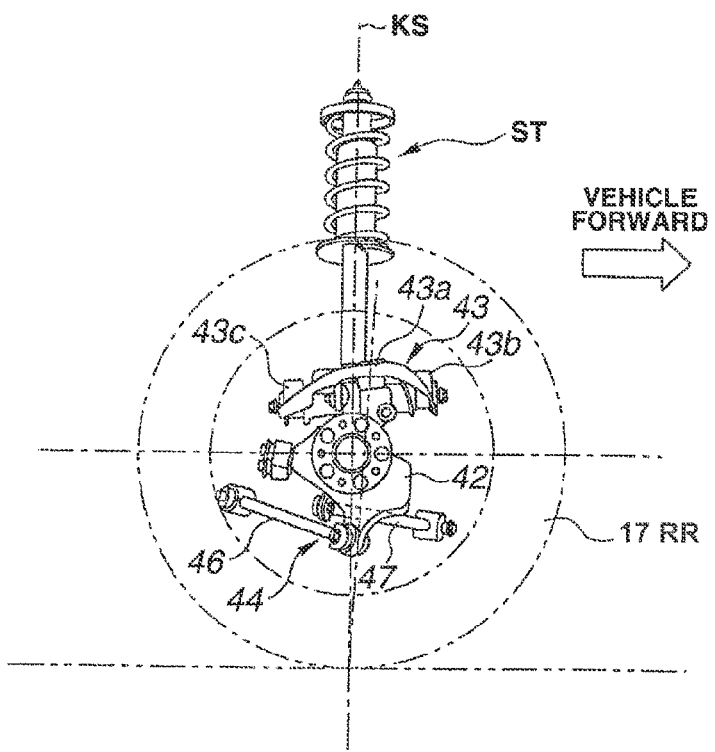
FIG. 14 is a side view showing the rear suspension apparatus 1B formed by a double wishbone type rear suspension system.
Figure 15:
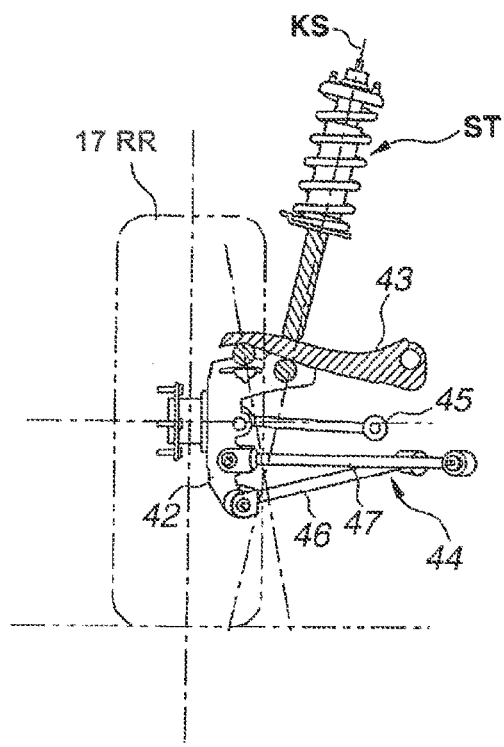
FIG. 15 is a front view of the rear suspension system of FIG. 14.
Figure 16:
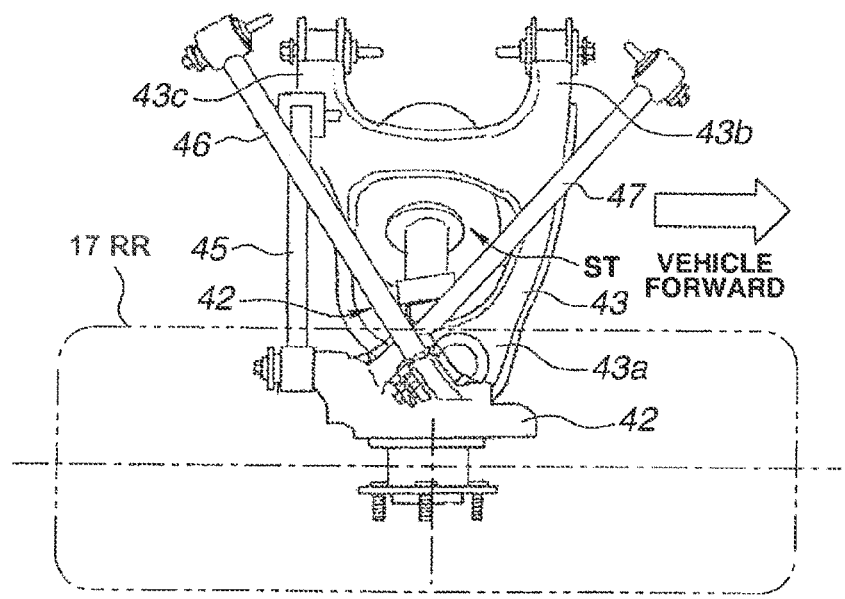
FIG. 16 is a bottom view of the rear suspension system of FIG. 14.

FIGS. 14~16 are views showing a construction example in which this embodiment is applied to a double wishbone type rear suspension system. FIG. 14 is a side view, FIG. 15 is a front view and FIG. 16 is a bottom view.

In the example shown in FIGS. 14~16, a hub carrier 42 supporting a rear wheel 17RR is supported by an upper link 43, a lower link 44 and a lateral link 45, and the suspension system has a five link construction.

The upper link 43 has an A arm construction surrounding a strut ST and including an apex portion 43 connected rotatably with an upper end portion of hub carrier 42, and two end portions 43b and 43c connected rotatably with a vehicle body member (not shown).

The lower link 44, as best shown in FIG. 16, has a crossing link arrangement of a second link (compression rod) 47 straddling a first link (tension rod) 46 at a position near the hub carrier 42 so that the first and second links intersect each other in the vehicle bottom view. In this construction, the connection point of upper link 43 on the upper end portion of hub carrier 42 serves as the imaginary upper pivot point and the intersection point between first and second links 46 and 47 serves as the imaginary lower pivot point.

Furthermore, the strut ST is connected rotatably with a projecting portion 42a which is formed in the upper end of hub carrier 42 and which projects toward the inboard side.

With this construction, like the strut type, the imaginary lower pivot point can be set closer to the inboard side toward the vehicle longitudinal center line in the vehicle widthwise direction, as shown in FIG. 15. With the setting of the kingpin axis defined by this imaginary lower pivot point to pass through the tire ground contact surface at the neutral position of the steering wheel, and the caster trail located inside the tire ground contact surface, it is possible to decrease the moment about the kingpin axis.

In this embodiment, wheels 17FR, 17FL, 17RR and/or 17RL correspond to the tire wheel, tire and wheel hub mechanism, the first link 37 corresponds to the first link member, and the second link 38 corresponds to the second link member. The rack shaft 14 corresponds to the steering rack.

(Concrete Construction Example(s) of the Control/Drive Circuit)

FIGS. 17~20 are views for illustrating a concrete construction example of the control/drive device 26.

Figure 17:
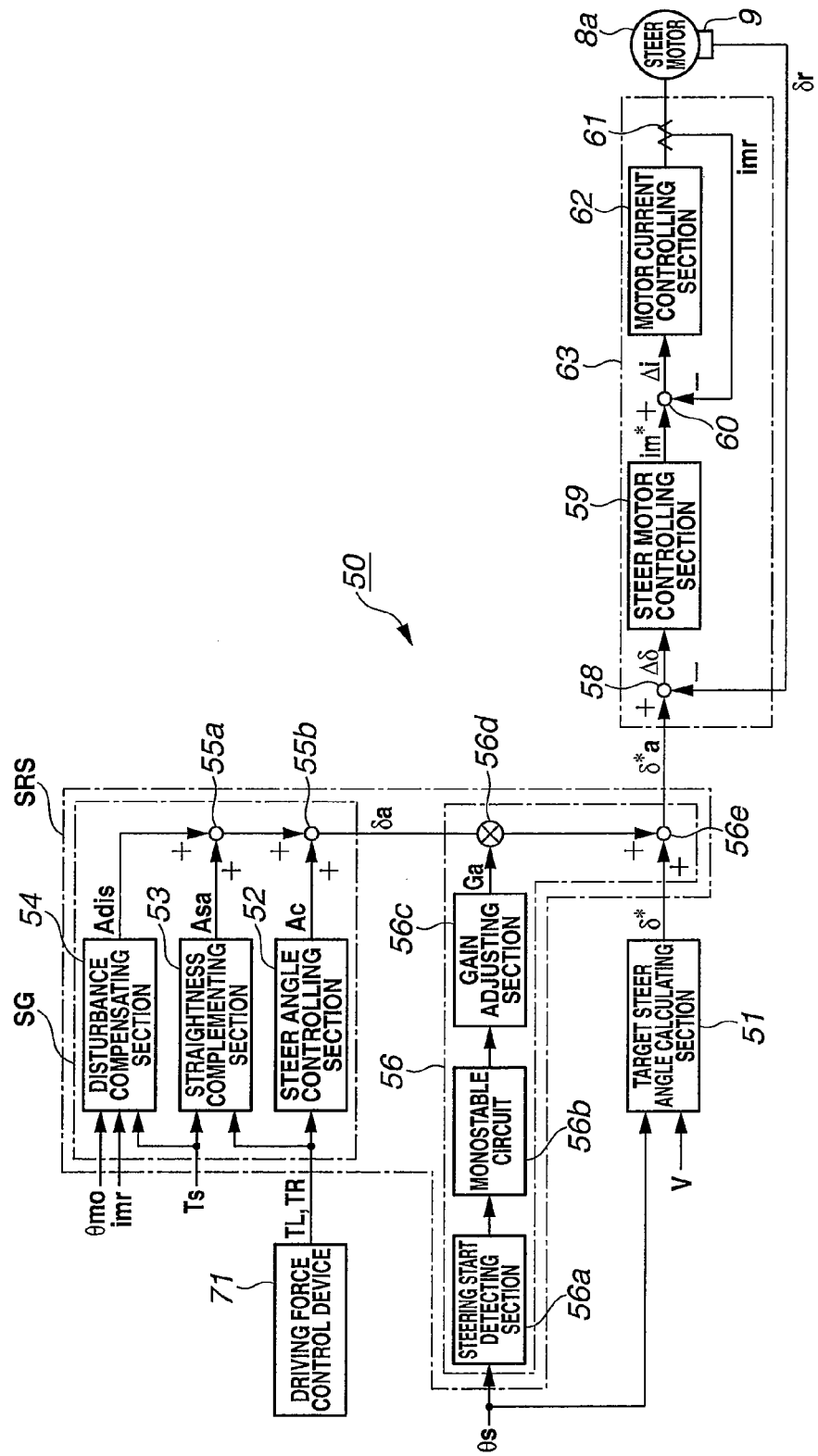
FIG. 17 is a block diagram showing a concrete example of a steer control apparatus of FIG. 1.

As shown in FIG. 17, the control/drive device 26 includes a steer control device 50 which includes a target steer angle calculating section 51, a steer angle controlling section 52, a straightness complementing section 53, a disturbance compensating section 54, a delay controlling section 56, a steer angle deviation calculating section 58, a steer motor controlling section 59, a current deviation calculating section 60 and a motor current controlling section 62.

The target steer angle calculating section 51 receives the vehicle speed V, and a steering angle θs sensed by the steering angle sensor 4 as inputs, and calculates a target steer angle δ* on the basis of these inputs.

Steer angle controlling section 52 calculates steer angle variations Δfl and Δfr of the steerable wheels 17FL and 17FR due to compliance steer. These steer angle variations Δfl and Δfr of the steerable wheels 17FL and 17FR are calculated, by calculation of following equations (1) and (2), from left wheel driving force TL and right wheel driving force TR outputted from a driving force controlling device 71 to control distribution of the driving forces of the left and right driving steerable wheels 17FL and 17FR, and a compliance steer coefficient of corresponding to deflection of bushes of the lower links 37 and 38. Then, steer angle controlling section 52 calculates a compliance steer control quantity or value Ac (=Δfl−Δfr) by calculating a variation difference between the calculated variations Δfl and Δfr.

$$\Delta fl = af \cdot TL \tag{1}$$

$$\Delta fr = af \cdot TR \tag{2}$$

Straightness complementing section 53 receives the wheel driving forces TL and TR of the left and right wheels outputted from the driving force controlling device 71 for controlling the wheel driving force distribution, and a steering torque Ts sensed by the steering torque sensor 5, as inputs. From these inputs, the straightness complementing section 53 calculates a self-aligning torque Tsa, and calculates a self-aligning torque control quantity or value Asa (=Ksa·Tsa), as a straightness securing quantity or value, by multiplying the calculated self-aligning toque Tsa by a predetermined steer angle correction gain Ksa.

Figure 18:
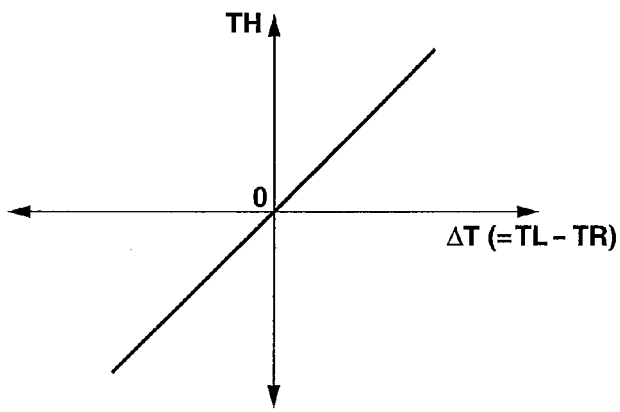
FIG. 18 is a view showing a generation torque control map for estimating the self-aligning torque.

In the calculation of self-aligning torque Tsam, the straightness complementing section 53 first calculates a driving force difference ΔT (=TL☐TR) between the left and right wheel driving forces TL and TR, and estimates a generation torque Th generated by torque steer phenomenon at the time of steer operation, by looking up in a generation torque estimation control map shown in FIG. 18, from the calculated driving force difference ΔT.

The generation torque estimation control map is set for a vehicle of the positive scrub having the scrub radius being set positive. As shown in FIG. 18, the driving force difference ΔT is represented along the horizontal axis, and the generation torque Th is represented along the vertical axis, and the characteristic of the map is so set that the generation torque Th is increased from zero in the direction to turn the vehicle rightwards (positive direction) in proportion to the driving force difference ΔT when the driving force difference ΔT increases from zero to the positive side, that is, when the left wheel driving force TL increases over the right wheel driving force TR.

When, on the other hand, the driving force difference ΔT increases from zero to the negative side, that is, when the right wheel driving force TR increases over the left wheel driving force TL, the generation torque Th is increased from zero in the direction to turn the vehicle leftwards (negative direction) in proportion to the driving force difference ΔT.

Then, the straightness complementing section 53 calculates the self-aligning torque Tsa by subtracting the generation torque Th from the steering torque Ts sensed by steering torque sensor 5.

The calculation of self-aligning torque Tsa is not limited to the above-mentioned calculation based on the left and right driving force difference ΔT. The self-aligning torque is Tsa can be calculated on the basis of the left and right braking force difference in the same manner.

Moreover, the self-aligning torque Tsa can be calculated by providing a yaw rate sensor for sensing a yaw rate γ of the vehicle, and a lateral acceleration sensor for sensing a lateral acceleration Gy of the vehicle, calculating a side force Fy from a derivative of the yaw rate and the lateral acceleration Gy according to the equation of vehicle motion, and multiplying the side force Fy by the pneumatic trail En.

Furthermore, it is possible to calculate the self-aligning torque Tsa from steering angle θs sensed by steering angle sensor 4 and vehicle speed V, by lookup into a control map, calculated by measurement or simulation, for representing a relationship between the steering angle θs of steering wheel 2 and self-aligning torque Tsa with vehicle speed V as parameter.

Disturbance compensating section 54 receives the steering torque Ts from steering torque sensor 5, the rotational angle θmo from steer actuator rotational angle sensor 9, a motor current imr from a motor current sensing section 61; estimates a disturbance inputted to the vehicle for each of frequency bands; and calculates a disturbance compensating quantity or value Adis for restraining the disturbance.

Disturbance compensating section 54 includes a plurality of disturbance estimating sections each using a model using the steering torque Ts which is a steering input inputted by the driver and the steer input inputted by the steer actuator 8 as control inputs, and an actual steering state quantity as a control quantity, and estimating a disturbance on the basis of a difference between a quantity or value obtained by causing the control inputs to pass through a low-pass filter or filters and a quantity or value obtained by causing the control quantity to pass through an inverse characteristic and the above-mentioned low pass filter, as disclosed in JP 2007-237840A. Each of the disturbance estimating sections separates a disturbance in each of frequency bands by using different cutoff frequencies of the low-pass filters.

The disturbance compensating quantity Adis calculated by disturbance calculating section 54 and the self-aligning torque control quantity Asa calculated by straightness complementing section 53 are added at an adder 55a. An adder 55b calculates a straightness securing control quantity δa by adding the addition output of this adder 55a and the compliance steer control quantity Ac calculated by steer angle control section 52, and supplies the straightness securing control quantity δa to the delay controlling section 56.

As shown in FIG. 17, the steer angle controlling section 52, straightness complementing section 53, disturbance compensating section 54 and adders 55a and 55b form a straightness securing or guaranteeing section SG. The straightness securing section SG and the delay control section 56 form a steering response setting section SRS.

As shown in FIG. 17, the delay control section 56 includes a steering start detecting section 56a, a monostable circuit 56b, a gain adjusting section 56c and a multiplier 56d.

Steering start detecting section 56a detects a timing of performing a right or left steering operation from a neutral state keeping a neutral position, by using the steering angle θs sensed by steering angle sensor 4, and delivers a steering start signal SS representing a start of a steering operation from the neutral state, to the monostable circuit 56b.

Monostable circuit 56b produces a control start delay signal held in an on state for a predetermined delay time, 0.1 sec., for example, on the basis of the steering start signal outputted from steering start detecting section 56a, and delivers the control start delay signal to gain adjusting section 56c.

Gain adjusting section 56c holds a control gain Ga at "0" while the control start delay signal is in the on state, sets the control gain Ga at "1" while the control start delay signal is in the off state, and delivers the thus-determined control gain Ga to the multiplier 56d.

The multiplier 56d receives the straightness securing control quantity δa outputted from the straightness securing section SG, multiplies the straightness securing control quantity δa by the control gain Ga, and supplies the result of the multiplication to an adder 56e to which the target steer angle δ* is inputted from the target steer angle calculating section 51.

Therefore, delay control section 56 sets the control gain Ga used for multiplication with the straightness securing control quantity δa at "0" to stop the straightness securing control for adding the straightness securing control quantity δa calculated by the straightness securing section SG, to the target steer angle δ* for the predetermined time, 0.1 sec, for example, upon detection of a start of the right or left steering operation from the neutral state at the steering start detecting section 56a. When the output signal of monostable circuit 56b is turned to the off state at the expiration of 0.1 sec, the gain adjusting section 56c sets the control gain Ga to "1" to start the straightness securing control of adding the straightness securing control quantity δa to target steer angle δ*.

While the steering operation of steering wheel 2 continues, the steering start detecting section 56a does not detect a start of steering from the neutral state, hence the monostable circuit 56b holds its output in the off state, and the gain adjusting section 56c sets the control gain Ga at "1". Therefore, the straightness securing control quantity δa calculated by straightness securing section SG is supplied directly to the adder 56e. As a result, the product Ga·δa of straightness securing control quantity δa and control gain Ga is added to the target steer angle δ* and the straightness securing control is performed.

Steer angle deviation calculating section 58 calculates a steer angle deviation Δδ by subtracting an actual steer angle δr outputted from the actuator rotational angle sensor 9 of the steer actuator 8a forming the actuator 8, from an after-addition target steer angle δ*a obtained by addition of the straightness securing control quantity δa to the target steer angle δ*, outputted from the adder 56e, and delivers the calculated steer angle deviation Δδ to the steer motor control section 59.

Steer motor control section 59 calculates a target drive current im* of steer motor 8a forming the actuator 8 so as to reduce the inputted angle deviation Δδ to zero, and delivers the calculated target drive current im* to the current deviation calculating section 60.

Current deviation calculating section 60 calculates a current deviation Δi by subtracting an actual motor drive current imr output from motor current sensing section 61 sensing the motor current supplied to steer motor 8a forming the actuator 8, from the inputted target drive current im*, and delivers the calculated current deviation Δi to the motor current control section 62.

Motor current control section 62 performs a feedback control to reduce the inputted current deviation Δi to zero, namely to cause the actual motor drive current imr to follow the target drive current im*, and to supplies the actual motor drive current imr to steer motor 8a.

The steer angle deviation calculating section 58, steer motor control section 59, current deviation calculating section 60, motor current sensing section 61 and motor current control section 62 form an actuator control section 63. This actuator control section or device 63 performs a control to make the rotation angle δr sensed by steer actuator rotation angle sensing section 9 sensing the rotational angle of steer motor 8a forming the steer actuator 8, equal to target steer angle δ*. Therefore, actuator control section 63 control the rotational angle δr to make the rotational angle δr equal to target steer angle δ* when the vehicle is in the straight traveling state and the target steer angle δ* becomes equal to "0". Consequently, the above-mentioned straightness securing section SG serves as a main straightness securing section, and the actuator control section 63 serves as a secondary straightness securing section.

(Operation of the Steer Control Device)

Figure 19A:
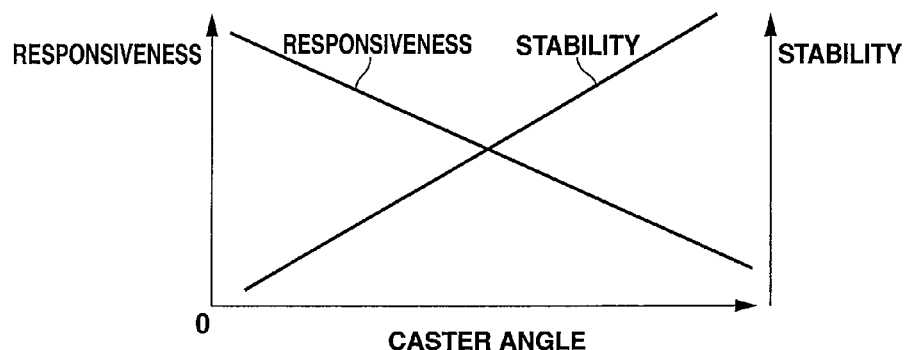
FIG. 19(a) is a view showing a relationship between the caster angle and the responsiveness and stability.
Figure 19B:
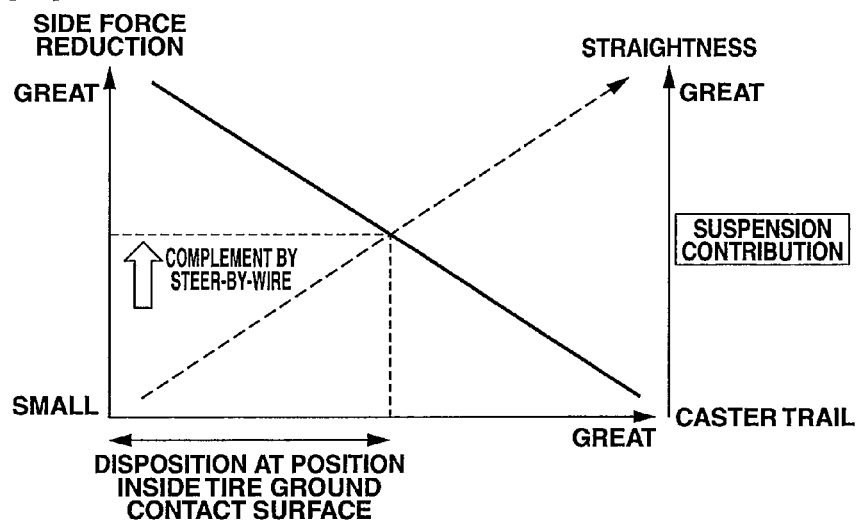
FIG. 19(b) is a view showing a relationship between the caster trail and the side force decrease and straightness.

Following is explanation on operation of the steer control device according to the first embodiment with reference to FIGS. 19 and 20.

In a straight running state in which steering wheel 2 is held at the neutral position and the vehicle is traveling straight, the target steer angle calculated at target steer angle δ* calculating section 51 is equal to zero. Since the steering wheel 2 is held at the neutral position, the driving forces or the braking forces are equal between the left and right steerable drive wheels 17FL and 17 FR. Therefore, the steer angle variations Δfl and Δfr due to the compliance steer, of steerable wheels 17FL and 17FR calculated at steer angle control section 52 according to the equations (1) and (2) are equal to each other. As a result, the compliance steer correction quantity Ac becomes equal to zero because the compliance steer correction quantity Ac is the difference obtained by subtracting variation Δfr from variation Δfl.

Likewise, since the driving forces TL and TR are equal to each other, and hence the driving force difference ΔT is equal to zero, the generation torque Th calculated at the straightness complementing section 53 by using the generation torque estimating control map shown in FIG. 18 becomes equal to zero. Furthermore, the steering toque Ts is equal to zero, the self-aligning torque Tsa is equal to zero and the self-aligning toque control quantity Asa is equal to zero since steering wheel 2 is not turned in the straight running state.

On the other hand, the disturbance compensating section 54 calculates the disturbance compensating quantity Adis for suppressing the disturbance. Therefore, the straightness securing control quantity δa is determined only by the disturbance compensating quantity Adis. The thus-determined straightness securing control quantity δa is supplied to the multiplier 56d of delay control section 56.

In this delay control section 56, the output of mono-stable circuit 56b remains in the off state since no steering start is detected by the steering start detecting section 56a. Therefore, the control gain Ga is set at "1" by gain adjusting section 56c, and this control gain Ga is supplied to multiplier 56d. From this multiplier, the straightness securing control quantity δa is supplied directly without modification to the adder 56e, and added to the target steer angle δ* which is equal to zero. Therefore, the after-addition target steer angle δ*a is determined by the disturbance compensating quantity Adis, and the steer angle of steer motor 8a is controlled so as to make the steer angle equal to the after-addition target steer angle δ*a. Consequently, the vehicle can be driven straight ahead with the influence of disturbance being removed.

When the front wheels 17FL and 17FR are steered by disturbance inputted from the road surface by a step in the road or a difference in the road surface friction coefficient between front wheels 17FL and 17FR, the steer actuator 8 is rotated. In accordance with this actuation of steer actuator 8, the rotation angle θmo sensed by steer actuator rotation angle sensor 9 is varied, and the disturbance compensating quantity Adis is varied in accordance with variation of this rotation angle θmo.

The control system controls the steer actuator 8 in accordance with disturbance compensating quantity Adis, and thereby produces a torque acting against the steer operation of steering system 1B caused by the road input. Thus, with the straightness securing section SG, the control system can secure the straightness of suspension system 1B.

When no disturbance is detected by disturbance compensating section 54 in the vehicle straight running state, the straightness securing control quantity δa calculated at straightness securing section SG is equal to zero, and the target steer angle δ* outputted from target steer angle calculating section 51 is also equal to zero. Therefore, the after-addition target steer angle δ*a outputted from adder 56e is also equal to zero.

Therefore, when a steer angle displacement is produced in the steer motor 8a constituting the steer actuator 8, the actuator control device 63 produces the motor current imr so as to cancel this steer angle displacement and thereby returns the steerable wheels 17FL and 17FR to the steer angle in the straight running state. Thus, actuator control device 63 can secure the straightness or straight running performance.

When steering wheel 2 is turned rightwards (or leftwards) from the neutral position in the straight running state, the steering start detecting section 56a detects a transition from the straight running state to a turning state caused by a steering operation.

Therefore, the monostable circuit 56b outputs the control delay signal held in the on state for the predetermined time, 0.1 sec, for example, to gain adjusting section 56c. Accordingly, gain adjusting section 56c sets the control gain Ga at "0" while the control delay signal remains in the on state. Therefore, the product output of the multiplier 56d is set at "0", and the output of the straightness securing control quantity δa to adder 56e is stopped.

Figure 20A:
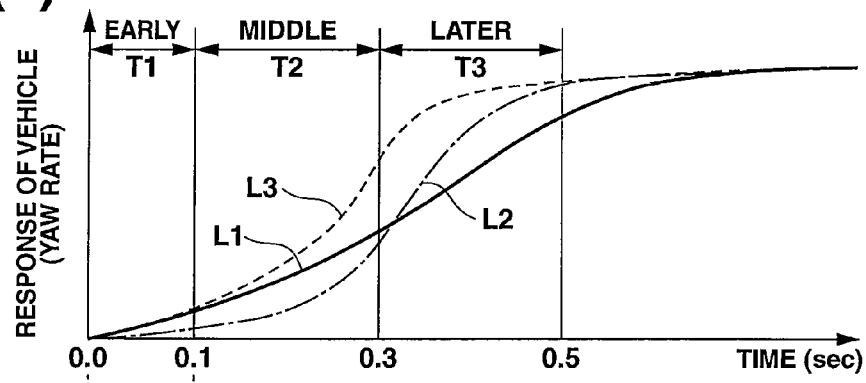
FIG. 20(a) is a characteristic diagram showing variation of a response characteristic of the vehicle.
Figure 20B:
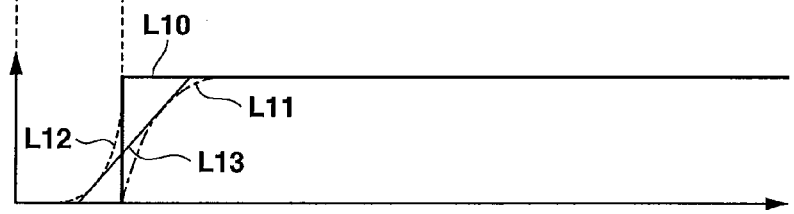
FIG. 20(b) is a view showing a switching timing of a control characteristic.

Therefore, during an early or initial response period T1 of 0.1 sec from the start of the steering operation of steering wheel 2 from the neutral position, the control gain Ga is held at "0", hence the product output of multiplier 56d is held at "0", and the straightness securing control to the target steer angle δ* is stopped as shown by a solid line in FIG. 20(b).

Accordingly, the steering angle θs sensed by steering angle sensor 4 is supplied to target steer angle calculating section 51, and the target steer angle δ* calculated at target steer angle calculating section 51 is supplied, directly without modification, to steer angle deviation calculating section 58. Therefore, the steer motor 8a is controlled to make the steer angle equal to the target steer angle δ*. During this, the straightness securing control at straightness securing section SG is stopped.

In the early response period T1, therefore, the steer operation is started by the suspension system in which the road surface contact point of the kingpin axis KS is set at the position of the center of the tire ground contract surface or patch and simultaneously the caster angle is set at zero.

In this case, the caster angle of suspension system 1B is set at zero. As shown in FIG. 19(a) showing a relationship the steer responsiveness or responsivity and the steering stability with respect to the cater angle, in the case of the caster angle being equal to zero, the steer responsiveness is high, but the steering stability is low or unobtainable. That is, there is a trade-off between the steer responsiveness and the steering stability with respect to the caster angle.

Therefore, in the initial or early stage or state from the start of the steering operation from the neutral position, the straightness securing control by the steer-by-wire control is not performed, and this initial steer operation is carried out by the suspension system 1B.

During the early response period T1, the caster angle in the suspension system 1B is equal to zero, as mentioned before, and the steering responsiveness is high. The steer response characteristic (yaw rate) can be made higher as shown by a solid characteristic line L1 shown in FIG. 20(a), than the steer response characteristic (yaw rate) of the vehicle having the ordinary steer-by-wire type suspension system shown by a characteristic line L2 of a one dot chain line. In this case, the steer angle is varied in accordance with the steering angle of steering wheel 2 varied by the driver, so that the suspension system does not provide an unnatural feeling to the driver.

If the steer operation is continued beyond the early response period T1 only by the steer responsiveness of the suspension system 1B, then the steer responsiveness of the vehicle becomes sensitive in a middle response period T2 and a later response period T3 as shown by a characteristic line L3 of a broken line in FIG. 20(a). Moreover, a phenomenon of the vehicle being involuted to the inner side is increased from the middle response period T2 to the later response period T3.

Therefore, as shown in FIG. 20(b), at the end of the early response period T1, at the expiration of 0.1 sec., for example, the straightness securing control to the target steer angle δ* is started in a manner of a step change by the straightness securing section SG constituted by the steer angle control section 52, straightness complementing section 53 and disturbance compensating section 54. Therefore, the steer control system restrains unsteadiness or fluctuation of the vehicle by restraining the steer responsiveness of the vehicle by the suspension apparatus 1B; at the same time complements the straightness of suspension apparatus 1B with the steer-by-wire control, as shown by a broken line in FIG. 20(b); and thereby secure the steering stability.

Then, at the end of the middle response period T2, after the expiration of 0.3 sec., for example, the control system can shift the steering characteristic to the understeer tendency by restraining the steer response characteristic more as compare to the steer response characteristic of the ordinary vehicle, with the straightness securing control by the straightness securing section SG. By so doing, the control system can improve the steering stability as shown by the characteristic line L1 of the solid line shown in FIG. 20(a), and realize the ideal vehicle steer response characteristic shown by the characteristic line L1.

As explained above, in the steering system according to this embodiment, it is possible to decrease the moment about the kingpin axis KS with the arrangement of first link 37 and second link 38 forming the lower links, being arranged to intersect each other in the vehicle top view as viewed from above, and the setting of kingpin axis KS being set to pass through the tire ground contact surface or patch in the neutral state in which the steering wheel is at the neutral position, and the caster trail being set inside the tire ground contact surface or patch.

Therefore, the first embodiment makes it possible to steer the wheels with a smaller rack axial force, and to control the directions of the wheels with a smaller force. Thus, the first embodiment can improve the maneuverability and stability.

Thus, in the first embodiment, the suspension apparatus 1B per se is arranged to improve the steer responsiveness at least with the kingpin axis KS being set to pass through the tire ground contact surface, and in addition to this arrangement, the straightness securing section SG of the steer-by-wire system SBW is configured to secure the straightness of suspension apparatus 1B by performing the steer angle control to control the steer characteristic, the straightness complementation and the disturbance compensation.

Therefore, when steering wheel 2 is turned rightwards or leftwards from the state of steering wheel 2 held at the neutral position, the suspension system secures the high responsiveness by utilizing the high steer responsiveness of the suspension apparatus 1B per se in the early response period T1. After the elapse of the early response period T1, in the middle response period T2 in which there is a need for setting weight on the steering stability rather than on the steer responsiveness, the control gain Ga is set at "1" by gain adjusting section 56c of delay control section 56 of the steer-by-wire system SBW, and thereby the straightness securing control is started with the straightness securing control quantity δa calculated at the straightness securing section SG.

Therefore, by starting the straightness securing control such as the steer angle control, straightness complementation and disturbance compensation, the suspension control system restrains the high steer responsiveness by the suspension apparatus 1B and secures the steering stability. Moreover, in the later response period T3, the steering system can shift the steering characteristic to the understeer tendency by lowering the steer responsiveness further so as to restrain the phenomenon of the vehicle being involuted to the inner side, thereby restrain vehicle fluctuation, and provide an ideal steer responsiveness control.

Furthermore, the steer angle control section 52 can be provided and configured to perform the straightness securing control in consideration of the displacement of steerable wheels 17FL and 17FR due to the compliance steer. Therefore, it is possible to set the bush stiffness at a weak level for the bushes disposed at the vehicle body 1A's side support portions of the first and second lower links 37 and 38, and to improve the riding comfort by decreasing the vibration transmitting degree from the road surface through first and second links 37 and 38 to the vehicle body 1A.

In the first embodiment, explanation is directed to the example in which the steer control device 50 is realized by a hardware configuration. However, this example is not a limitative example. For example, the target steer angle calculating section 51 and straightness securing section SG may be formed by a processing device such as a microcomputer, and this processing device may be configured to perform a steer control process as shown in FIG. 21, for example.

Figure 21:
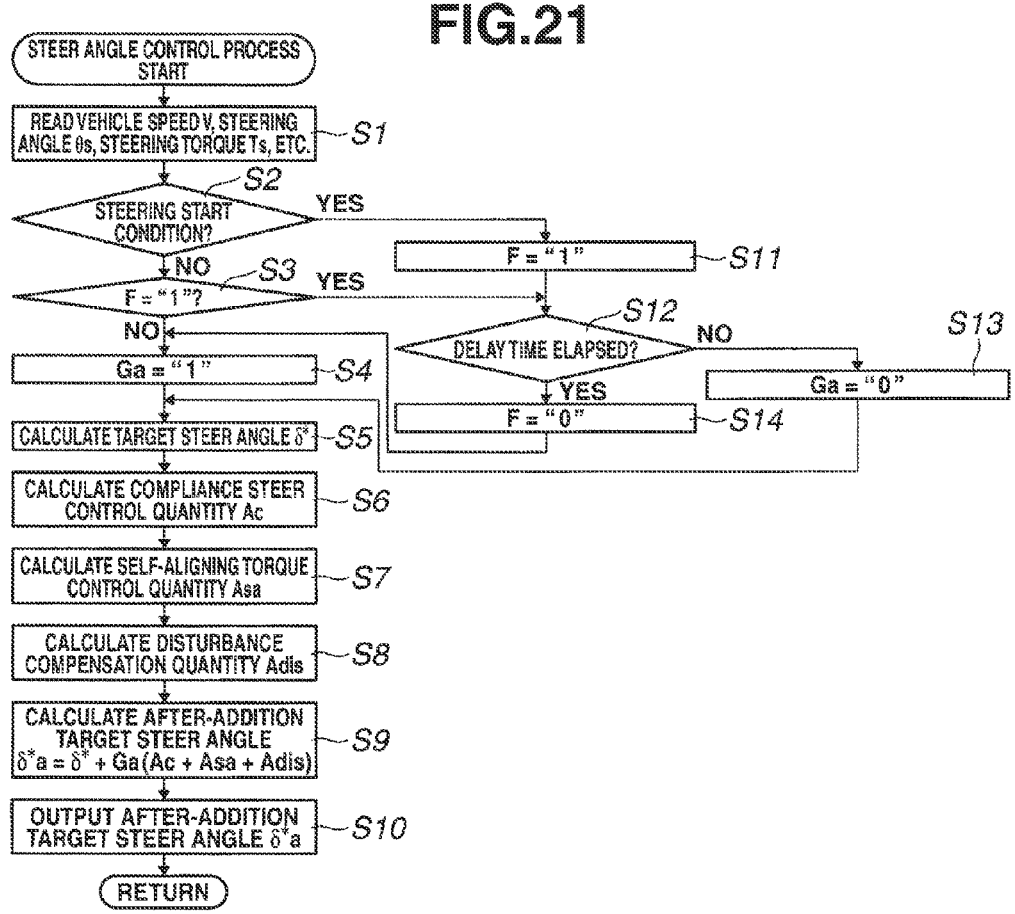
FIG. 21 is a flowchart showing an example of a steer angle control process.

In this steer control process, as shown in FIG. 21, first, at a step S1, the processing device reads data required for the calculating process, such as the vehicle speed V, steering angle θs sensed by steering angle sensor 4, rotation angle θmo sensed by actuator rotation angle sensor 9, left and right wheel driving forces TL and TR of driving force control device 71 and steering torque Ts sensed by steering torque sensor 5. Then, the processing device proceeds to a step S2, and examines whether the steering wheel 2 is turned from the state holding the neutral position leftwards or rightwards to detect the steering start condition, by examining the steering angle θs sensed by steering angle sensor 4. From S2, the processing device proceeds to a step S3 when the steering start condition is not detected.

At step S3, the processing device examines whether a control flag F representing a steering start control state is set at "1" or not. When control flag F is reset at "0", the processing device proceeds to a step S4, sets the control gain Ga to "1", and then proceeds to a step S5.

At the step S5, the processing device calculates the target steer angle δ* in accordance with vehicle speed V and steering angle θs, in the same manner as in target steer angle calculating section 51.

Then, at a step S6, like the steer angle control section 52, the processing device calculates the steer angle variations Δfl and Δfr of the steerable wheels 17FL and 17FR due to compliance steer by multiplying the left wheel driving force TL and right wheel driving force TR by the compliance steer coefficient af, and calculates the compliance steer control quantity or value Ac from these calculated variations.

Then, at a step S7, like the straightness complementing section 53, on the basis of the driving force difference ΔT (=TL□TR) between the left and right wheel driving forces TL and TR, the processing device estimates the generation torque Th generated by the torque steer phenomenon at the time of steer operation, by looking up in the generation torque estimation control map shown in FIG. 18. Then, the processing device calculates the self-aligning torque Tsa by subtracting the generation torque Th from the steering torque Ts, and calculates the self-aligning torque control quantity or value Asa by multiplying the calculated self-aligning toque Tsa by the predetermined gain Ksa.

Then, at a step S8, the processing device separates and estimates disturbances in the frequency bands inputted to the vehicle, respectively, and calculates the disturbance compensating quantity Adis to restrain these disturbances, in accordance with the motor rotation angle θmo from the steer actuator rotational angle sensor 9, the steering torque Ts and the motor current imr sensed by motor current sensing section 61.

Then, at a step S9, the processing device calculates the after-addition target steer angle δ*a from the target steer angle δ*, compliance steer control quantity Ac, self-aligning torque control quantity Asa and disturbance compensating quantity Adis, by calculation of a following equation (3)

$$\delta^*a = \delta^* + Ga(Ac + Asa + Adis) \quad (3)$$

Then, at a step S10, the processing device delivers the after-addition target steer angle δ*a calculated at S9, to the steer angle deviation calculating section 58 shown in FIG. 17. Thereafter, the processing device returns to step S1.

When the conclusion of step S2 indicates the detection of the steering start condition, the processing device proceeds to a step S11 and set the control flag F at "1". From S11, the processing device proceeds to a step S12. When the conclusion of step S3 is that the control flag F is set at "1", then the processing device proceeds directly to the step S12.

At this step S12, the processing device examines whether the predetermined delay time (0.1 sec, for example) has elapsed. When the predetermined delay time has not yet elapsed, the processing device proceeds to a step S13, and sets the control gain Ga at "0". From S13, the processing section proceeds to the step S5 and calculates the target steer angle δ*.

When the conclusion of step S12 indicates the expiration of the predetermined delay time (0.1 sec, for example), the processing device proceeds to a step S14, and resets the control flag F to "0". From S14, the processing device proceeds to the step S4 and sets the control gain Ga at "1".

With the steer command angle calculating process shown in FIG. 21, too, the control system performs the straightness securing control to add, to the target steer angle δ*, the straightness securing control quantity δa obtained by addition of the compliance steer control quantity Ac, self-aligning torque control quantity Asa and disturbance compensating quantity Adis in the absence of the steering start condition of a start of turning the steering wheel 2 leftwards or rightwards from the neutral position.

In the case of the steering start condition of the start of turning steering wheel 2 leftwards or rightwards from the neutral position, the control gain Ga is set at "0" and the straightness securing control is not performed until the elapse of the predetermined delay time. Therefore, only the target steer angle δ* is outputted to steer angle deviation calculating section 58 and the steer motor 8a of steer actuator 8 is driven in accordance with the target steer angle δ*. Therefore, the initial or early steer responsiveness is set at the level of the high steer responsiveness of the suspension apparatus per se, and the system can provide the high steer responsiveness.

After the elapse of the delay time, the control gain Ga is set at "1", and the rotation of steer motor 8a of steer actuator 8 is controlled in accordance with the sum obtained by addition to the target steer angle δ*, of the straightness securing control quantity δa obtained by addition of the compliance steer control quantity Ac, self-aligning control quantity Asa and disturbance compensating quantity Adis.

Therefore, the high response responsiveness of the suspension apparatus 1B is restrained, the straightness of suspension apparatus 1B is secured, and the steer response characteristic is set to an ideal form.

In the case of this steer control process, too, in the vehicle straight running state, the target steer angle δ* is equal to zero, and this target steer angle δ* is supplied to steer angle deviation calculating section 58 of FIG. 16, directly in the case of absence of disturbance. Therefore, the control system can secure the straightness with the actuator control device 63, in the same manner as mentioned before.

In the process of FIG. 21, step S5 corresponds to target steer angle calculating section 51, step S6 corresponds to steer angle control section 52, step S7 corresponds to straightness complementing section 53, steps S5~S7 correspond to the straightness securing section SG, steps S2~S4 and S11~S14 correspond to delay control section 56, and steps S2~S14 correspond to steer responsiveness setting section SRS.

In the first embodiment, the illustrated example employs the straightness securing section SG formed by the steer angle control section 52, straightness complementing section 53 and disturbance compensating section 54. However, the first embodiment is not limited to this example. It is optional to omit any one or two of the steer angle control section 52, straightness complementing section 53 and disturbance compensating section 54.

Effect of First Embodiment (1) On the lower side of the axle in the vehicle up and down direction or vertical direction, the first and second link members connecting the wheel hub mechanism and the vehicle body are arranged to intersect each other in the vehicle top view.

This arrangement makes it possible to place the imaginary lower pivot point closer to the vehicle body inner side din the vehicle widthwise or lateral direction, and thereby to decrease the moment about the kingpin axis.

Therefore, this arrangement enables a steer operation with a smaller rack axial force, to control the direction of the wheels with a smaller force, and thereby improve the controllability and stability of the vehicle.

(2) The vehicle body's side or inboard side connection points of the first and second link members are positioned on the rearward side or rear side of the axle in the vehicle front and rear direction of vehicle longitudinal direction.

This arrangement makes it possible to realize the prevent invention in the form of the compression type suspension apparatus.

(3) In the above-mentioned compression type suspension apparatus, the steering rack is positioned on the forward or front side of the axle in the vehicle front and rear direction.

Therefore, the wheel moves to the turning inner side at the time of a steer operation, and hence the axial force of the steering rack can be decreased.

(4) The vehicle suspension apparatus is arranged to suspend or support a steerable wheel steered by a steer-by-wire system.

Therefore, by utilizing the steer actuator of the steer-by-wire system, the control system can perform a control corresponding to the setting of the caster trail according to this embodiment, and thereby improve the controllability and stability.

(5) The kingpin axis having the lower pivot point at the intersection point between the first and second link members in the vehicle top view is arranged to pass through the tire ground contact surface or patch at the neutral position of the steering wheel.

This arrangement makes it possible to decrease the moment about the kingpin axis, to steer the wheels with a smaller rack axial force and to control the directions of the wheels with a smaller force. Thus, this arrangement can improve the controllability and stability.

(6) The lower link members for connecting the wheel and the vehicle body are arranged to intersect each other in the vehicle top view, and the imaginary lower pivot point is set at the intersection point between the link members.

With this arrangement, it is possible to set the imaginary lower pivot point at a position closer to the vehicle body inner side in the vehicle widthwise direction, and therefore, it is possible to decrease the moment about the kingpin axis.

(7) The vehicle suspension apparatus according to this embodiment is applied to the strut type suspension mechanism.

Therefore, it is possible to decrease the number of component parts constituting the suspension, and to facilitate the setting of the kingpin axis according to this embodiment.

(8) A vehicle suspension apparatus geometry adjusting method is a method of setting a road surface contact point of the kingpin axis KS to lie within the tire ground contact surface or patch in the state of the steering wheel at the neutral position.

This setting makes it possible to decrease the moment about the kingpin axis KS, to steer the wheel with a smaller rack axial force and to control the direction of the wheel with a smaller force.

Therefore, in this embodiment, it is possible to decrease the weight of the suspension apparatus and simultaneously to improve the controllability and stability of the vehicle.

(9) The vehicle suspension apparatus is arranged to suspend a steerable wheel to be steered by a steer-by-wire system.

Therefore, by utilizing the steer actuator of the steer-by-wire system, the control system can perform a control supplementing the straightness in accordance with the setting of kingpin axis and caster trail according to this embodiment, and thereby improve the stability and controllability.

(10) There are provided the steer control apparatus for steering the steerable wheel with the actuator in accordance with the steering condition of the steering wheel, and the suspension apparatus for supporting the steerable wheel to the vehicle body. The suspension apparatus includes first and second link members which are adapted to connect the wheel hub mechanism and the vehicle body on the lower side of the axle in the vehicle up and down direction, and which are arranged to intersect each other in a vehicle top view or in a plan view of the vehicle as viewed from above. Furthermore, the steer control apparatus includes a straightness securing section to secure a straightness of the suspension apparatus.

Therefore, this system makes it possible to decrease the moment about the kingpin axis, to steer the wheels with a smaller rack axial force and to control the directions of the wheels with a smaller force. Accordingly, the system can improve the steer response characteristic. With the setting of the caster angle close to zero, the suspension apparatus can be constructed with a further enhanced steer response characteristic. Furthermore, the straightness securing section can cope with a decrease of the straightness due to attainment of the steer response characteristic of the suspension apparatus.

(11) The straightness securing section forms the steer-by-wire system sensing a variation of a steering angle in an operation of turning the steering wheel, and including a steer actuator to steer the steerable wheel in accordance with the sensing result (Os) and an actuator control device to control the steer actuator.

Therefore, there is no need for providing the straightness securing section independently, so that the construction can be simplified.

Moreover, the straightness securing section can be constructed to includes the straightness securing section SG of the steer response characteristic setting section SRS, as a main straightness securing section, and the actuator control device 63, as a secondary straightness securing section. With this construction, it is possible to secure the straightness of the suspension apparatus reliably.

(12) By delaying the straightness securing control of the straightness securing section with a delay control section when the steering wheel is turned from the state holding the neutral position, the system secures the high steer response characteristic by the use of the steer responsiveness of the suspension apparatus per se for the initial response characteristic. Thereafter, the system adjusts the steer responsiveness of the suspension apparatus by the straightness securing control.

Therefore, when the steering operation is started from the neutral position, the system can provide a high steer response characteristic as the initial or early response characteristic. Thereafter, the system can provide an ideal steer response characteristic by adjusting the steer responsiveness of the suspension apparatus by the straightness securing control of the straightness securing section

(13) The straightness securing section secures the straightness by calculating the self-aligning torque.

Therefore, by using the self-aligning toque, the straightness securing section can secure the straightness decreased by maintenance of the high responsiveness of the suspension apparatus, and improve the stability and controllability.

(14) The straightness securing section is configured to estimate a compliance steer at least, and to correct a displacement of the steerable wheel.

Therefore, the system makes it possible to decrease the stiffness of a bush at the vehicle body's side support portion of the lower arm of the suspension apparatus, and improves the riding comfort of the vehicle.

(15) When a steering operation of turning the steering wheel from the state holding the neutral position is started, the steer responsiveness setting section of the steer-by-wire system sets the early steer responsiveness at the steer response characteristic of the suspension apparatus per se in the early or initial stage of the steering operation, and the straightness securing section of the steer-by-wire system starts the control securing the straightness of the suspension apparatus per se, of the steer actuator after the expiration of an initial set time period.

Therefore, the system can secure the high steer responsiveness of the suspension apparatus in the early steering, and performs the control securing the straightness of the suspension apparatus of the steer actuator with the straightness securing section after the expiration of the initial set time period, so that it is possible to obtain an ideal steer responsiveness.

(16) When a steering operation of turning the steering wheel is started from the neutral position, the steer response setting section sets a high steer responsiveness with the steer responsiveness of the suspension apparatus in an early steer state, and setting a required steer responsiveness by the straightness securing control of the straightness securing section in a steer state after the early steer state.

Therefore, by setting the suspension apparatus to have a high steer responsiveness, and securing the straightness of the suspension apparatus with the straightness securing section, it is possible to obtain the ideal steer response characteristic.

(17) The steer response setting section includes the delay control section to delay the straightness securing control by the straightness securing section when the steering operation to turn the steering wheel is started from the neutral position.

Therefore, by delaying the start of the straightness securing control by the straightness securing section, with the delay control section, the system can set the initial steer responsiveness at the high steer responsiveness of the suspension apparatus per se.

(18) The delay control section includes a gain adjusting section to adjust a start of the straightness securing control by the straightness securing section.

The gain adjusting section can set the gain to the straightness securing control quantity in the straightness securing control at "0" to exclude the straightness securing control, and start the straightness securing control by setting the gain at a value greater than 0, "1" for example. Therefore, with the gain adjusting section, it is easier to adjust the start of the straightness securing control.

(19) The delay control section starts the straightness securing control of the straightness securing section after a delay of 0.1 sec from a steering start timing of a steering operation of turning the steering wheel right or left from a state holding the neutral state.

Therefore, the system can utilize the high steer responsiveness of the suspension apparatus effectively as the initial steer responsiveness, starts the straightness securing control of the straightness securing section after the elapse of the initial period of 0.1 sec, and thereby provide a satisfactory steer responsiveness.

(20) When the straightness securing control by the straight securing section is to be started, the delay control section starts the straightness securing control in a manner like a step. Therefore, the control system can adjust the steer responsiveness by the steer angle control and the straightness complementation immediately at the control start timing.

(21) When the straightness securing control by the straight securing section is to be started, the delay control section starts the straightness securing control gradually. Therefore, the control system can vary the steer responsiveness smoothly at the control start timing, and prevent unnatural feeling different from actual steering feeling from being imparted to the driver.

(22) The steer control apparatus comprises: a target steer angle calculating section to calculate a target steer angle in accordance with a steering angle; an adder to add, to the target steer angle calculated by the target steer angle calculating section, a straightness securing control quantity of the straightness securing section; a steer motor control section to produce a motor command current to make a rotation angle of a steer motor forming the steer actuator equal to an addition output of the adder; and a current control section to produce a motor drive current to be supplied to the steer motor so that the motor drive current becomes equal to the motor command current.

Therefore, the target steer angle calculating section calculates the target steer angle in accordance with the steering angle of the steering wheel; the adder adds, to the target steer angle, the straightness securing control quantity; the steer motor control section produces the motor command current to make the rotation angle of the steer motor forming the actuator equal to the addition output of the adder; and the motor current control section produces the motor drive current to follow the motor command current. The target steer angle outputted from the target steer angle calculating section is adjusted by the steer responsiveness control section, so that an optimum steer control can be performed.

(23) When the steering wheel is turned from the neutral position, the high steer responsiveness of the suspension apparatus is set as the initial steer responsiveness in the early or initial steer stage, and the steer responsiveness of the suspension apparatus is adjusted to a required steer responsiveness by the straightness securing control of the straightness securing section after the early steer stage.

Therefore, when the steering wheel is turned from the neutral position, it is possible to obtain the ideal steer responsiveness with the high steer responsiveness of the suspension apparatus, and the adjustment of the steer responsiveness by the straightness securing control of the straightness securing section.

Application Example 1

(Further Concrete Construction Example of Suspension Apparatus 1B)

In the first embodiment, the concrete construction of the suspension apparatus 1B is explained by the use of the example of the compression type. However, it is possible to employ the following construction.

Figure 22:
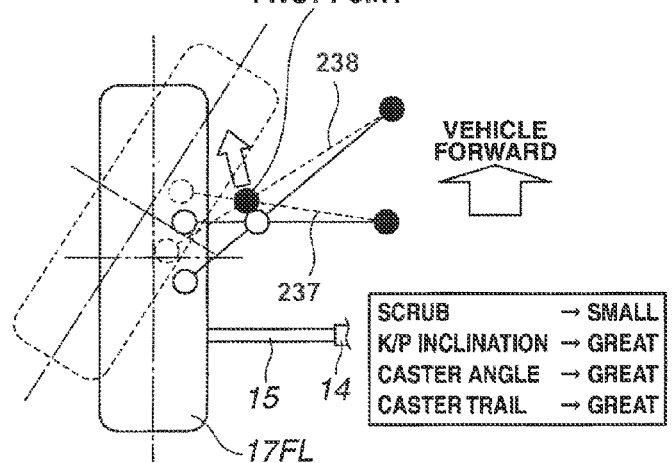
FIG. 22 is a schematic view showing an example in which the suspension apparatus 1B is constructed with a tension type suspension system.

FIG. 22 is a schematic view showing an example constructing the suspension apparatus 1B with a suspension apparatus of a tension type (the type in which the vehicle body's side connection points of the lower link members are located on the front side of the axle in the vehicle top view).

In the example shown in FIG. 22, in the vehicle top view, a transverse rod (the first link 237) extends along the axle on the front side of the axle, and a tension rod (the second link 238) is extended forwards from the axle and connected with the vehicle body at a position on the front side of the axle. Therefore, the vehicle body's side or inboard side connection or mounting positions of the transverse rod (first link 237) and the tension rod (second link 238) are located on the front side in the vehicle front and rear direction or vehicle longitudinal direction.

As shown in FIG. 22, in the arrangement of the double pivot type in which the lower link members are arranged to intersect each other in the tension type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension system can set the imaginary lower pivot point at the position on the vehicle body inner side or inboard side as compared to the non-crossing type suspension arrangement in which the lower link members do not intersect. Therefore, this suspension arrangement can make the initial scrub radius greater in the positive scrub direction.

In the tension type suspension system shown in FIG. 22, because the rotation angle of the tension rod is great in the steer operation, the imaginary lower pivot point is shifted to the outboard side. In this case, in the vehicle top view, the distance from the tire center line to the imaginary lower pivot point in the vehicle front and rear direction or longitudinal direction is moved in the outboard direction from the tire center line, and therefore the scrub radius becomes smaller within the range of the positive scrub. Therefore, in the tension type suspension system, when this embodiment is applied, the rack axial force is increased by the steer operation as the turning outer wheel. However, because the initial scrub radius in the state of no steer operation is set at a sufficiently great value, the rack axial force is set at a small value as compared to the non-crossing tension type suspension arrangement in which the lower link members do not intersect.

In the case of the tension type suspension arrangement in which the lower link members do not intersect, because the rotation angle of the tension rod is great in the steer operation, the imaginary lower pivot point is shifted to the inboard side. In this case, in the vehicle top view, the distance from the tire center line in the tire front and rear direction to the imaginary lower pivot point is located on the inboard side of the tire center line, and therefore the scrub radius becomes greater in the direction to the negative scrub. Therefore, the rack axial force is decreased by the steer operation. However, since the imaginary lower pivot point is located on an extension of each link, the scrub radius in the initial state with no steer operation is small, and it is not easy to decrease the rack axial force largely.

Furthermore, in the example shown in FIG. 22, in the vehicle top view, the wheel center is moved to the outer side of the vehicle turning motion at the time of steer operation. Therefore, the suspension system can enhance the effect of reducing the rack axial force with the arrangement placing the rack shaft 14 on the rear side of the axle as in this embodiment.

The present invention is applicable alike to suspension apparatus having link structures other than the above-mentioned compression type and the tension type.

(Effect)

(1) The vehicle body's side connection points of the first and second link members are disposed on the front side of the axle in the vehicle front and rear direction. Therefore, it is possible to realize the present invention in the form of the tension type suspension apparatus.

(2) In the above-mentioned tension type suspension apparatus, the steering rack member is disposed on the rear side of the axle in the vehicle front and rear direction. Therefore, the wheel is shifted to the turning outer side at the time of steer operation, and the axial force of the steering rack can be decreased.

Application Example 2

Although the first embodiment is explained by the use of the example in which the suspension apparatus 1B is applied to the suspension system for the steerable front wheels, the suspension apparatus 1B is applicable also to the suspension system for non-steerable rear wheels.

In this case, when the vehicle is brought by a steer operation into a turning state, and the side or lateral force is applied to the rear wheel, the tension rod 238 of FIG. 22 and compression rod 38 of FIG. 8 are bent by the side force, the intersection point of these rods in the vehicle top view is moved, and the direction of the wheel is changed with respect to the vehicle body (cf. FIG. 8 and FIG. 22). Namely, the lower link member extending along the axle is small in the amount of movement in the front and rear direction by the side force, and the other lower link member disposed obliquely with respect to the axle to have an angle in the front and rear direction is large in the amount of movement in the front and rear direction by the side force. By utilizing this characteristic, it is possible to realize an intended compliance steer.

(Effect)

The first and second link members for connecting the wheel hub mechanism and the vehicle body are arranged to intersect each other in the vehicle top view, on the lower side of the axle in the vehicle up and down direction.

Therefore, the link members are bent by the side force at the time of turning, the intersection point of the link members in the vehicle top view is shifted and therefore the direction of the wheel can be changed with respect to the vehicle body. Consequently, it is possible to realize the intended compliance steer.

Application Example 3

Although the first embodiment is explained by the use of the example in which the suspension apparatus 1B is applied to the suspension system for the steerable front wheels, the suspension apparatus 1B is applicable also to the suspension system for steerable rear wheels.

In this case, too, the imaginary lower pivot point can be shifted to the vehicle inboard side in the vehicle widthwise or lateral direction as in the first embodiment. Furthermore, the kingpin axis defined by this imaginary lower pivot point is set to pass through the tire ground contact surface or patch at the neutral position of the steering wheel, and the caster trail is set to lie within the tire ground contact surface or patch. Therefore, it is possible to decrease the moment about the kingpin axis. Therefore, it is possible to steer the wheels with a smaller rack axial force, control the direction of the wheels with a smaller force and thereby improve the controllability and stability.

Application Example 4

In the first embodiment, the kingpin axis is set to pass through the tire ground contact surface at the neutral position of the steering wheel, the caster trail is set within the tire ground contact surface, and as an example, the caster trail is set at a value close to zero.

By contrast to this setting, in this application example, the position through which the kingpin axis passes or the setting condition of the caster trail is limited to the range from the center of the tire ground contact patch to the front end of the tire ground contact patch.

(Effect)

In the case of the arrangement of setting the position through which the kingpin axis passes or the caster trail in the range from the center of the tire ground contact patch to the front end of the tire ground contact patch, it is possible to attain the securement of the straightness and the reduction of the heaviness of steering operation simultaneously, and thereby to improve the controllability and safety.

Application Example 5

In the first embodiment, the region surrounded by the one dot chain line in the coordinate plane shown in FIG. 7 is selected as an example of the region adequate for setting. By contrast, it is possible to set, as the adequate setting region, an inside region (in the decreasing direction of the kingpin inclination and the increasing direction of the scrub radius) inside a range represented by a boundary line determined by an isoplethic line which is used as the boundary line and which is an equal-value line of a rack axial force to which attention is paid.

(Effect)

It is possible to assume a greatest value of the rack axial force and to set the suspension geometry within the range smaller than or equal to the greatest value of the rack axial force.

Application Example 6

Figure 23:
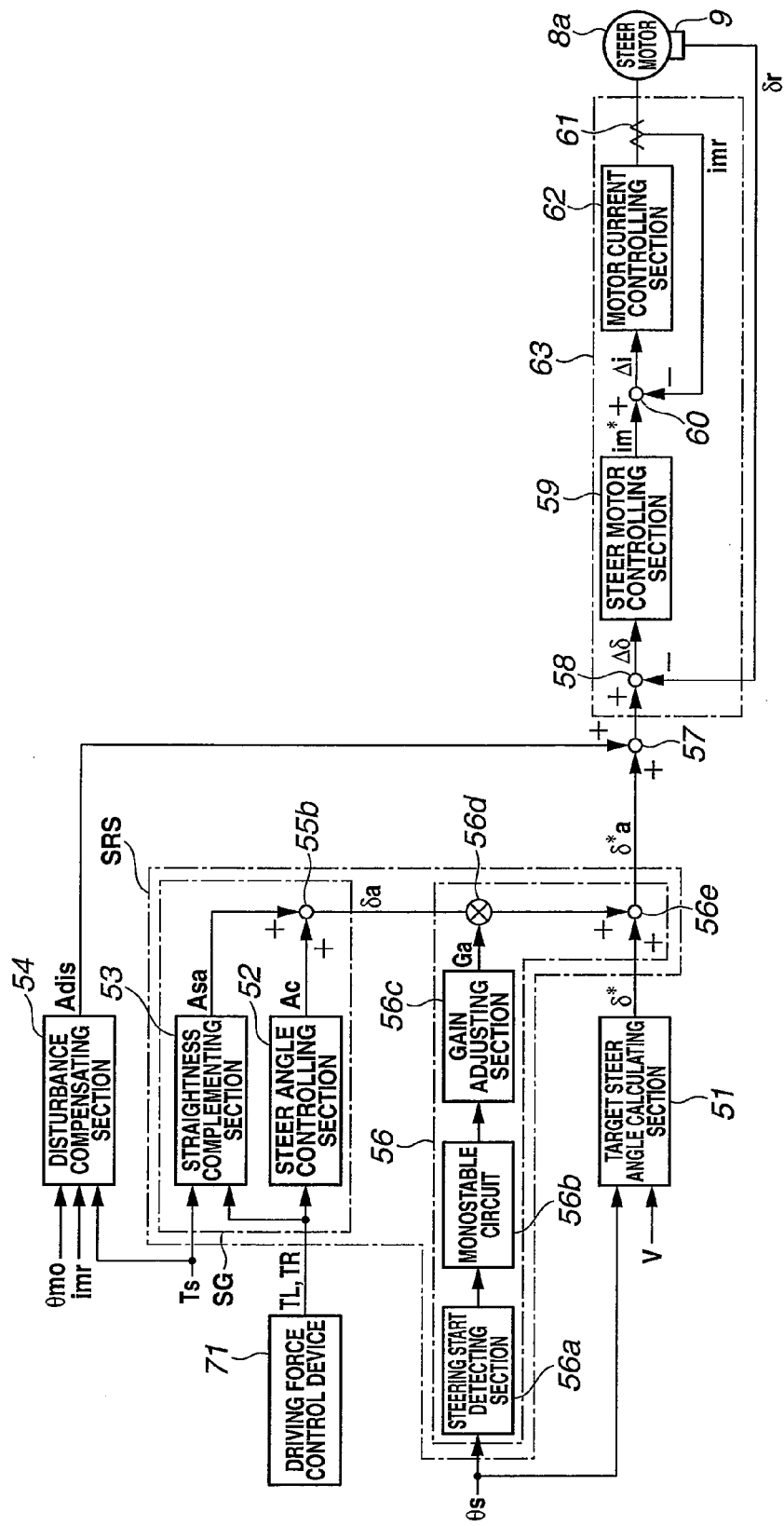
FIG. 23 is a block diagram showing a variation example of the steer control section in the first embodiment.

In the example explained in the first embodiment, the disturbance compensating section 54 is provided in the straightness securing section SG. However, the present invention is not limited to this configuration. It is possible to employ a configuration shown in FIG. 23. In the configuration shown in FIG. 23, the disturbance compensating section 54 is provided independently from the straightness securing section SG, and configured to output the disturbance compensating quantity Adis to the adder 57 which adds the disturbance compensating quantity Adis to the after-addition target steer angle δ*a outputted from the adder 56e.

(Effect)

In this configuration, the disturbance compensating quantity Adis is always added to the target steer angle δ*. Therefore, the control system can restrain influence of the disturbance always irrespectively of whether the steering start state is detected or not.

Application Example 7

In the example used to explain the first embodiment, the straightness securing section SG is formed by steer angle control section 52, straightness complementing section 53 and disturbance compensating section 54, and the control system is configured to input the target steer angle δ* directly to the steer angle deviation calculating section 58 without performing the straightness securing control of adding the straightness securing control quantity δa to the target steer angle δ* during the early response period T1 in the steering start condition to start the steering operation leftwards or rightwards from the state keeping the neutral position.

However, the present invention is not limited to the above-mentioned configuration. In the steering start state to start a leftward or rightward steering operation from the neutral state, in some case, there arises a rotational angle difference between the steering angle θs sensed by steering angle sensor 4 and the rotational angle θmo sensed by steer actuator rotation angle sensor 9. In this case, it is desirable to produce a torque, with the steer actuator 8, for compensating the rotational angle difference between the steering angle θs and rotation angle θmo, to secure the straightness.

Figure 24:
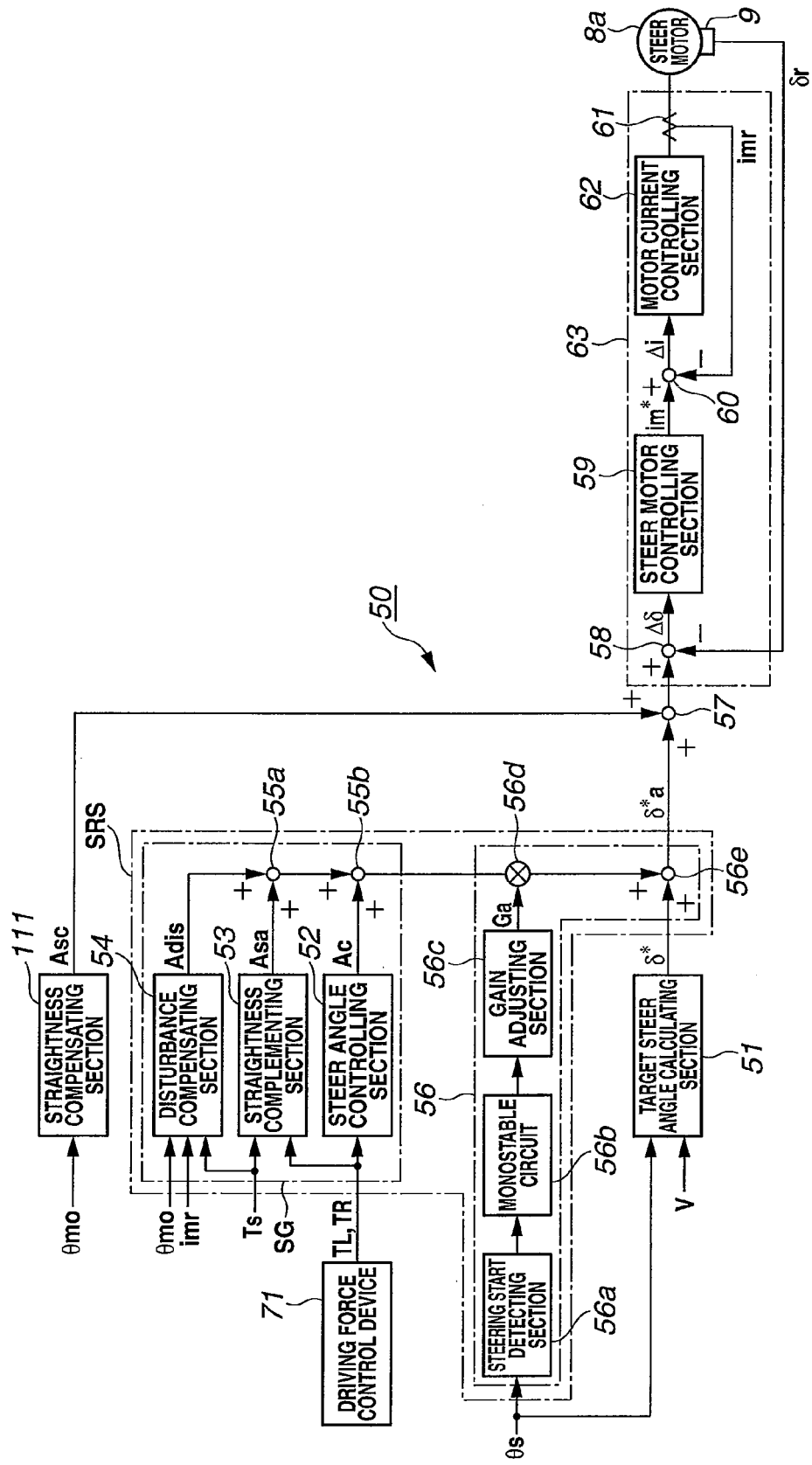
FIG. 24 is a block diagram showing another variation example of the steer control section in the first embodiment.

Therefore, as shown in FIG. 24, it is desirable to provide a straightness compensating section 111 independently from the straightness securing section SG. A straightness compensating quantity or value Asc outputted from this straightness compensating section 111 is added, by the adder 57, to the after-addition target steer angle δ*a outputted from adder 56e.

In one configuration of straightness compensating section 111, the straightness compensating section 111 calculates the actual steer angle from the rotation angle θmo of steer actuator 8 sensed by steer actuator rotation angle sensor 9, and calculates the straightness compensating quantity Asc corresponding to the actual steer angle by lookup into a control map representing a predetermined relationship between the actual steer angle and the straightness compensating quantity Asc.

In another configuration of straightness compensating section 111, the straightness compensating section 111 determines the rack axial force of rack shaft 14, by using a rack axial force sensor such as a strain gauge, or by estimation of the rack axial force, and calculates the straightness compensating quantity Asc by lookup into a control map representing a predetermined relationship between the rack axial force and the straightness compensating quantity Asc.

In still another configuration of straightness compensating section 111, the straightness compensating section 111 calculates the actual steer angle from the rotation angle θmo of steer actuator 8 sensed by steer actuator rotation angle sensor 9, and add the straightness compensating quantity Asc which is a predetermined constant value, to the after-addition target steer angle δ*a at adder 57 when the calculated actual steer angle is within a range equal to or smaller than a predetermined value, on both sides of the neutral position set at the center.

(Effect)

In this case, when the rotational angle difference is produced between steering angle θs sensed by steering angle sensor 4 and rotation angle θmo sensed by steer actuator rotation angle sensor 9 in the steering start state starting a leftward or rightward steering operation from the neutral state, it is possible to produce a torque to compensate the rotational angle difference between steering angle θs and rotation angle θmo, with steer actuator 8, to secure the straightness.

Application Example 8

In the example explained in the first embodiment, the straightness securing control to add the straightness securing control quantity δa to target steer angle δ* is started immediately in a manner shown by a step-shaped characteristic line L10 at the end of the initial period.

However, the present invention is not limited to this. As shown by a characteristic line L12 shown by a one-dot chain line in FIG. 20(b), it is possible to start the straightness securing control by increasing the straightness securing control quantity δa gradually after the elapse of the initial period. Moreover, as shown in FIG. 20(b), it is possible to start the straightness securing control by increasing the straightness securing control quantity δa gradually along a linear characteristic line L13 of a constant slope.

To vary the slopes of these characteristic lines, it is possible to adjust the slope by varying the control gain Ga with the passage of time, instead of changing the control gain Ga between "0" and "1" with the gain adjusting section 56c.

(Effect)

In these cases, the control system can increase the straightness securing control quantity of the straightness securing control by the steer-by-wire system SBW, gradually and thereby start the straightness securing control stably and smoothly by restraining a great change in the straightness securing quantity.

Variation Example of the First Embodiment

In the example explained in the first embodiment, the gain adjusting section 56c of delay control section 56 sets control gain Ga equal to "0" during the early period T1 in the steering start state of start of a steering operation from the neutral state in which steering wheel 2 is held at the neutral position, and sets control gain Ga equal to "1" in the other periods. However, the present invention is not limited to above-mentioned configuration. It is optional to set the control gain Ga equal to "1" during the early period T1, sets control gain Ga equal to "0.8", for example, during the middle and later periods T2 and T3 after the elapse of the early period T1, sets control gain Ga equal to "1" in the other period, and thus vary the mode of the straightness securing control of suspension apparatus 1B in accordance with the vehicle running condition.

Second Embodiment

Following is explanation on a second embodiment of the present invention.

A motor vehicle 1 according to the second embodiment is the same in function and construction as FIG. 1 in the first embodiment. Motor vehicle 1 according to the second embodiment is different in the construction of suspension apparatus 1B, from the first embodiment.

Therefore, the following explanation is directed to the construction of suspension apparatus 1B.

Figure 25:
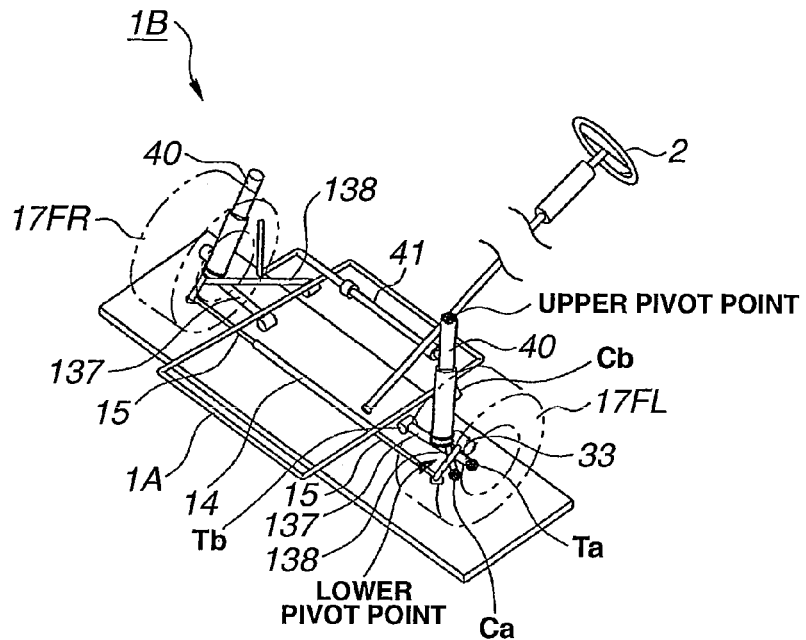
FIG. 25 is a perspective view schematically showing the construction of a suspension apparatus 1B according to a second embodiment.
Figure 26:
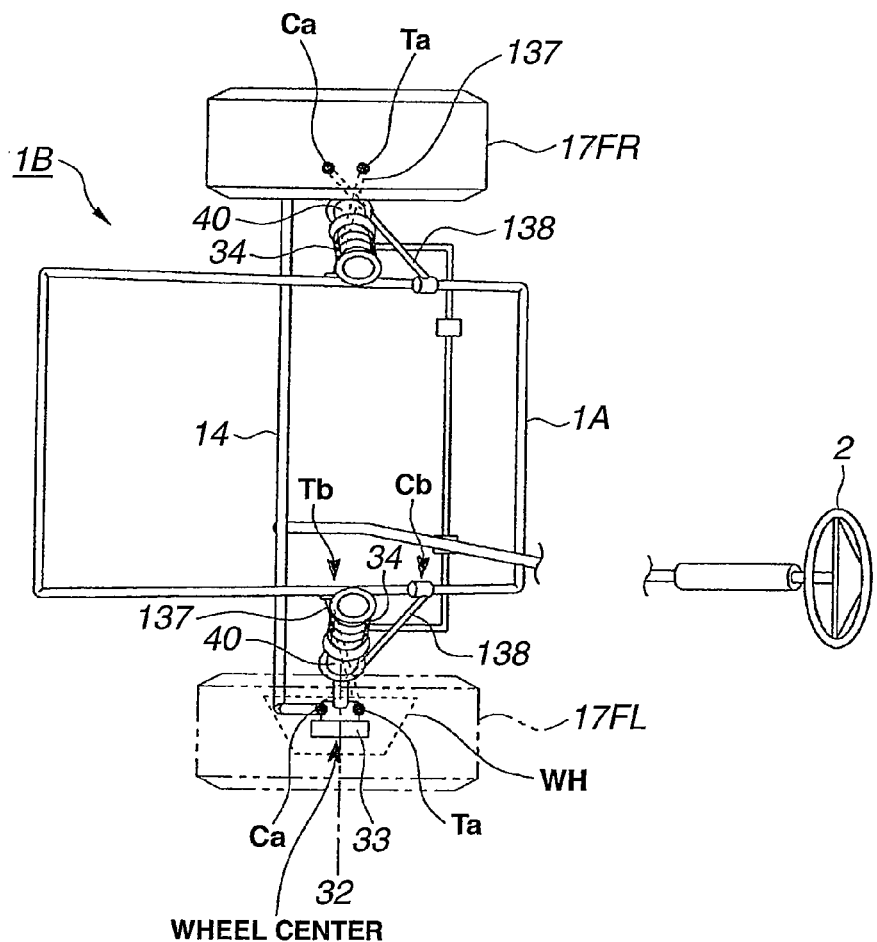
FIG. 26 is a plan view schematically showing the construction of the suspension apparatus 1B of FIG. 25.
Figure 27A:
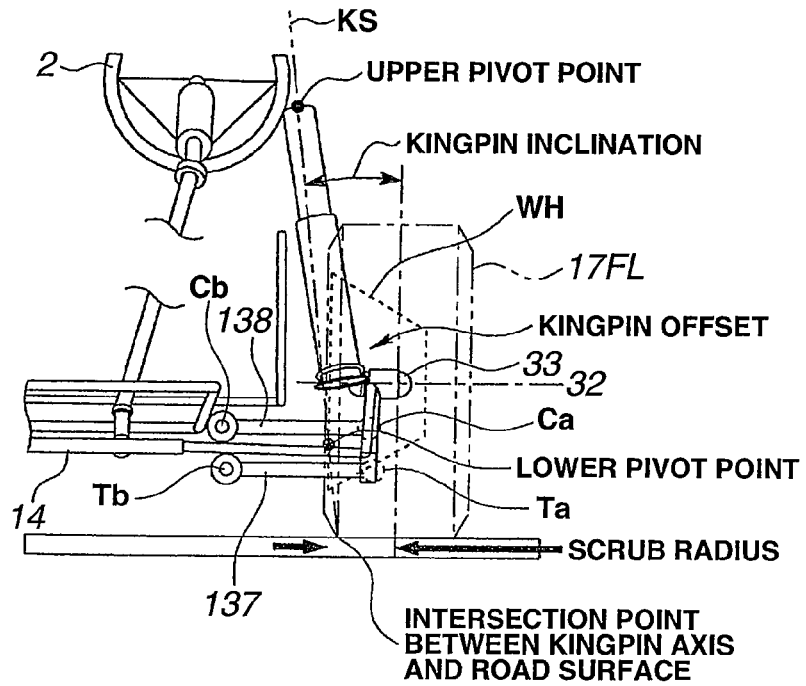
FIGS. 27(a) and 27(b) show a partial front view and partial side view schematically showing the construction of the suspension apparatus 1B of FIG. 25.
Figure 27B:
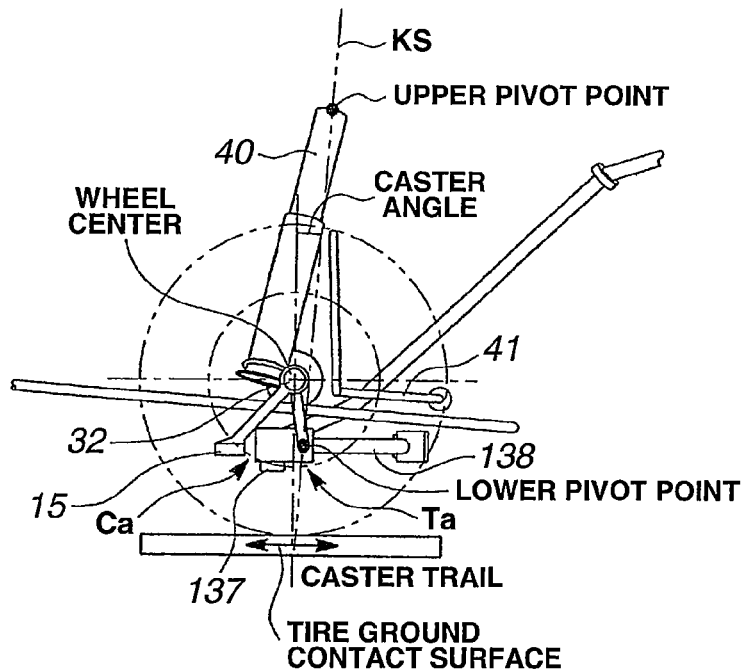
Figure 28A:
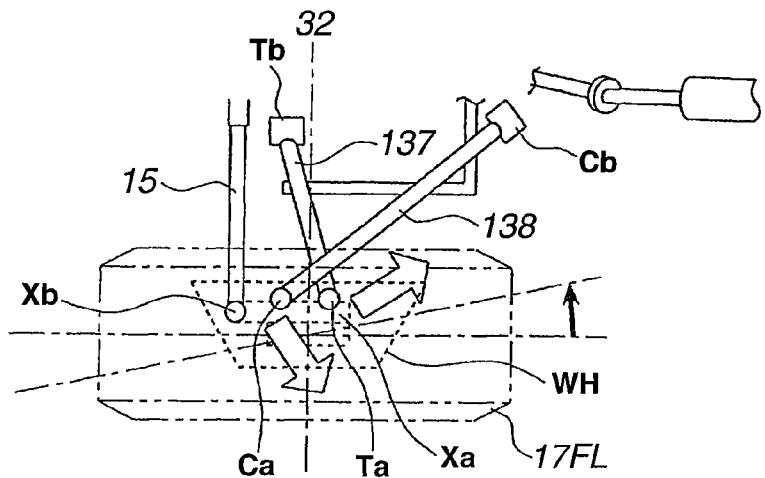
FIG. 28(a) is a partial plan view (the left front wheel) schematically showing the construction of suspension apparatus 1B of FIG. 25.
Figure 28B:
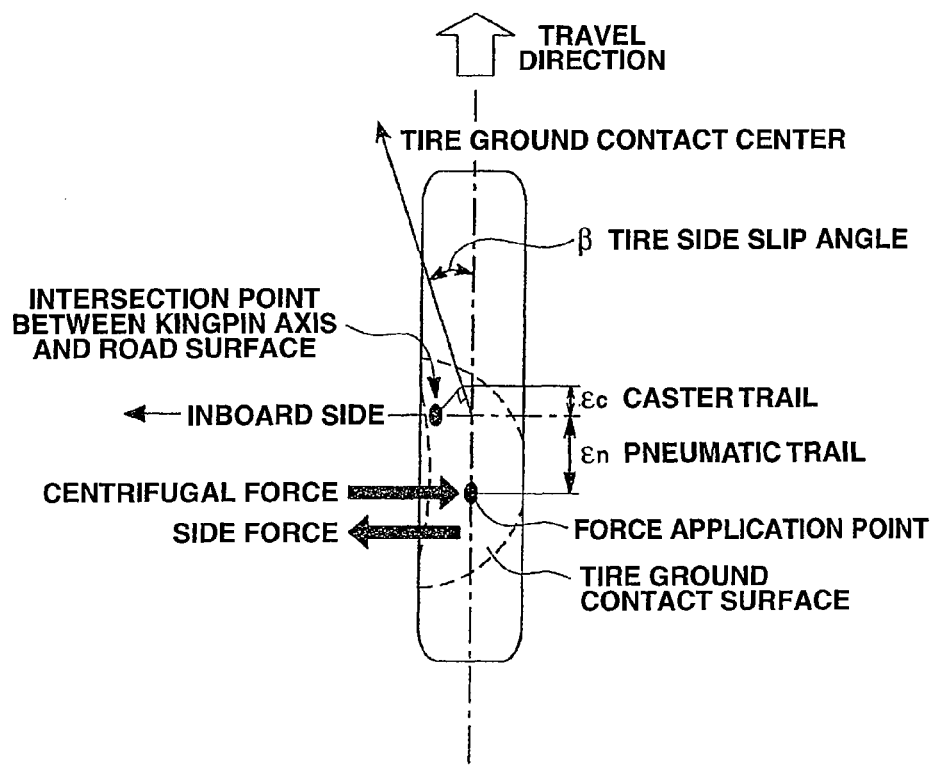
FIG. 28(b) is a view showing a tire ground contact patch (the right front wheel).

FIG. 25 is a perspective view schematically showing the construction of suspension apparatus or suspension system 1B according to the second embodiment. FIG. 26 is a plan view schematically showing the construction of the suspension apparatus 1B of FIG. 25. FIG. 27(a) and FIG. 27(b) are partial front view and partial side view schematically showing the construction of the suspension apparatus 1B of FIG. 25. FIG. 28(a) is a partial plan view (the left front wheel) schematically showing the construction of suspension apparatus 1B of FIG. 25, and FIG. 28(b) is a view showing a tire ground contact patch or contact surface (the right front wheel).

Figure 29:
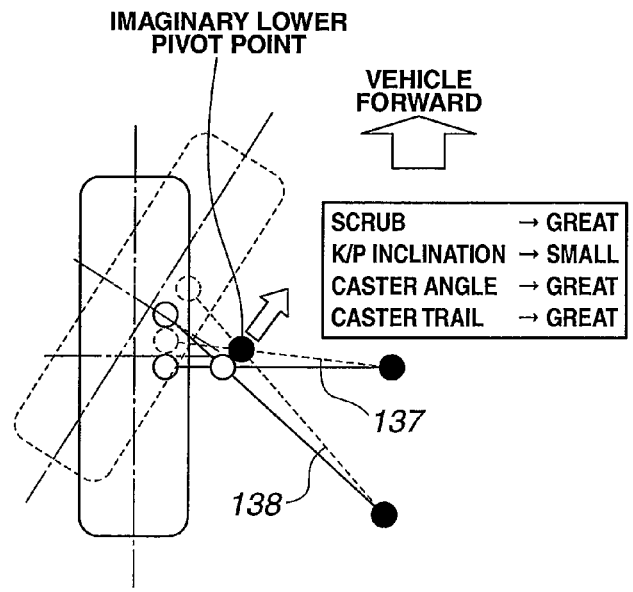
FIG. 29 is a schematic view showing an example in which the suspension apparatus 1B is constructed with a compression type suspension system.
Figure 30A:
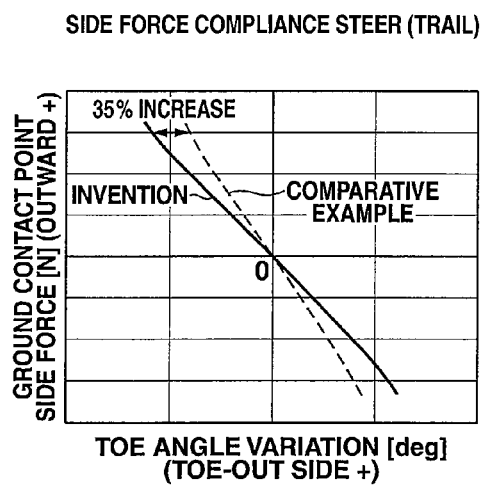
FIGS. 30(a) and 30(b) are views showing side force or lateral compliance steer and lateral stiffness in the suspension apparatus 1B and a comparative example.
Figure 30B:
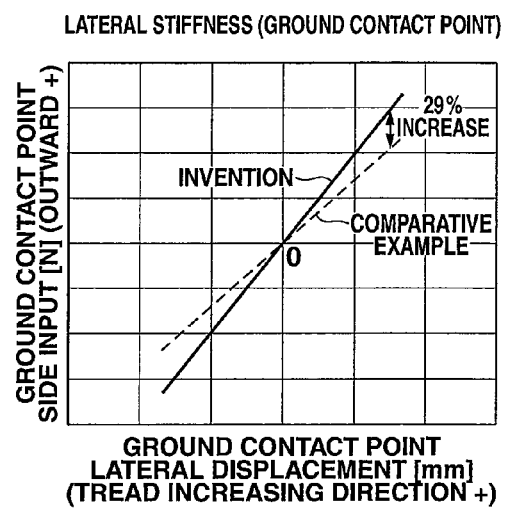

As shown in FIGS. 28-30, the suspension apparatus or suspension system 1B is a compression type suspension apparatus supporting wheels 17FR and 17FL attached to wheel hub mechanisms WH, and includes, on each of the right and left sides, an axle carrier 33 including an axis or shaft of the wheel (axle) 32 supporting the wheel 17FR or 17FL rotatably, a plurality of link members disposed in a vehicle body widthwise direction from a support portion on the vehicle body's side or inboard side and connected with the axle carrier 33, and a spring member 34 such as a coil spring.

The link members include a transverse link (transverse link member) 137 and a compression link (compression link member) 138 which are lower link members, a tie rod (tie rod member) 15 and a strut (spring member 34 and a shock absorber 40). In this embodiment, the suspension apparatus 1B is a strut type suspension system, and the strut ST formed as a unit by the spring member 34 and shock absorber 40 extends to an upper end connected with the vehicle body's side support portion located above the axle 32 (hereinafter, the upper end of the strut ST is referred to as "upper pivot point" suitably).

The transverse link 137 and compression link 138 forming the lower links, connect the vehicle body's side support portion located below the axle 32, with a lower end of the axle carrier 33. In this embodiment, the transverse link 137 and compression link 138 are in the form of I arm independent from each other. The transverse link 137 and compression link 138 are connected with the vehicle body at two respective support portions, and connected with the axle 32's side at two respective support portions.

Moreover, the transverse link 137 and compression link 138 in this embodiment are arranged to connect the vehicle body 1A and the axle 32's side (axle carrier 33) with each other in a crossing or intersecting state in which transverse and compression links 137 and 138 intersect each other (hereinafter, an intersection point between imaginary links formed by transverse link 137 and compression link 138 is referred to as "lower pivot point" suitably).

Among these lower links, the transverse link 137 is disposed so that transverse link 137 is approximately parallel to the axle. In the vehicle top view, the wheel's side support point Ta of transverse link 137 is located on the rear side of the center of the wheel (the axle) in the vehicle front and rear direction. The compression link 138 is disposed so that compression link 138 is inclined with respect to the axle, more than transverse link 137 (compression link 138 is disposed so that the wheel's side support point is located on the front side, and the vehicle body's side support point is located on the rear side). The wheel's side support point Ca of compression link 138 is located on the front side of the center of the wheel in the vehicle front and rear direction. The vehicle body's side support point Tb of transverse link 137 is located on the rear side of the wheel's side support point Ca of compression link 138 in the vehicle front and rear direction. The vehicle body's side support point Cb of compression link 138 is located on the rear side of the wheel's side support point Ta of transverse link 137 in the vehicle front and rear direction.

In this link arrangement, when a centrifugal force toward the turning outer side of the vehicle body acts at the tire ground contact center (force application point) O, the side or lateral force acting toward the turning center, against the centrifugal force can be born mainly by the transverse link 137. Moreover, in this link arrangement, the vehicle body's side support point Tb of transverse link 137 is disposed on the front side of the wheel center in the vehicle front and rear direction. Therefore, when the side force (acting in the inboard direction toward the center of the vehicle) is inputted to the wheel, the wheel's side support point Ta of transverse link 137 is moved in the inboard direction toward the center of the vehicle, and the wheel's side support point Ca of compression link 138 is moved in the outboard direction toward the outer side of the vehicle. Therefore, this link arrangement can realize the compliance steer to direct the wheel to the toe-out direction against the inputted side force.

Tie rod 15 is located on the lower side of axle 32, and arranged to connect a steering rack member 14 with axle carrier 33. Steering rack member 14 is arranged to transmit a rotational force (steering force) inputted from steering wheel 2 and thereby to produce a shaft force or axial force for turning or steering the wheels. Therefore, the axle carrier 33 receives the axial force in the vehicle widthwise direction from tie rod 15 in accordance with the rotation of steering wheel 2, and thereby turns or steer the wheel 17FR or 17FL.

In the suspension apparatus 1B according to this embodiment, as shown in FIG. 28(b), a kingpin axis is so set that the kingpin axis pass through a tire ground contact surface or contact patch in the neutral state in which the steering wheel is at the neutral position, and a caster trail is located inside the tire ground contact surface. Specifically, in the suspension apparatus 1B of this embodiment, the caster angle is set equal to a value close to zero, and the kingpin axis is so set that the caster trail approaches zero. This setting makes it possible to reduce a tire torsional torque or tire twisting torque at the time of steer operation to steer the wheel, and reduce a moment about the kingpin axis. Moreover, the scrub radius is set as a positive scrub in which the scrub radius is greater than or equal to zero. With this setting, the caster trail is generated in an amount corresponding to the scrub radius with respect to a tire side slip angle $\beta$ at the time of steer operation to steer the wheel, and hence the suspension system can ensure a straightness or straight-line running performance.

In this embodiment, the transverse link 137 and compression link 138 serving as the lower link members connect the vehicle body 1 and the axle 32's side (the lower end of axle carrier 33) with each other in the crossing or intersecting state in which transverse link 137 and compression link 138 intersect each other. This crossing arrangement makes it possible to make the kingpin inclination (angle) smaller, and make the scrub radius greater to the positive scrub side, as compared to the non-crossing arrangement in which transverse and compression links 137 and 138 do not intersect each other. Therefore, the suspension system can decrease the tire twisting torque at the time of steer operation, and reduce the rack axial force required for the steer operation. Furthermore, according to this embodiment, the imaginary lower pivot point is moved to the inner or inboard side of the vehicle body by the side force acting on the wheel at the time of steer operation, so that it is possible to improve the straightness due to the self-aligning torque (SAT).

Hereinafter, the suspension geometry in the suspension apparatus 1B is examined in detail.

(Analysis of Rack Axial Force Component)

The relationship between the rack stroke and the rack axial force at the time of steer operation is shown in FIG. 5.

As shown in FIG. 5, the rack axial force contains the tire twisting torque and the wheel lifting torque mainly. Among these components of the rack axial force, the tire twisting torque is predominant.

Therefore, it is possible to reduce the rack axial force by decreasing the tire twisting torque.

(Minimization of the Tire Twisting Torque)

The locus or trace of the center of the tire ground contact surface at the time of steer operation is the same as shown in FIG. 6. FIG. 6 shows a characteristic in the case that the movement of the tire ground contact surface center or the center of the tire ground contact patch is great in the steer operation, and a characteristic in the case that the movement of tire ground contact surface center is small in the steer operation.

As evident from the above-mentioned result of the rack axial force components, it is effective to minimize the tire twisting torque at the time of steer operation, in order to reduce the rack axial force. In order to minimize the tire twisting torque in the steer operation, it is appropriate to decrease the locus of the tire ground contact surface center as shown in FIG. 6. Namely, it is possible to minimize the tire twisting torque by setting the tire ground contact surface center and the kingpin ground contact point or intercept in agreement or at the same position. Concretely, it is effective to set the caster trail equal to 0 mm and the scrub radius equal to or greater than 0 mm.

(Influence of Kingpin Inclination)

The isoline or isoplethic diagram showing one example of distribution of the rack axial force in the coordinate system using, as axes, the kingpin inclination and the scrub radius is also the same as mentioned and shown in FIG. 7. FIG. 7 shows three isoplethic lines or equal-value lines for small, medium and great values of the rack axial force. With respect to input of the tire twisting torque, as the kingpin inclination becomes greater, its rotation moment becomes greater, and the rack axial force becomes greater. Accordingly, it is desirable to set the kingpin inclination smaller than a predetermined value. However, from the relationship with the scrub radius, it is possible to decrease the rack axial force to a desirable level by setting the kingpin inclination smaller than or equal to 15 degrees, for example.

The region surrounded by one-dot chain lines (boundary lines) in FIG. 7 is a region in which the kingpin inclination is smaller than an angle of 15 degrees which is a value estimated to be a value at which the side force exceeds a limit of friction, and at the same time the scrub radius is greater than or equal to 0 mm from the above-mentioned viewpoint of the tire twisting torque. In this embodiment, this region (in the direction decreasing the kingpin inclination from 15 degrees in the horizontal axis, and in the direction increasing the scrub radius from zero in the vertical axis) is treated as a region more suitable for setting. However, even in a region in which the scrub radius is negative, it is possible to obtain a certain effect by showing other condition in this embodiment.

Concretely, in determining the scrub radius and kingpin inclination, for example, it is possible to approximate an isoplethic line or equal-value line representing the distribution of the rack axial force, with a n-degree curve (n is an integer greater than or equal to 2), and to employ a value determined in accordance with the position of an inflexion point of the n-degree curve (or peak value) within the region surrounded by the one dot chain lines.

(Concrete Construction Examples)

Following is explanation on concrete examples of constructions implementing or realizing the suspension apparatus 1B.

FIG. 29 is a schematic view showing an example constructing the suspension apparatus 1B with a suspension apparatus of a compression type. In the example shown in FIG. 29, in the vehicle top view, the transverse link 137 (a transverse rod or tension rod) extends along the axle, and the compression link 138 (a compression rod) is extended rearwards from the axle and connected with the vehicle body at a position on the rear side of the axle.

As shown in FIG. 29, in the arrangement of the double pivot type in which the lower link members are arranged to intersect each other in the compression type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension arrangement can set the imaginary lower pivot point at the position on the vehicle body inner side or inboard side as compared to the non-crossing type suspension arrangement in which the lower link members do not intersect. Therefore, this suspension arrangement can make the initial scrub radius greater in the positive scrub direction.

In the compression type suspension system shown in FIG. 29, because the rotation angle of the compression rod is great in the steer operation, the imaginary lower pivot point is shifted to the inboard side. In this case, in the vehicle top view, from the view point focused on the distance from the tire center line in the tire front and rear direction to the imaginary lower pivot point, the imaginary lower pivot point is moved in the inboard direction from the tire center line on the inboard side of the tire center line, and therefore the scrub radius becomes greater in the direction to the positive scrub. Therefore, in the compression type suspension system, when this embodiment is applied, the rack axial force is decreased by the steer operation as the turning outer wheel.

In the case of the compression type suspension system in which the lower link members do not intersect, because the rotation angle of the compression rod is great in the steer operation, the imaginary lower pivot point is shifted to the outboard side. In this case, in the vehicle top view, the distance from the tire center line in the tire front and rear direction to the imaginary lower pivot point is located on the outboard side of the tire center line, and therefore the scrub radius becomes greater in the direction to the negative scrub. Therefore, the rack axial force is increased by the steer operation.

Furthermore, in the example shown in FIG. 29, in the vehicle top view, the wheel center is moved to the inner side of the vehicle turning motion at the time of steer operation. Therefore, the suspension system can enhance the effect of reducing the rack axial force with the arrangement placing the rack shaft 14 on the front side, or in front, of the axle as in this embodiment.

The relationship between the toe angle and the scrub radius in the compression type suspension system including the lower link members in the non-crossing arrangement, and in the suspension system according to this embodiment is the same as shown in FIG. 9.

As shown in FIG. 9, as compared to the non-crossing arrangement of the lower link members, the arrangement according to this embodiment can increase the scrub radius further in the vicinity of the neutral position (where the toe angle is zero). Moreover, in the direction increasing the steer angle at the turning outer wheel ("-" direction in FIG. 9), the scrub radius is increased and it is possible to decrease the rack axial force.

(Straightness with Positive Scrub)

The concept view for illustrating the self-aligning torque in the positive scrub setting is the same as FIG. 11.

As shown in FIG. 11, the restoring force (the self-aligning torque) acting on the tire increases in proportion to the sum of the caster trail and the pneumatic trail.

In the case of the positive scrub, it is possible to regard, as the caster trail, the distance $\epsilon c$ (cf. FIG. 11) from the wheel center, determined by the position of a foot of a perpendicular line drawn from the ground contact point of the kingpin axis, to a straight line extending, through the tire ground contact center, in the direction of the tire side slip angle $\beta$.

Therefore, the restoring force acting on the tire at the time of steer operation become greater as the scrub radius of the positive scrub becomes greater.

In this embodiment, the kingpin axis is set in the positive scrub arrangement, and it is possible to secure the initial scrub radius at a large level in comparison with the arrangement of the non-crossing lower link members. Therefore, the suspension system of this embodiment can reduce the influence on the straightness by the setting of the caster angle closer to zero. Moreover, by the use of the steer-by-wire mode, the suspension system can ensure the intended straightness with the steer actuator 8 finally.

(Operation)

Following is explanation on operation of the suspension apparatus 1B according to this embodiment.

In the suspension apparatus 1B according to this embodiment, the two lower link members are in the form of I arm. The transverse link 137 is arranged to extend in the vehicle widthwise direction from axle carrier 33, and the compression link 138 is arranged to extend obliquely toward the rear of the vehicle from the lower end of axle carrier 33, in the crossing state intersecting the transverse link 137. Specifically, the wheel's side support point Ta of transverse link 137 is located on the rear side of the center of the wheel in the vehicle front and rear direction. The wheel's side support point Ca of compression link 138 is located on the front side of the center of the wheel in the vehicle front and rear direction. The vehicle body's side support point Tb of transverse link 137 is located on the rear side of the wheel's side support point Ca of compression link 138 in the vehicle front and rear direction. The vehicle body's side support point Cb of compression link 138 is located on the rear side of the wheel's side support point Ta of transverse link 137 in the vehicle front and rear direction.

In this suspension arrangement, the side or lateral force inputted to the wheel at the time of steer operation or the like can be born, in a greater part, by the transverse link 137. Moreover, in the case of input of the side force in the inboard direction toward the center of the vehicle to the wheel on the turning outer side, the transverse link 137 rotates to the inboard side, and the compression link 138 rotate to the outboard side. Therefore, this link arrangement can provide the toe out characteristic to the wheel.

In this suspension structure, for each of the lower link members, a straight line is imagined to connect the inboard support point on the vehicle body's side with the outboard support point on the wheel's side. The intersection point of these imaginary straight lines serves as the imaginary lower pivot point of the lower links. The kingpin axis is the straight line connecting this imaginary lower pivot point with the upper pivot point formed by the upper end of the strut.

In this embodiment, the kingpin axis is set so that the caster trail is located inside the tire ground contact surface or contact patch.

For example, the kingpin axis is so set that the caster angle is equal to 0 degree, the caster trail is equal to 0 mm, and the scrub radius is a positive scrub value greater than or equal to 0 mm. Moreover, the kingpin inclination is set in a range (smaller than or equal to 15 degrees, for example) to make the kingpin inclination small within the range capable of making the scrub radius positive.

With the thus-set suspension geometry, the suspension system can make smaller the trace or locus of the tire ground contact surface center during the steer operation, and reduce the tire twisting torque.

Therefore, the suspension system can reduce the rack axial force, hence reduce the moment about the kingpin axis, and reduce the output of steer actuator 8. Moreover, the suspension system can control the direction of the wheel with a smaller force, and thereby improve the stability and controllability.

In the suspension apparatus 1B according to this embodiment, the two lower link members are arranged in the crossing state intersecting each other. In this structure, it is easier to dispose the imaginary lower pivot point on the inboard side of the tire ground contact surface center.

Therefore, it is easier to set the kingpin inclination at a value closer to 0 degree, and to increase the scrub radius on the positive scrub side.

Furthermore, despite of the possibility of the influence on the straightness of the suspension structure, by the setting of the caster angle at 0 degree and the caster trail at 0 mm, the setting of the positive scrub reduces the influence. Moreover, the suspension system secures the straightness by adding the control with the steer actuator 8. Thus, the suspension system can improve the stability and controllability.

Furthermore, as to the limitation of the kingpin inclination to a predetermined range, with the steer operation of steer actuator 8, it is possible to avoid heavy feeling from being imparted to the driver. As to the kickback by an external force from the road surface, the suspension system can cope with the external force with steer actuator 8, and thereby avoid influence to the driver. Thus, the suspension system can improve the stability and controllability.

As mentioned above, the suspension apparatus 1B according to this embodiment makes it possible to set the imaginary lower pivot point toward the inboard side in the vehicle widthwise direction because of the crossing arrangement of the transverse link 137 extending approximately in parallel to the axle and the compression link 138 intersecting the transverse link 137 in the vehicle top view. Furthermore, the kingpin axis defined by this imaginary lower pivot point is set so that the kingpin inclination is small, and the caster trail is formed inside the tire ground contact surface or patch. Therefore, the suspension apparatus can decrease the moment about the kingpin axis.

Therefore, the suspension apparatus enables a steer operation to steer the wheels with a smaller rack axial force, and control the directions of the wheels with a smaller force, so that the suspension apparatus can improve the stability and controllability.

As the result of the decrease of the moment about the kingpin axis, the suspension apparatus can reduce the load applied on the rack shaft 14 and tie rod(s) 15, so that it is possible to simplify the component parts.

Moreover, it is possible to use an actuator of lower driving ability as the steer actuator 8 realizing the steer-by-wire system, and thereby to reduce the cost and weight of the vehicle.

For example, in comparison with a conventional steer-by-wire type suspension system, the construction according to this embodiment makes it possible to reduce the weight by about 10%, and reduce the cost by about 50% mainly by simplifying the lower link members and reducing the size of steer actuator 8.

Moreover, the suspension apparatus has the structure to increase the caster trail at the time of steer operation. Therefore, the suspension apparatus can retrain an increase of the steer angle in a cornering operation producing a high lateral acceleration or side acceleration.

Furthermore, since the imaginary lower pivot point is moved to the inboard side by the action of the side force acting on the wheel at the time of steer operation, the scrub radius is increased, and the straightness by the self-aligning torque (SAT) can be improved.

With the crossing arrangement of the lower link members, the support point of the lower link member can be placed near the wheel center, so that it is possible to reduce the weight of axle carrier 33.

The relationship between the kingpin inclination (angle) and the scrub radius in this embodiment is the same as shown in FIG. 12. FIG. 12 shows, in addition to the above-mentioned compression type arrangement according to this embodiment, the tension type arrangement according to this embodiment, and further shows, as comparative examples, compression type and tension type non-crossing arrangements of the non-crossing lower link members (cf. the second embodiment) and the single pivot type arrangement.

As shown in FIG. 12, in the practical examples of the compression type and the tension type according to the invention, it is possible to set the kingpin inclination at an angle closer to 0 degree and to set the scrub radius at a greater value on the positive scrub side, in comparison with the single pivot type example and the double pivot type non-crossing comparative examples of the non-crossing lower link members.

Specifically, in the practical example of the compression type according to this embodiment, it is possible to obtain higher effects in the effect of decreasing the kingpin inclination to zero degree and the effect of increasing the scrub radius on the positive scrub side.

Furthermore, the transverse link 137 is arranged approximately in parallel to the axle, and the wheel's side support point Ta of transverse link 137 is disposed on the rear side of the center of the wheel in the vehicle front and rear direction. The compression link 138 is inclined more than transverse link 137, with respect to the axle (disposed in such an orientation that the wheel's side support point is on the front side, and the vehicle body's side support point is on the rear side). The wheel's side support point Ca of compression link 138 is located on the front side of the center of the wheel in the vehicle front and rear direction. The vehicle body's side support point Tb of transverse link 137 is located on the rear side of the wheel's side support point Ca of compression link 138 in the vehicle front and rear direction. The vehicle body's side support point Cb of compression link 138 is located on the rear side of the wheel's side support point Ta of transverse link 137 in the vehicle front and rear direction.

In this link arrangement, the side force inputted to the wheel can be born mainly by the transverse link 137. Moreover, in this link arrangement, the vehicle body's side support point Tb of transverse link 137 is disposed on the front side of the wheel center in the vehicle front and rear direction. Therefore, when the side force (acting in the inboard direction toward the center of the vehicle) is inputted to the wheel, the wheel's side support point Ta of transverse link 137 is moved in the inboard direction toward the center of the vehicle, and the wheel's side support point Ca of compression link 138 is moved in the outboard direction toward the outer side of the vehicle. Therefore, this link arrangement can realize the compliance steer to direct the wheel to the toe-out direction against the inputted side force.

FIGS. 30(*a*) and 30(*b*) are views showing a side force compliance steer and a lateral stiffness in the suspension apparatus 1B according to this embodiment and a comparative example of a compression type suspension system in which the lower link members do not intersect.

As shown in FIG. 30, in the case of the construction of the suspension apparatus 1B according to this embodiment (solid lines in FIG. 30), the side force compliance steer is improved by 35% and the lateral stiffness is improved by 29% as compared to the comparative example (broken lines in FIG. 30).

In this embodiment, the wheels 17FR, 17FL, 17RR and 17RL correspond to the tire wheel, tire and wheel hub mechanism WH. Transverse link 137 corresponds to the transverse link member as the first link member, and compression link 138 corresponds to the compression link member as the second link member.

Effects of Second Embodiment (1) There is provided a transverse link member connecting the wheel hub mechanism WH and the wheel on the lower side of the axle in the vehicle up and down direction, and extending along the axle. Moreover, there is provided a compression link member. The connection portion of the compression link member with the vehicle body is located on the rear side of the connect portion of the transverse link member with the vehicle body in the vehicle front and rear direction, and the connect portion of the compression link member with the wheel hub mechanism is located on the front side of the connect portion of the transverse link member with the wheel hub mechanism in the vehicle front and rear direction.

With this arrangement, it is possible to shift the imaginary lower pivot point in the inboard direction toward the inside of the vehicle body in the vehicle widthwise direction, and hence to decrease the moment about the kingpin. Therefore, this link arrangement makes it possible to steer the wheel with a smaller rack axial force, and to control the direction of the wheel with a smaller force. Thus, in the vehicle suspension apparatus, it is possible to decrease the rack axial force at the time of steer operation.

(2) The connect portion between the transverse link member and the wheel hub mechanism WH is located on the rear side of the axle in the vehicle front and rear direction, and the connect portion between the transverse link member and the vehicle body is located on the front side of the axle in the vehicle front and rear direction.

Therefore, in the case of the side force inputted to the wheel as the turning outer wheel, the connect portion between the transverse link member and the wheel hub mechanism WH can be shifted in the inboard direction, and hence the toe-out characteristic can be imparted to the turning outer wheel.

(3) The connect portion between the transverse link member and the vehicle body is located on the rear side of the connect portion between the compression link member and the wheel hub mechanism in the vehicle front and rear direction.

Therefore, it is possible to set or fix the rotational direction of the transverse link member approximately parallel to the axle, in one direction.

(4) The connect portion between the compression link member and the wheel hub mechanism is located on the front side of the axle in the vehicle front and rear direction, and the connect portion between the compression link member and the vehicle body is located on the rear side of the connect portion between the transverse link member and the wheel hub mechanism in the vehicle front and rear direction.

This link arrangement makes it possible to increase the inclination angle of the compression link member with respect to the axle, and to shift the position of the imaginary lower pivot point in the inboard direction to the inside of the vehicle body.

(5) In a vehicle top view, the transverse and compression link members connecting the vehicle body and the wheel are arranged by disposing the transverse link member along the axle and disposing the compression link member so that the compression link member intersects the transverse link member, the wheel's side connect portion of the compression link member is located on the front side of the transverse link member, and the vehicle body's side connect portion of the compression link member is located on the rear side of the transverse link member; and causing the imaginary lower pivot point formed by the intersection point between the transverse link member and the compression link member to move in the inboard direction against the side force acting in the inboard direction.

With this arrangement, it is possible to shift the imaginary lower pivot point in the inboard direction toward the inside of the vehicle body in the vehicle widthwise direction, and hence to decrease the moment about the kingpin. Therefore, this link arrangement makes it possible to steer the wheel with a smaller rack axial force, and to control the direction of the wheel with a smaller force. Thus, in the vehicle suspension apparatus, it is possible to reduce the rack axial force at the time of steer operation.

(6) The kingpin axis having a lower pivot point set at the intersection point of the transverse link member and the compression link member in the vehicle top view passes through the tire ground contact surface or contact patch in the state in which the steering wheel is at the neutral position.

This arrangement makes it possible to decrease the moment about the kingpin axis, to steer the wheel with a smaller rack axial force and to control the direction of the wheel with a smaller force. Therefore, it is possible to improve the stability and controllability.

(7) The suspension apparatus is arranged to suspend the steerable wheel steered by the steer-by-wire system. Therefore, by utilizing the steer actuator of the steer-by-wire system, it is possible to perform the control corresponding to the setting of the caster trail according to this embodiment, and to improve the safety and controllability.

As to the effects of the control/drive circuit, the second embodiment is the same as the first embodiment.

Third Embodiment

Following is explanation on a third embodiment of the present invention.

A motor vehicle 1 according to the third embodiment is the same in function and construction as FIG. 1 in the first embodiment. Motor vehicle 1 according to the third embodiment is different in the construction of suspension apparatus 1B, from the first embodiment.

Therefore, the following explanation is directed to the construction of suspension apparatus 1B.

Figure 31:
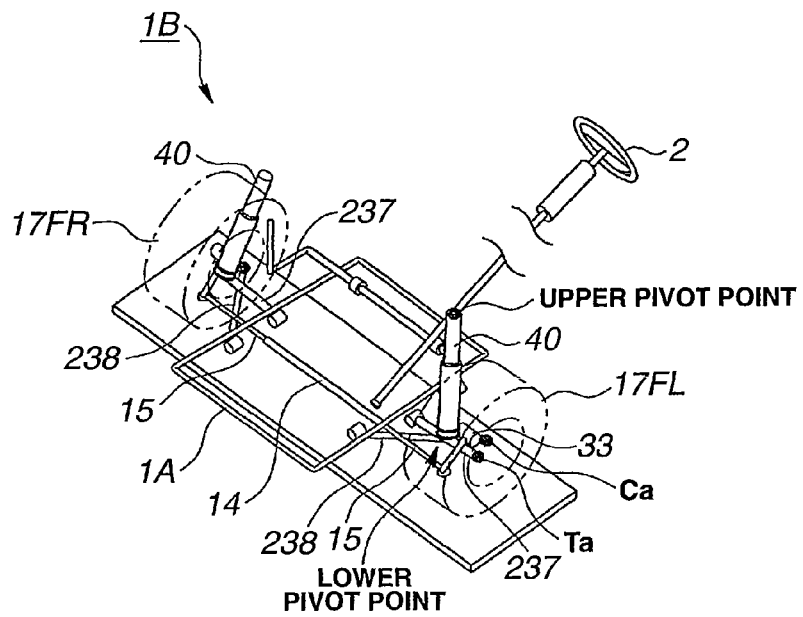
FIG. 31 is a perspective view schematically showing the construction of a suspension apparatus 1B according to a third embodiment.
Figure 32:
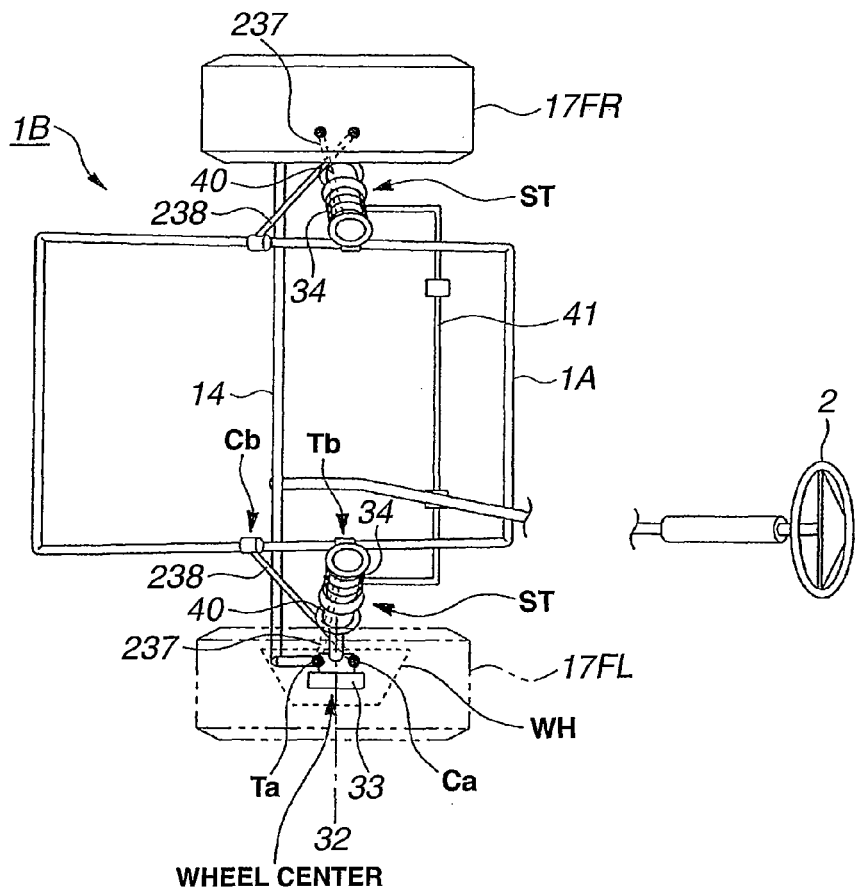
FIG. 32 is a plan view schematically showing the construction of the suspension apparatus 1B of FIG. 31.
Figure 33A:
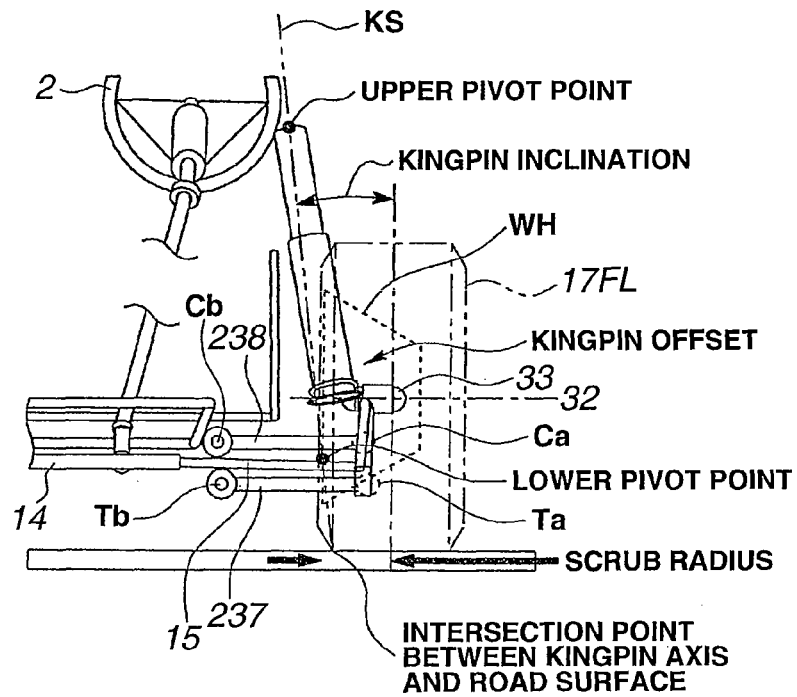
FIG. 33(a) and FIG. 33(b) are partial front view and partial side view schematically showing the construction of the suspension apparatus 1B of FIG. 31.
Figure 33B:
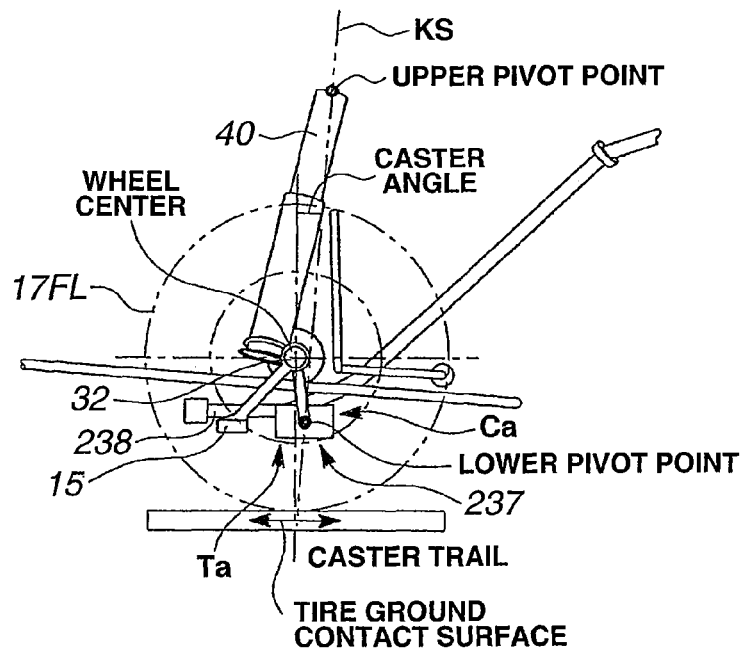
Figure 34A:
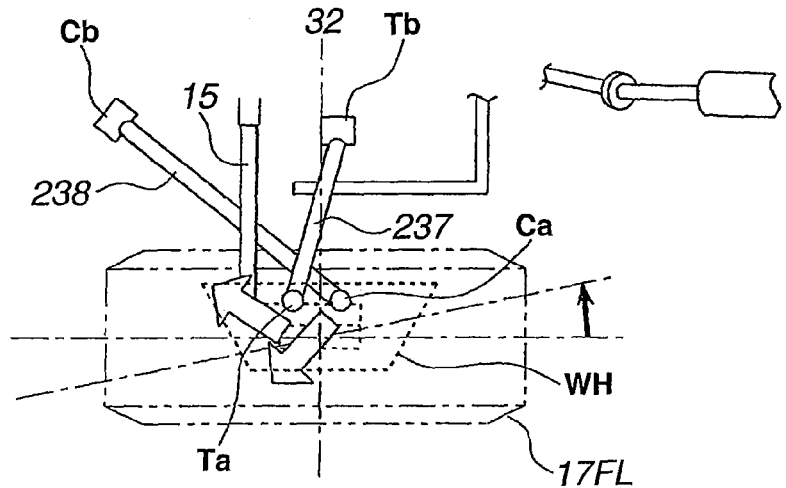
FIG. 34(a) is a partial plan view (the left front wheel) schematically showing the construction of suspension apparatus 1B of FIG. 31.
Figure 34B:
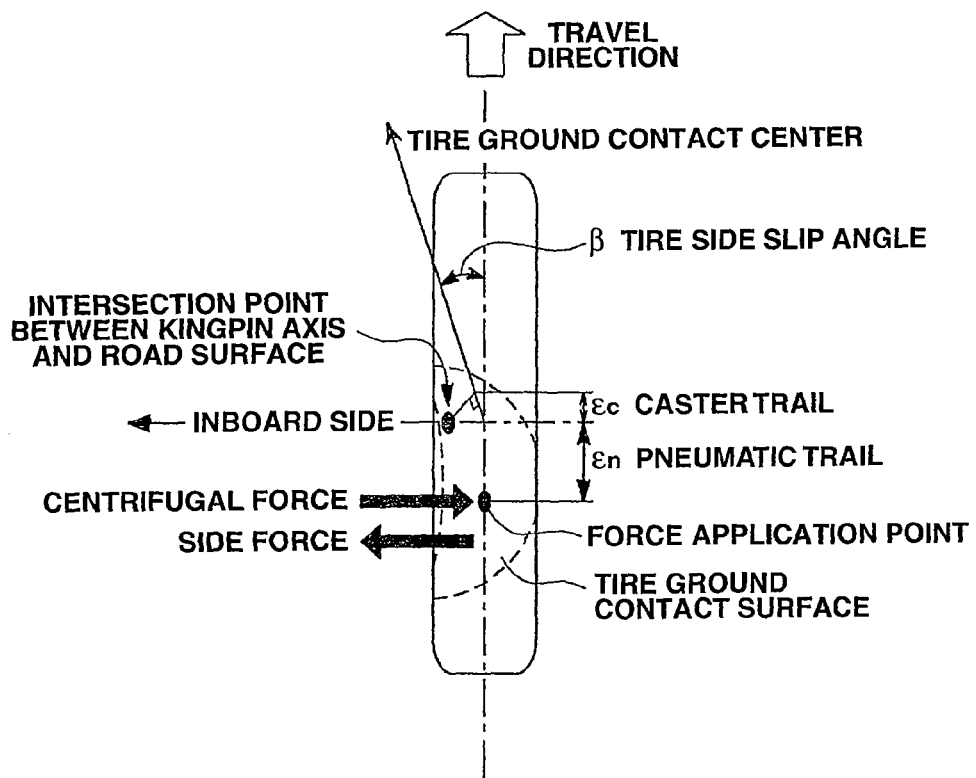
FIG. 34(b) is a view showing a tire ground contact patch (the right front wheel).

FIG. 31 is a perspective view schematically showing the construction of suspension apparatus 1B according to the third embodiment. FIG. 32 is a plan view schematically showing the construction of the suspension apparatus 1B of FIG. 31. FIG. 33(a) and FIG. 33(b) are partial front view and partial side view schematically showing the construction of the suspension apparatus 1B of FIG. 31. FIG. 34(a) is a partial plan view (the left front wheel) schematically showing the construction of suspension apparatus 1B of FIG. 25, and FIG. 34(b) is a view showing a tire ground contact patch (the right front wheel).

As shown in FIGS. 31~34, the suspension apparatus or suspension system 1B is a tension type suspension apparatus supporting wheels 17FR and 17FL attached to wheel hub mechanisms WH, and includes, on each of the right and left sides, an axle carrier 33 including an axis or shaft of the wheel (axle) 32 supporting the wheel 17FR or 17FL rotatably, a plurality of link members disposed in the vehicle body widthwise direction from a support portion on the vehicle body's side or inboard side and connected with the axle carrier 33, and a spring member 34 such as a coil spring.

The link members include a transverse link (transverse link member as a first link member) 237 and a tension link (tension link member as a second link member) 238 which are lower link members, a tie rod (tie rod member) 15 and a strut (spring member 34 and a shock absorber 40). In this embodiment, the suspension apparatus 1B is a strut type suspension system, and the strut ST formed as a unit by the spring member 34 and shock absorber 40 extends to an upper end connected with the vehicle body's side support portion located above the axle 32 (hereinafter, the upper end of the strut ST is referred to as "upper pivot point" suitably).

The transverse link 237 and tension link 238 forming the lower links, connect the vehicle body's side support portion located below the axle 32, with a lower end of the axle carrier 33. In this embodiment, the transverse link 237 and tension link 238 are in the form of I arm independent from each other. The transverse link 237 and tension link 238 are connected with the vehicle body at two respective support portions, and connected with the axle 32's side at two respective support portions. Moreover, the transverse link 237 and tension link 238 in this embodiment are arranged to connect the vehicle body 1A and the axle 32's side (axle carrier 33) with each other in a crossing or intersecting state in which transverse and tension links 237 and 238 intersect each other (hereinafter, an intersection point between imaginary links formed by transverse link 237 and tension link 238 is referred to as "lower pivot point" suitably).

Among these lower links, the transverse link 237 is disposed so that transverse link 237 is approximately parallel to the axle. In the vehicle top view, the wheel's side support point Ta of transverse link 237 is located on the front side of the center of the wheel (the axle) in the vehicle front and rear direction. The tension link 238 is disposed so that tension link 238 is inclined with respect to the axle, more than transverse link 237 (tension link 238 is disposed so that the wheel's side support point is located on the rear side, and the vehicle body's side support point is located on the front side). The wheel's side support point Ca of tension link 238 is located on the rear side of the center of the wheel in the vehicle front and rear direction. The vehicle body's side support point Tb of transverse link 237 is located on the front side of the wheel's side support point Ca of tension link 238 in the vehicle front and rear direction. The vehicle body's side support point Cb of tension link 238 is located on the front side of the wheel's side support point Ta of transverse link 237 in the vehicle front and rear direction.

In this link arrangement, when a centrifugal force toward the turning outer side of the vehicle body acts at the tire ground contact center (force application point) O, as shown in FIG. 34(b), the side or lateral force acting toward the turning center, against the centrifugal force can be born mainly by the transverse link 237. Moreover, in this link arrangement, the vehicle body's side support point Tb of transverse link 237 is disposed on the rear side of the wheel center in the vehicle front and rear direction. Therefore, when the side force (acting in the inboard direction toward the center of the vehicle) is inputted to the wheel, the wheel's side support point Ta of transverse link 237 is moved in the inboard direction toward the center of the vehicle, and the wheel's side support point Ca of tension link 238 is moved in the outboard direction toward the outer side of the vehicle. Therefore, this link arrangement can realize the compliance steer to direct the wheel to the toe-in direction against the inputted side force.

Tie rod 15 is located on the lower side of axle 32, and arranged to connect a steering rack member 14 with axle carrier 33. Steering rack member 14 is arranged to transmit a rotational force (steering force) inputted from steering wheel 2 and thereby to produce a shaft force or axial force for turning or steering the wheels. Therefore, the axle carrier 33 receives the axial force in the vehicle widthwise direction from tie rod 15 in accordance with the rotation of steering wheel 2, and thereby turns or steer the wheel 17FR or 17FL.

In the suspension apparatus 1B according to this embodiment, as shown in FIG. 34(b), a kingpin axis is so set that the kingpin axis pass through a tire ground contact surface or contact patch in the neutral state in which the steering wheel 2 is at the neutral position, and the caster trail is located inside the tire ground contact surface or patch. Specifically, in the suspension apparatus 1B of this embodiment, the caster angle is set equal to a value close to zero, and the kingpin axis is so set that the caster trail approaches zero. This setting makes it possible to reduce the tire twisting torque at the time of steer operation to steer the wheel, and reduce the moment about the kingpin axis. Moreover, the scrub radius is set as the positive scrub in which the scrub radius is greater than or equal to zero. With this setting, the caster trail is generated in an amount corresponding to the scrub radius with respect to a tire side slip angle at the time of steer operation to steer the wheel, and hence the suspension system can ensure the straightness or straight-line running performance.

In this embodiment, the transverse link 237 and tension link 238 serving as the lower link members connect the vehicle body 1 and the axle 32's side (the lower end of axle carrier 33) with each other in the crossing or intersecting state in which transverse link 237 and tension link 238 intersect each other. This crossing arrangement makes it possible to make the initial kingpin inclination (angle) smaller, and make the initial scrub radius greater to the positive scrub side, as compared to the non-crossing arrangement in which transverse and tension links 237 and 238 do not intersect each other. Therefore, the suspension system can decrease the tire twisting torque at the time of steer operation, and reduce the rack axial force required for the steer operation. Furthermore, according to this embodiment, the imaginary lower pivot point is moved to the outer or outboard of the vehicle body by the side force acting on the wheel at the time of steer operation, so that it is possible to improve the straightness.

(Concrete Construction Examples)

Figure 35:
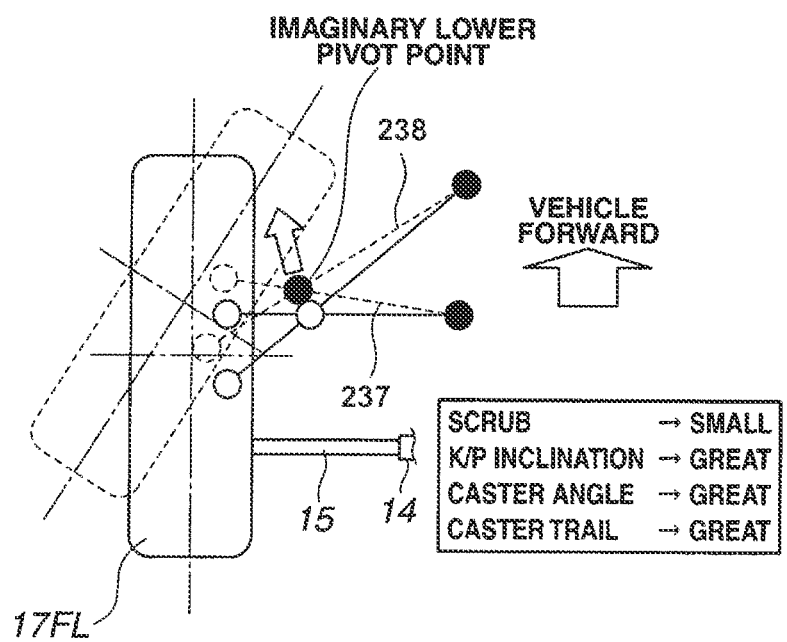
FIG. 35 is a schematic view showing an example in which the suspension apparatus 1B is formed with a tension type suspension system.

FIG. 35 is a schematic view showing an example constructing the suspension apparatus 1B with a suspension apparatus of the tension type.

As shown in FIG. 35, in the arrangement of the double pivot type in which the lower link members are arranged to intersect each other in the tension type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension arrangement can set the imaginary lower pivot point at the position on the vehicle body inner side or inboard side as compared to the non-crossing type suspension arrangement in which the lower link members do not intersect. Therefore, this suspension arrangement can make the initial scrub radius greater in the positive scrub direction.

In the tension type suspension system shown in FIG. 35, because the rotation angle of the tension rod is great in the steer operation, the imaginary lower pivot point is shifted to the outboard side. In this case, in the vehicle top view, from the view point focused on the distance from the tire center line in the tire front and rear direction to the imaginary lower pivot point, the imaginary lower pivot point is moved in the outboard direction from the tire center line on the inboard side of the tire center line, and therefore the scrub radius becomes smaller within the range of the positive scrub. Therefore, in the tension type suspension system, when this embodiment is applied, the rack axial force is increased by the steer operation as the turning outer wheel. However, the initial scrub radius in the non-steering state is set large enough. Therefore, the rack axial force can be set smaller as compared to the non-crossing tension type suspension system.

In the case of the non-crossing tension type suspension system in which the lower link members do not intersect, because the rotation angle of the tension rod is great in the steer operation, the imaginary lower pivot point is shifted to the inboard side. In this case, in the vehicle top view, the distance from the tire center line in the tire front and rear direction to the imaginary lower pivot point is located on the inboard side of the tire center line, and therefore the scrub radius becomes greater in the direction to the positive scrub. Therefore, the rack axial force is decreased by the steer operation. However, since the imaginary lower pivot point is located on an extension of each link, the scrub radius in the initial state with no steer operation is small, and it is not easy to decrease the rack axial force largely.

Furthermore, in the example shown in FIG. 35, in the vehicle top view, the wheel center is moved to the outer side of the vehicle turning motion at the time of steer operation. Therefore, the suspension system can enhance the effect of reducing the rack axial force with the arrangement placing the rack shaft 14 on the rear side of the axle as in this embodiment.

In the examples of the second and third embodiments, the present invention is applied to the suspension apparatus having the compression type or tension type link arrangement. However, the present invention is applicable to suspension apparatus of other type.

In this embodiment, the wheels 17FR, 17FL, 17RR and 17RL correspond to the tire wheel, tire and wheel hub mechanism WH. Transverse link 237 corresponds to the transverse link member as the first link member, and tension link 238 corresponds to the tension link member as the second link member.

Effects of Third Embodiment (1)) There is provided the transverse link member connecting the wheel hub mechanism WH and the wheel on the lower side of the axle in the vehicle up and down direction, and extending along the axle. Moreover, there is provided the tension link member. The connection portion of the tension compression link member with the vehicle body is located on the fron side of the connect portion of the transverse link member with the vehicle body in the vehicle front and rear direction, and the connect portion of the tension link member with the wheel hub mechanism is located on the rear side of the connect portion of the transverse link member with the wheel hub mechanism in the vehicle front and rear direction.

With this arrangement, it is possible to shift the initial position of the imaginary lower pivot point in the inboard direction toward the inside of the vehicle body in the vehicle widthwise direction, and hence to decrease the moment about the kingpin. Therefore, this link arrangement makes it possible to steer the wheel with a smaller rack axial force, and to control the direction of the wheel with a smaller force. Thus, in the vehicle suspension apparatus, it is possible to decrease the rack axial force at the time of steer operation.

(2) The connect portion between the transverse link member and the wheel hub mechanism WH is located on the front side of the axle in the vehicle front and rear direction, and the connect portion between the transverse link member and the vehicle body is located on the rear side of the axle in the vehicle front and rear direction.

Therefore, in the case of the side force inputted to the wheel as the turning outer wheel, the connect portion between the transverse link member and the wheel hub mechanism WH can be shifted in the inboard direction, and hence the toe-in characteristic can be imparted to the turning outer wheel.

(3) The connect portion between the transverse link member and the vehicle body is located on the front side of the connect portion between the tension link member and the wheel hub mechanism in the vehicle front and rear direction.

Therefore, it is possible to set or fix the rotational direction of the transverse link member approximately parallel to the axle, in one direction.

(4) The connect portion between the tension link member and the wheel hub mechanism is located on the rear side of the axle in the vehicle front and rear direction, and the connect portion between the tension link member and the vehicle body is located on the front side of the connect portion between the transverse link member and the wheel hub mechanism in the vehicle front and rear direction.

This link arrangement makes it possible to increase the inclination angle of the tension link member with respect to the axle, and to shift the position of the imaginary lower pivot point in the inboard direction to the inside of the vehicle body.

(5) In a vehicle top view, the transverse and tension link members connecting the vehicle body and the wheel are arranged by disposing the transverse link member along the axle and disposing the tension link member so that the tension link member intersects the transverse link member, the wheel's side connect portion of the tension link member is located on the rear side of the transverse link member, and the vehicle body's side connect portion of the tension link member is located on the front side of the transverse link member; and causing the imaginary lower pivot point formed by the intersection point between the transverse link member and the tension link member to move in the outboard direction against the side force acting in the inboard direction.

With this arrangement, it is possible to set the initial position of the imaginary lower pivot point on the inboard side toward the inside of the vehicle body in the vehicle widthwise direction, and hence to decrease the moment about the kingpin. Therefore, this link arrangement makes it possible to steer the wheel with a smaller rack axial force, and to control the direction of the wheel with a smaller force. Thus, in the vehicle suspension apparatus, it is possible to the rack axial force at the time of steer operation.

(6) The kingpin axis having a lower point set at the intersection point of the transverse link member and the tension link member in the vehicle top view passes through the tire ground contact surface or contact patch in the state in which the steering wheel is at the neutral position.

This arrangement makes it possible to decrease the moment about the kingpin axis, to steer the wheel with a smaller rack axial force and to control the direction of the wheel with a smaller force. Therefore, it is possible to improve the stability and controllability.

(7) The suspension apparatus is arranged to suspend the steerable wheel steered by the steer-by-wire system. Therefore, by utilizing the steer actuator of the steer-by-wire system, it is possible to perform the control corresponding to the setting of the caster trail according to this embodiment, and to improve the safety and controllability.

Application Example 1

Although the second and third embodiments are explained by the use of the examples in which the suspension apparatus 1B is applied to the suspension system for the steerable front wheels, the suspension apparatus 1B is applicable also to the suspension system for non-steerable rear wheels.

In this case, when the vehicle is brought by a steer operation into a turning state, and the side force is applied to the rear wheel, the tension link and compression link are bent by the side force, the intersection point of these links in the vehicle top view is moved, and the direction of the wheel is changed with respect to the vehicle body (cf. FIG. 29 and FIG. 35). Namely, the lower link member extending along the axle is small in the amount of movement in the front and rear direction by the side force, and the other lower link member disposed obliquely with respect to the axle to have an angle in the front and rear direction is large in the amount of movement in the front and rear direction by the side force.

By utilizing this characteristic, it is possible to realize an intended compliance steer.

Specifically, the tension type suspension apparatus 1B according to the second embodiment can realize the characteristic directing the wheel on the turning outer side to the direction of toe-in, so that this suspension apparatus is effective when used for the rear wheel suspension.

(Effect)

The first and second link members for connecting the wheel hub mechanism and the vehicle body are arranged to intersect each other in the vehicle top view, on the lower side of the axle in the vehicle up and down direction.

Therefore, the link members are bent by the side force at the time of turning, the intersection point of the link members in the vehicle top view is shifted and therefore the direction of the wheel can be changed with respect to the vehicle body. Consequently, it is possible to realize the intended compliance steer.

Application Example 2

Although the second and third embodiments are explained by the use of the examples in which the suspension apparatus 1B is applied to the suspension system for the steerable front wheels, the suspension apparatus 1B is applicable also to the suspension system for steerable rear wheels.

In this case, too, the imaginary lower pivot point can be shifted to the vehicle inboard side in the vehicle widthwise or lateral direction as in the first embodiment. Furthermore, the kingpin axis defined by this imaginary lower pivot point is set so that the caster trail lies within the tire ground contact surface or patch. Therefore, it is possible to decrease the moment about the kingpin axis. Therefore, it is possible to steer the wheels with a smaller rack axial force, control the direction of the wheels with a smaller force and thereby improve the controllability and stability.

Application Example 3

In the second and third embodiments, the caster trail is set within the tire ground contact surface, and as an example, the caster trail is set at a value close to zero.

By contrast to this setting, in this application example, the setting condition of the caster trail is limited to the range from the center of the tire ground contact patch to the front end of the tire ground contact patch.

(Effect)

In the case of the arrangement of setting the caster trail in the range from the center of the tire ground contact patch to the front end of the tire ground contact patch, it is possible to attain the securement of the straightness and the reduction of the heaviness of steering operation simultaneously, and thereby to improve the controllability and safety.

Application Example 4

In the second and third embodiments, the region surrounded by the one dot chain line in the coordinate plane shown in FIG. 7 is selected as an example of the region adequate for setting. By contrast, it is possible to set, as the adequate setting region, an inside region (in the decreasing direction of the kingpin inclination and the increasing direction of the scrub radius) inside a range represented by a boundary line determined by an isoplethic line which is used as the boundary line and which is an equal-value line of a rack axial force to which attention is paid.

(Effect)

It is possible to assume a greatest value of the rack axial force and to set the suspension geometry within the range smaller than or equal to the greatest value of the rack axial force.

Application Example 5

In the examples of the second and third embodiments and the application examples, the suspension apparatus 1B is applied to the vehicle equipped with the steer-by-wire type steering apparatus. However, it is possible to apply the suspension apparatus 1B to the vehicle equipped with the electric power steering apparatus or other steering apparatus of mechanical steering mechanism or steering linkage.

In this case, the kingpin axis is determined in conformity with the condition according to the above-mentioned analysis results, the caster trail is set within the tire ground contact surface, and the links of the mechanical steering mechanism are arranged in accordance with these settings.

(Effect)

Even in the mechanical steering mechanism, it is possible to decrease the moment about the kingpin, thereby decrease the required steering force or steering effort of the driver, and improve the stability and controllability.

Application Example 6

In the examples of the second and third embodiments and the application examples, the present invention is applied to the strut type suspension apparatus as an example. However, it is possible to apply the present invention to the suspension apparatus having the upper arm. In this case, the upper pivot point is the connection point between the upper arm and the axle carrier.

Fourth Embodiment

Following is explanation on a fourth embodiment of the present invention.

A motor vehicle 1 according to the fourth embodiment is the same in function and construction as FIG. 1 in the first embodiment. Motor vehicle 1 according to the fourth embodiment is different in the construction of suspension apparatus 1B, from the first embodiment.

Therefore, the following explanation is directed to the construction of suspension apparatus 1B.

Figure 36:
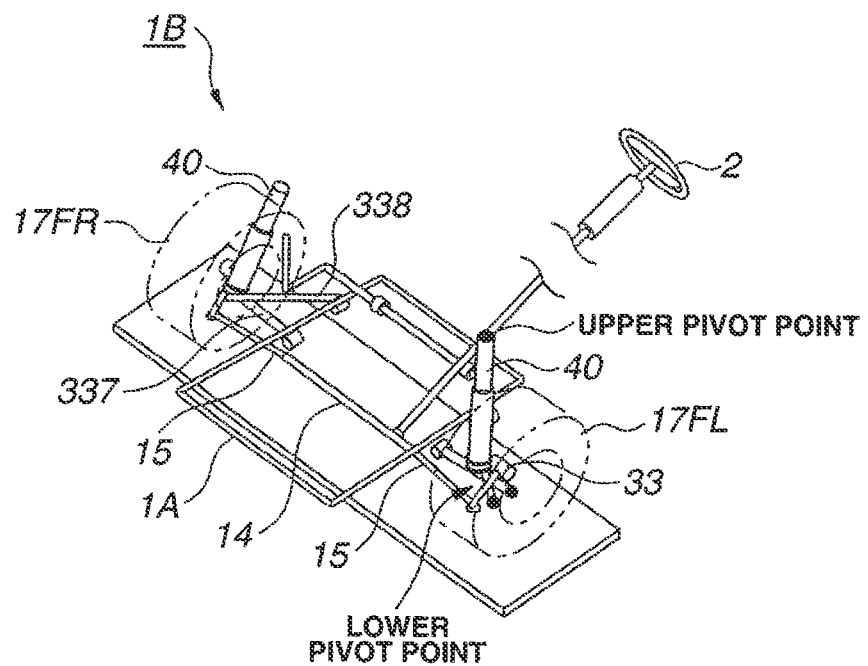
FIG. 36 is a perspective view schematically showing the construction of suspension apparatus 1B according to a fourth embodiment.
Figure 37:
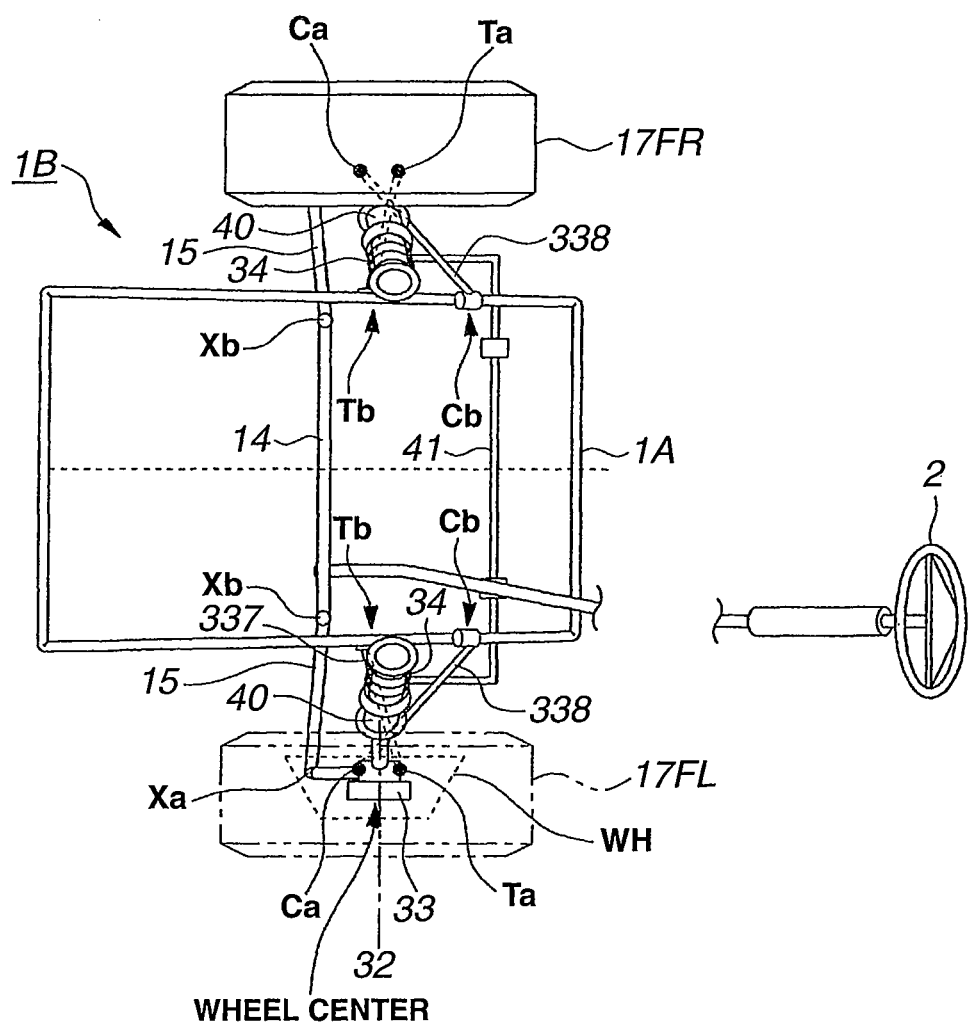
FIG. 37 is a plan view schematically showing the construction of the suspension apparatus 1B of FIG. 36.
Figure 38A:
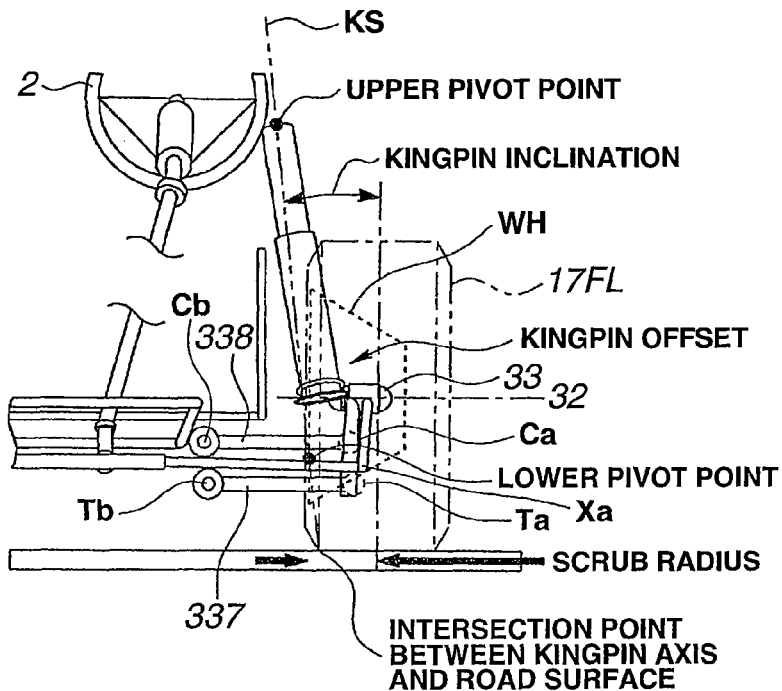
FIGS. 38(a) and 38(b) are partial front view and partial side view schematically showing the construction of the suspension apparatus 1B of FIG. 36.
Figure 38B:
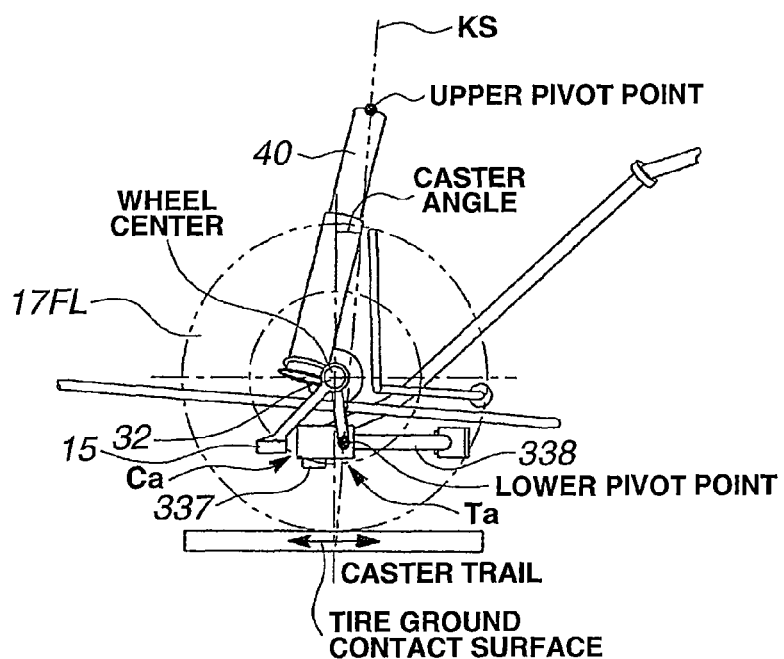

FIG. 36 is a perspective view schematically showing the construction of suspension apparatus 1B according to the fourth embodiment. FIG. 37 is a plan view schematically showing the construction of the suspension apparatus 1B of FIG. 36. FIGS. 38(*a*) and 38(*b*) are partial front view and partial side view schematically showing the construction of the suspension apparatus 1B of FIG. 36. FIG. 39(*a*) is a partial plan view (the left front wheel) schematically showing the construction of suspension apparatus 1B of FIG. 36, and FIG. 39(*b*) is a view showing a tire ground contact patch (the right front wheel).

As shown in FIGS. 36~39, the suspension apparatus or suspension system 1B is a compression type suspension apparatus supporting wheels 17FR and 17FL attached to wheel hub mechanisms WH, and includes, on each of the right and left sides, an axle carrier 33 including an axis or shaft of the wheel (axle) 32 supporting the wheel 17FR or 17FL rotatably, a plurality of link members disposed in the vehicle body widthwise direction from a support portion on the vehicle body's side or inboard side and connected with the axle carrier 33, and a spring member 34 such as a coil spring.

The link members include a transverse link (transverse link member as the first link member) 337 and a compression link (compression link member as the second link member) 338 which are lower link members, a tie rod (tie rod member) 15 and a strut (spring member 34 and a shock absorber 40). In this embodiment, the suspension apparatus 1B is a strut type suspension system, and the strut ST formed as a unit by the spring member 34 and shock absorber 40 extends to an upper end connected with the vehicle body's side support portion located above the axle 32 (hereinafter, the upper end of the strut ST is referred to as "upper pivot point" suitably).

The transverse link 337 and compression link 338 forming the lower links connect the vehicle body's side support portion located below the axle 32, with a lower end of the axle carrier 33. In this embodiment, the transverse link 337 and compression link 338 are in the form of I arm independent from each other. The transverse link 337 and compression link 338 are connected with the vehicle body at two respective support portions, and connected with the axle 32's side at two respective support portions. Moreover, the transverse link 337 and compression link 338 in this embodiment are arranged to connect the vehicle body 1A and the axle 32's side (axle carrier 33) with each other in the crossing or intersecting state in which transverse and compression links 337 and 338 intersect each other (hereinafter, an intersection point between imaginary links formed by transverse link 337 and compression link 338 is referred to as "lower pivot point" suitably).

Among these lower links, the transverse link 337 is disposed so that transverse link 337 is approximately parallel to the axle. In the vehicle top view, the wheel's side support point Ta of transverse link 337 is located on the rear side of the center of the wheel (the axle) in the vehicle front and rear direction. The compression link 338 is disposed so that compression link 338 is inclined with respect to the axle, more than transverse link 337 (compression link 338 is oriented so that the wheel's side support point is located on the front side and the vehicle body's side support point is located on the rear side). The wheel's side support point Ca of compression link 338 is located on the front side of the center of the wheel in the vehicle front and rear direction. The vehicle body's side support point Tb of transverse link 337 is located on the rear side of the wheel's side support point Ca of compression link 338 in the vehicle front and rear direction. The vehicle body's side support point Cb of compression link 338 is located on the rear side of the wheel's side support point Ta of transverse link 337 in the vehicle front and rear direction.

Figure 39A:
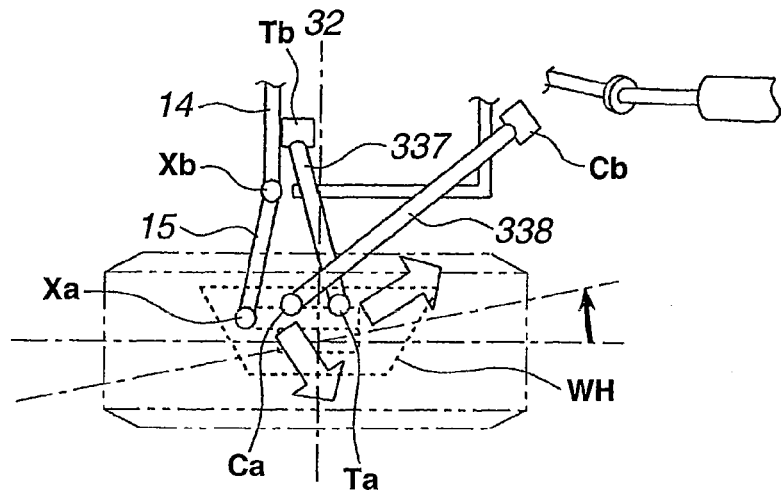
FIG. 39(a) is a partial plan view (the left front wheel) schematically showing the construction of suspension apparatus 1B of FIG. 36.
Figure 39B:
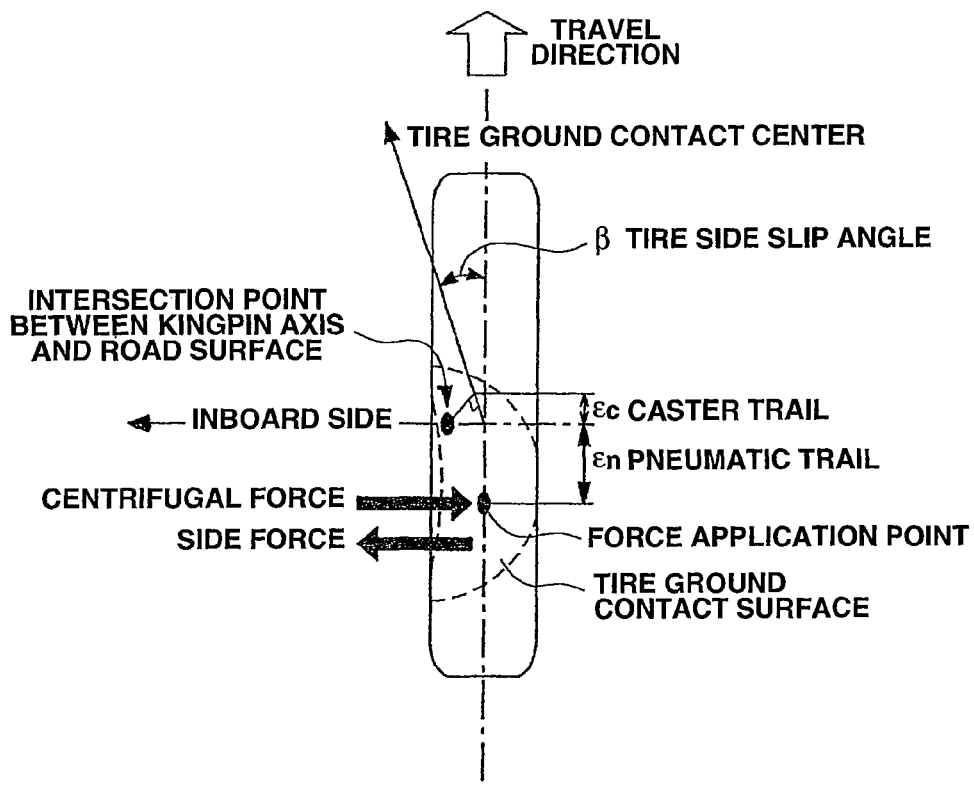
FIG. 39(b) is a view showing a tire ground contact patch (the right front wheel).

In this link arrangement, when a centrifugal force toward the turning outer side of the vehicle body acts at the tire ground contact center (force application point) O, as shown in FIG. 39(b), the side force acting toward the turning center, against the centrifugal force can be born mainly by the transverse link 337. Moreover, in this link arrangement, the vehicle body's side support point Tb of transverse link 337 is disposed on the front side of the wheel center in the vehicle front and rear direction. Therefore, when the side force (acting in the inboard direction toward the center of the vehicle) is inputted to the wheel, the wheel's side support point Ta of transverse link 337 is moved in the inboard direction toward the center of the vehicle, and the wheel's side support point Ca of compression link 338 is moved in the outboard direction toward the outer side of the vehicle. Therefore, this link arrangement can realize the compliance steer to direct the wheel to the toe-out direction against the inputted side force. Thus, this link arrangement can secure the compliance steer in the vehicle lateral direction.

Tie rod 15 is located on the lower side of axle 32, and arranged to connect a rack shaft 14 with axle carrier 33. Rack shaft 14 is arranged to transmit a rotational force (steering force) inputted from steering wheel 2 and thereby to produce a shaft force or axial force for turning or steering the wheels. Therefore, the axle carrier 33 receives the axial force in the vehicle widthwise direction from tie rod 15 in accordance with the rotation of steering wheel 2, and thereby turns or steer the wheel 17FR or 17FL.

In the suspension apparatus according to this embodiment, in the vehicle top view shown in FIG. 39(a), a wheel's side (axle carrier 33' side) support point Xa of tie rod 15 is located on the outboard side, in the vehicle widthwise direction, of the wheel's side support points Ta and Ca of transverse link 337 and compression link 338. Moreover, a vehicle body's side support point Xb (the position of a ball joint) of tie rod 15 is located on the front side of the wheel's side support point Xa in the vehicle front and rear direction.

As mentioned above, the wheel's side support point Ca of compression link 338 is located on the front side of the center of the wheel in the vehicle front and rear direction, and the wheel's side support point Ta of transverse link 337 is located on the rear side of the wheel center in the vehicle front and rear direction. The vehicle body's side support point Tb of transverse link 337 is located on the reart side of the wheel's side support point Ca of compression link 338 in the vehicle front and rear direction. The vehicle body's side support point Cb of compression link 338 is located on the rear side of the wheel's side support point Ta of transverse link 337 in the vehicle front and rear direction.

In this link arrangement, in the situation in which the force in the vehicle front and rear direction or longitudinal direction is dominant (such as a turning brake operation with a relatively hard braking), against the longitudinal force in the vehicle front and rear direction (the rearward force toward the rear of the vehicle) inputted to the tire ground contact point, the wheel's side support point Xa of tie rod 15 rotates about the vehicle body's side support point Xb and moves in the outboard direction toward the outer side of the vehicle. Moreover, the wheel's side support point Ca of compression link 338 moves in the outboard direction. The wheel's side support point Ta of transverse link 337 moves in the inboard direction. Therefore, this link arrangement can realize the compliance steer to direct the wheel in the toe-out direction, and secure the longitudinal compliance steer in the vehicle front and rear direction.

In the suspension apparatus 1B according to this embodiment, as shown in FIG. 39(b), the kingpin axis KS is so set that the kingpin axis passes through the tire ground contact surface or contact patch in the neutral state in which steering wheel 2 is at the neutral position, and the caster trail is located inside the tire ground contact surface or patch. Specifically, in the suspension apparatus 1B of this embodiment, the caster angle is set equal to a value close to zero, and the kingpin axis is so set that the caster trail approaches zero. This setting makes it possible to reduce the tire twisting torque at the time of steer operation, and reduce the moment about the kingpin axis. Moreover, the scrub radius is set equal to a positive scrub value greater than or equal to zero. With this setting, the caster trail is generated in an amount corresponding to the scrub radius with respect to a tire side slip angle at the time of steer operation to steer the wheel, and hence the suspension system can ensure the straightness or straight-line running performance.

In this embodiment, the transverse link 337 and compression link 338 serving as the lower link members connect the vehicle body 1 and the axle 32's side (the lower end of axle carrier 33) with each other in the crossing or intersecting state in which transverse link 337 and compression link 338 intersect each other. This crossing arrangement makes it possible to make the kingpin inclination (angle) smaller, and make the scrub radius greater to the positive scrub side, as compared to the non-crossing arrangement in which transverse and compression links 337 and 338 do not intersect each other. Therefore, the suspension system can decrease the tire twisting torque at the time of steer operation, and reduce the rack axial force required for the steer operation. Furthermore, according to this embodiment, the imaginary lower pivot point is moved to the inboard side of the vehicle body by the side force acting on the wheel at the time of steer operation, so that it is possible to improve the straightness due to the self-aligning torque (SAT).

Hereinafter, the suspension geometry in the suspension apparatus 1B is examined in detail.

(Analysis of Rack Axial Force Component)

As to the relationship between the rack stroke and the rack axial force at the time of steer operation, as shown in FIG. 5, the rack axial force contains the tire twisting torque and the wheel lifting torque mainly. Among these components of the rack axial force, the tire twisting torque is predominant. Therefore, it is possible to reduce the rack axial force by decreasing the tire twisting torque.

(Minimization of the Tire Twisting Torque)

The locus or trace of the center of the tire ground contact surface or contact patch at the time of steer operation is the same as shown in FIG. 6. FIG. 6 shows a characteristic in the case that the movement of the tire ground contact surface center or the center of the tire ground contact patch is great in the steer operation, and a characteristic in the case that the movement of tire ground contact surface center is small in the steer operation.

As evident from the above-mentioned result of the rack axial force components, it is effective to minimize the tire twisting torque at the time of steer operation, in order to reduce the rack axial force. In order to minimize the tire twisting torque in the steer operation, it is appropriate to decrease the locus of the tire ground contact surface center as shown in FIG. 6. Namely, it is possible to minimize the tire twisting torque by setting the tire ground contact surface center and the kingpin ground contact point or intercept in agreement or at the same position. Concretely, it is effective to set the caster trail equal to 0 mm and the scrub radius equal to or greater than 0 mm.

(Influence of Kingpin Inclination)

As one example of distribution of the rack axial force in the coordinate system using, as axes, the kingpin inclination and the scrub radius, the isoline or isoplethic diagram of FIG. 7 shows three isoplethic lines or equal-value lines for small, medium and great values of the rack axial force. With respect to input of the tire twisting torque, as the kingpin inclination becomes greater, its rotation moment becomes greater, and the rack axial force becomes greater. Accordingly, it is desirable to set the kingpin inclination smaller than a predetermined value. However, from the relationship with the scrub radius, it is possible to decrease the rack axial force to a desirable level by setting the kingpin inclination smaller than or equal to 15 degrees, for example.

The region surrounded by one-dot chain lines (boundary lines) in FIG. 7 is a region in which the kingpin inclination is smaller than an angle of 15 degrees which is a value estimated to be a value at which the side force exceeds a limit of friction, and at the same time the scrub radius is greater than or equal to 0 mm from the above-mentioned viewpoint of the tire twisting torque. In this embodiment, this region (in the direction decreasing the kingpin inclination from 15 degrees in the horizontal axis, and in the direction increasing the scrub radius from zero in the vertical axis) is treated as a region more suitable for setting. However, even in a region in which the scrub radius is negative, it is possible to obtain a certain effect by showing other condition in this embodiment.

Concretely, in determining the scrub radius and kingpin inclination, for example, it is possible to approximate an isoplethic line or equal-value line representing the distribution of the rack axial force, with a n-degree curve (n is an integer greater than or equal to 2), and to employ a value determined in accordance with the position of an inflexion point of the n-degree curve (or peak value) within the region surrounded by the one dot chain lines.

(Concrete Construction Examples)

Figure 40:
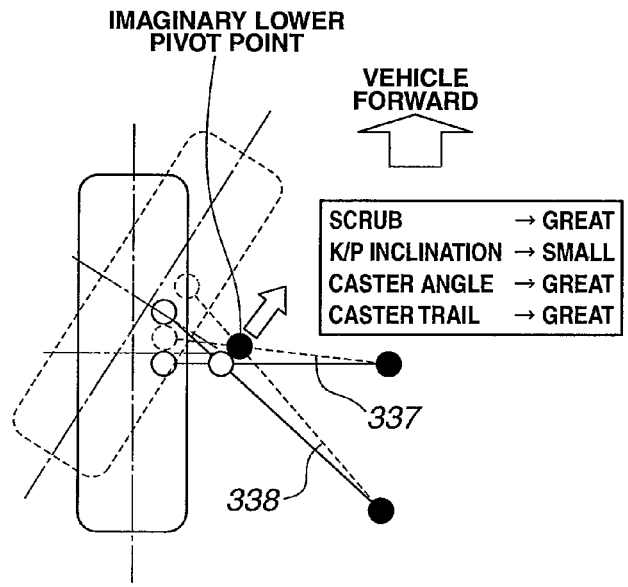
FIG. 40 is a schematic view showing an example in which the suspension apparatus 1B is constructed with a compression type suspension system.

FIG. 40 is a schematic view showing an example constructing the suspension apparatus 1B with a suspension apparatus of the compression type. In the example shown in FIG. 40, in the vehicle top view, the transverse link 337 (tension rod) extends along the axle, and the compression link 338 (a compression rod) is extended rearwards from the axle and connected with the vehicle body at a position on the rear side of the axle.

As shown in FIG. 40, in the arrangement of the double pivot type in which the lower link members are arranged to intersect each other in the compression type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension arrangement can set the imaginary lower pivot point at the position on the vehicle body inner side or inboard side as compared to the non-crossing type suspension arrangement in which the lower link members do not intersect. Therefore, this suspension arrangement can make the initial scrub radius greater in the positive scrub direction.

In the compression type suspension system shown in FIG. 40, because the rotation angle of the compression rod is great in the steer operation, the imaginary lower pivot point is shifted to the inboard side. In this case, in the vehicle top view, from the view point focused on the distance from the tire center line in the tire front and rear direction to the imaginary lower pivot point, the imaginary lower pivot point is moved in the inboard direction from the tire center line on the inboard side of the tire center line, and therefore the scrub radius becomes greater within the range of the positive scrub. Therefore, in the compression type suspension system, when this embodiment is applied, the rack axial force is decreased by the steer operation as the turning outer wheel.

In the case of the non-crossing compression type suspension system in which the lower link members do not intersect, because the rotation angle of the compression rod is great in the steer operation, the imaginary lower pivot point is shifted to the outboard side. In this case, in the vehicle top view, the distance from the tire center line in the tire front and rear direction to the imaginary lower pivot point is located on the outboard side of the tire center line, and therefore the scrub radius becomes greater in the direction to the negative scrub. Therefore, the rack axial force is increased by the steer operation.

Furthermore, in the example shown in FIG. 40, in the vehicle top view, the wheel center is moved to the inner side of the vehicle turning motion at the time of steer operation. Therefore, the suspension system can enhance the effect of reducing the rack axial force with the arrangement placing the rack shaft 14 on the front side of the axle as in this embodiment.

The relationship between the toe angle and the scrub radius in the compression type suspension system including the lower link members in the non-crossing arrangement, and the suspension system according to this embodiment is shown in FIG. 9.

As shown in FIG. 9, as compared to the non-crossing arrangement of the lower link members, the arrangement according to this embodiment can increase the scrub radius further in the vicinity of the neutral position (where the toe angle is zero). Moreover, in the direction increasing the steer angle at the turning outer wheel ("-" direction in FIG. 9), the scrub radius is increased and it is possible to decrease the rack axial force.

(Straightness with Positive Scrub)

As to the self-aligning torque in the positive scrub setting, as shown in FIG. 11, the restoring force (the self-aligning torque) acting on the tire increases in proportion to the sum of the caster trail and the pneumatic trail.

In the case of the positive scrub, it is possible to regard, as the caster trail, the distance $\epsilon c$ (cf. FIG. 11) from the wheel center, determined by the position of a foot of a perpendicular line drawn from the ground contact point of the kingpin axis, to a straight line extending, through the tire ground contact center, in the direction of the tire side slip angle $\beta$.

Therefore, the restoring force acting on the tire at the time of steer operation become greater as the scrub radius of the positive scrub becomes greater.

In this embodiment, the kingpin axis is set in the positive scrub arrangement, and it is possible to secure the initial scrub radius at a large level in comparison with the arrangement of the non-crossing lower link members. Therefore, the suspension system of this embodiment can reduce the influence on the straightness by the setting of the caster angle closer to zero. Moreover, by the use of the steer-by-wire mode, the suspension system can ensure the intended straightness with the steer actuator 8 finally.

(Operation)

Following is explanation on operation of the suspension apparatus 1B according to this embodiment.

In the suspension apparatus 1B according to this embodiment, the two lower link members are in the form of I arm. The transverse link 337 is arranged to extend in the vehicle widthwise direction from axle carrier 33, and the compression link 338 is arranged to extend obliquely toward the rear of the vehicle from the lower end of axle carrier 33, in the crossing state intersecting the transverse link 337. Specifically, the wheel's side support point Ta of transverse link 337 is located on the rear side of the center of the wheel in the vehicle front and rear direction. The wheel's side support point Ca of compression link 338 is located on the front side of the center of the wheel in the vehicle front and rear direction. The vehicle body's side support point Tb of transverse link 337 is located on the rear side of the wheel's side support point Ca of compression link 338 in the vehicle front and rear direction. The vehicle body's side support point Cb of compression link 338 is located on the rear side of the wheel's side support point Ta of transverse link 337 in the vehicle front and rear direction.

In this suspension arrangement, the side or lateral force inputted to the wheel at the time of steer operation or the like can be born, in a greater part, by the transverse link 337. Moreover, in the case of input of the side force in the inboard direction toward the center of the vehicle to the wheel on the turning outer side, the transverse link 337 rotates to the inboard side, and the compression link 338 rotate to the outboard side. Therefore, this link arrangement can provide the toe out characteristic to the wheel.

In the suspension apparatus 1B, in the vehicle top view, the wheel's side support point Xa of tie rod 15 is located on the outboard side of the wheel's side support points Ta and Ca of transverse link 337 and compression link 338 in the vehicle widthwise direction. Moreover, the vehicle body's side support point Xb (ball joint position) of tie rod 15 is located on the rear side of the wheel's side support point Xa in the vehicle front and rear direction.

In the case of this suspension structure, against a force in the vehicle front and rear direction (the rearward force toward the rear of the vehicle) inputted at the tire ground contact point in the situation in which the force in the vehicle front and rear direction is dominant, the wheel's side support point Ta of transverse link 337 moves in the inboard direction. Moreover, the wheel's side support point Xa of tie rod 15 rotates about the vehicle body's side support point Xb and moves in the outboard direction. The wheel side support point Ca of compression link 338 moves in the outboard direction. Therefore, this suspension structure can realize the compliance steer to direct the wheel to the toe-out direction against the inputted rearward force.

Furthermore, in this suspension structure, for each of the lower link members, a straight line is imagined to connect the inboard support point on the vehicle body's side with the outboard support point on the wheel's side. The intersection point of these imaginary straight lines serves as the imaginary lower pivot point of the lower links. The kingpin axis is the straight line connecting this imaginary lower pivot point with the upper pivot point formed by the upper end of the strut.

In this embodiment, the kingpin axis is set so that the kingpin axis passes through a point inside the tire ground contact surface or contact patch in the state of the steering wheel 2 at the neutral position, and the caster trail is located inside the tire ground contact surface or contact patch.

For example, the kingpin axis is so set that the caster angle is equal to 0 degree, the caster trail is equal to 0 mm, and the scrub radius is equal to a positive scrub value greater than or equal to 0 mm. Moreover, the kingpin inclination is set in a range (smaller than or equal to 15 degrees, for example) to make the kingpin inclination small within the range capable of making the scrub radius positive.

With the thus-set suspension geometry, the suspension system can make smaller the trace or locus of the tire ground contact surface center during the steer operation, and reduce the tire twisting torque.

Therefore, the suspension system can reduce the rack axial force, hence reduce the moment about the kingpin axis, and reduce the output of steer actuator 8. Moreover, the suspension system can control the direction of the wheel with a smaller force, and thereby improve the stability and controllability.

In the suspension apparatus 1B according to this embodiment, the two lower link members are arranged in the crossing state intersecting each other. In this structure, it is easier to dispose the imaginary lower pivot point on the inboard side of the tire ground contact surface center.

Therefore, it is easier to set the kingpin inclination at a value closer to 0 degree, and to increase the scrub radius on the positive scrub side.

Furthermore, despite of the possibility of the influence on the straightness of the suspension structure, by the setting of the caster angle at 0 degree and the caster trail at 0 mm, the setting of the positive scrub reduces the influence. Moreover, the suspension system secures the straightness by adding the control with the steer actuator 8. Thus, the suspension system can improve the stability and controllability.

Furthermore, as to the limitation of the kingpin inclination to the predetermined range, with the steer operation of steer actuator 8, it is possible to avoid heavy feeling from being imparted to the driver. As to the kickback by an external force from the road surface, the suspension system can cope with the external force with steer actuator 8, and thereby avoid influence to the driver. Thus, the suspension system can improve the stability and controllability.

As mentioned above, the suspension apparatus 1B according to this embodiment makes it possible to set the imaginary lower pivot point toward the inboard side in the vehicle widthwise direction because of the crossing arrangement of the transverse link 337 extending approximately in parallel to the axle and the compression link 338 intersecting the transverse link 337 in the vehicle top view. Furthermore, the kingpin axis defined by this imaginary lower pivot point is set so that the kingpin inclination is small, and the caster trail is formed inside the tire ground contact surface or patch. Therefore, the suspension apparatus can decrease the moment about the kingpin axis.

Therefore, the suspension apparatus enables a steer operation to steer the wheels with a smaller rack axial force, and control the directions of the wheels with a smaller force, so that the suspension apparatus can improve the stability and controllability.

As the result of the decrease of the moment about the kingpin axis, the suspension apparatus can reduce the load applied on the rack shaft 14 and tie rod(s) 15, so that it is possible to simplify the component parts.

Moreover, it is possible to use an actuator of lower driving ability as the steer actuator 8 realizing the steer-by-wire system, and thereby to reduce the cost and weight of the vehicle.

For example, in comparison with a conventional steer-by-wire type suspension system, the construction according to this embodiment makes it possible to reduce the weight by about 10%, and reduce the cost by about 50% mainly by simplifying the lower link members and reducing the size of steer actuator 8.

Moreover, the suspension apparatus has the structure to increase the caster trail at the time of steer operation. Therefore, the suspension apparatus can retrain an increase of the steer angle in a cornering operation producing a high lateral acceleration or side acceleration.

Furthermore, since the imaginary lower pivot point is moved to the inboard side by the action of the side force acting on the wheel at the time of steer operation, the scrub radius is increased, and the straightness by the self-aligning torque (SAT) can be improved.

With the crossing arrangement of the lower link members, the support point of the lower link member can be placed near the wheel center, so that it is possible to reduce the weight of axle carrier 33.

The relationship between the kingpin inclination (angle) and the scrub radius according to this embodiment is shown in FIG. 12. FIG. 12 shows, in addition to the above-mentioned compression type arrangement according to this embodiment, the tension type arrangement according to this embodiment, and further shows, as comparative examples, compression type and tension type non-crossing arrangements of the non-crossing lower link members (cf. the first embodiment) and the single pivot type arrangement.

As shown in FIG. 12, in the practical examples of the compression type and the tension type according to the invention, it is possible to set the kingpin inclination at an angle closer to 0 degree and to set the scrub radius at a greater value on the positive scrub side, in comparison with the single pivot type example and the double pivot type non-crossing comparative examples of the non-crossing lower link members.

Specifically, in the practical example of the compression type according to the present invention, it is possible to obtain higher effects in the effect of decreasing the kingpin inclination to zero degree and the effect of increasing the scrub radius on the positive scrub side.

Furthermore, the transverse link 337 is arranged approximately in parallel to the axle, and the wheel's side support point Ta of transverse link 337 is disposed on the rear side of the center of the wheel in the vehicle front and rear direction. The compression link 338 is inclined more than transverse link 337, with respect to the axle (disposed in such an orientation that the wheel's side support point is on the front side, and the vehicle body's side support point is on the rear side). The wheel's side support point Ca of compression link 338 is located on the front side of the center of the wheel in the vehicle front and rear direction. The vehicle body's side support point Tb of transverse link 337 is located on the rear side of the wheel's side support point Ca of compression link 338 in the vehicle front and rear direction. The vehicle body's side support point Cb of compression link 338 is located on the rear side of the wheel's side support point Ta of transverse link 337 in the vehicle front and rear direction.

In this link arrangement, the side force inputted to the wheel can be born mainly by the transverse link 337. Moreover, in this link arrangement, the vehicle body's side support point Tb of transverse link 337 is disposed on the front side of the wheel center in the vehicle front and rear direction. Therefore, when the side force (acting in the inboard direction toward the center of the vehicle) is inputted to the wheel, the wheel's side support point Ta of transverse link 337 is moved in the inboard direction toward the center of the vehicle, and the wheel's side support point Ca of compression link 338 is moved in the outboard direction toward the outer side of the vehicle. Therefore, this link arrangement can realize the compliance steer to direct the wheel to the toe-out direction against the inputted side force.

In the suspension apparatus 1B, in the vehicle top view, the wheel's side support point Xa of tie rod 15 is located on the outboard side of the wheel's side support points Ta and Ca of transverse link 337 and compression link 338 in the vehicle widthwise direction. Moreover, the vehicle body's side support point Xb of tie rod 15 is located on the rear side of the wheel's side support point Xa in the vehicle front and rear direction.

In the case of this suspension structure, against the force in the vehicle front and rear direction (the rearward force toward the rear of the vehicle) inputted at the tire ground contact point in the situation in which the force in the vehicle front and rear direction is dominant, the wheel's side support point Ta of transverse link 337 moves in the inboard direction. Moreover, the wheel's side support point Xa of tie rod 15 rotates about the vehicle body's side support point Xb and moves in the outboard direction. The wheel's side support point Ca of compression link 338 moves in the outboard direction. Therefore, this suspension structure can realize the compliance steer to direct the wheel to the toe-out direction.

Therefore, the vehicle suspension apparatus according to this embodiment can provide an adequate compliance steer characteristic with respect to the longitudinal force of the vehicle.

Figure 41A:
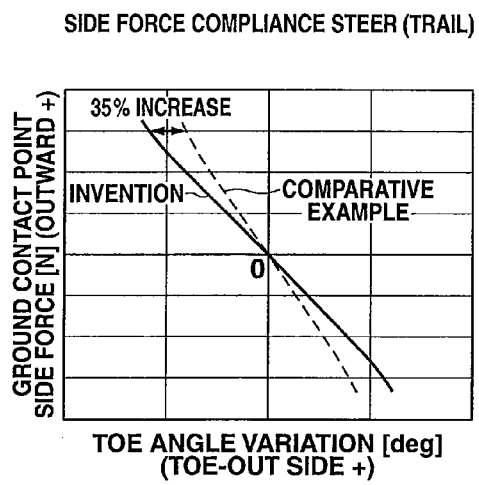
FIGS. 41(a) and 41(b) are views showing side force or lateral compliance steer and lateral stiffness in the suspension apparatus 1B and a comparative example.
Figure 41B:
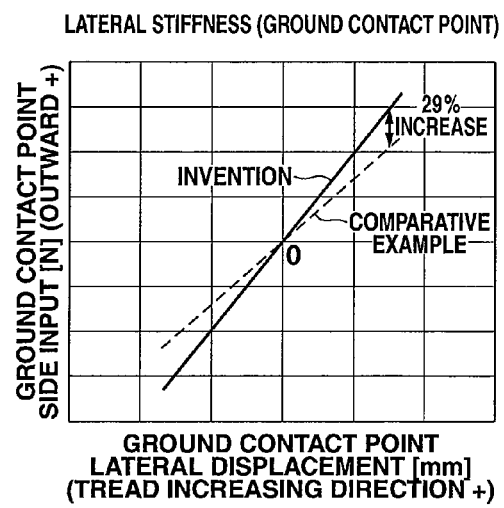

FIGS. 41(a) and 41(b) are views showing the side force compliance steer and the lateral stiffness in the suspension apparatus 1B according to this embodiment and a comparative example. In the comparative example in FIG. 41, the suspension system is the compression type suspension system in which the lower link members do not intersect.

As shown in FIG. 41, in the case of the construction of the suspension apparatus 1B according to this embodiment (solid lines in FIG. 40), the side force compliance steer is improved by 35% and the lateral stiffness is improved by 29% as compared to the comparative example (broken lines in FIG. 41).

Figure 42:
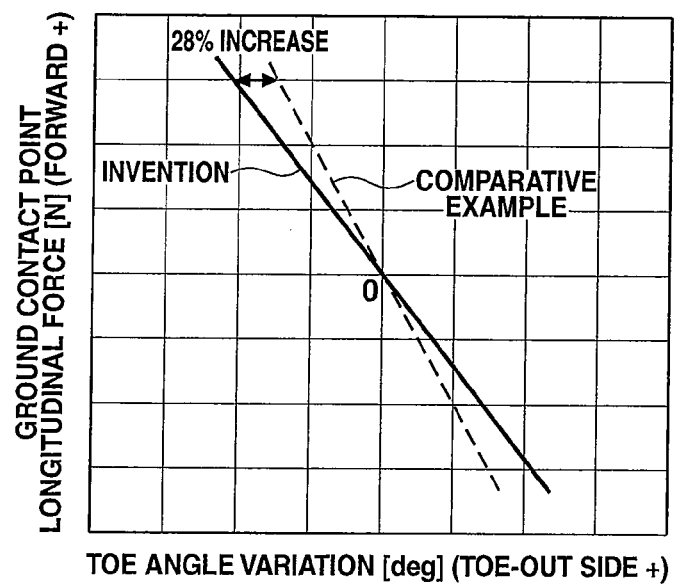
FIG. 42 is a view showing a longitudinal force compliance steer in the suspension apparatus and a comparative example.

FIG. 42 is a view showing the longitudinal forcee compliance steer in the suspension apparatus 1B according to this embodiment and the comparative example. In the comparative example in FIG. 42, the suspension system is the compression type suspension system in which the lower link members do not intersect.

As shown in FIG. 42, in the case of the construction of the suspension apparatus 1B according to this embodiment (solid lines in FIG. 42), the longitudinal force compliance steer is improved by 28% as compared to the comparative example (broken lines in FIG. 42).

In this embodiment, the wheels 17FR, 17FL, 17RR and 17RL correspond to the tire wheel, tire and wheel hub mechanism WH. Transverse link 337 corresponds to the transverse link member and the first link member, and compression link 338 corresponds to the compression link member and the second link member. Tie rod 15 corresponds to the tie rod member.

Effects of Fourth Embodiment (1) There is provided the transverse link member connecting the wheel hub mechanism WH and the wheel on the lower side of the axle in the vehicle up and down direction, and extending along the axle. Moreover, there is provided the compression link member. The connection portion of the compression link member with the vehicle body is located on the rear side of the connect portion of the transverse link member with the vehicle body in the vehicle front and rear direction, and the connect portion of the compression link member with the wheel hub mechanism is located on the front side of the connect portion of the transverse link member with the wheel hub mechanism in the vehicle front and rear direction. Furthermore, there is provided the tie rod member connected with the wheel hub mechanism WH on the outboard side of the connect portions of the transverse link member and compression link member with the wheel hub mechanism, connected with the vehicle body on the rear side of the connect portion of the tie rod member with the wheel hub mechanism WH, and arranged to steer the wheel.

Therefore, against a rearward force in the vehicle front and rear direction inputted at the tire ground contact point in the situation in which the longitudinal force in the vehicle front and rear direction is dominant, the wheel's side connect portion of transverse link moves in the inboard direction. Moreover, the wheel's side connect portion of the tie rod member rotates about the vehicle body's side connect portion and moves in the outboard direction. The wheel's side connect portion of the compression link member moves in the outboard direction. Therefore, this suspension structure can realize the compliance steer to direct the wheel to the toe-out direction. Accordingly, in the vehicle suspension apparatus, it is possible to obtain an adequate compliance steer characteristic against a longitudinal force in the vehicle front and rear direction.

(2) The connect portion between the transverse link member and the wheel hub mechanism WH is located on the rear side of the axle in the vehicle front and rear direction, and the connect portion between the transverse link member and the vehicle body is located on the front side of the axle in the vehicle front and rear direction.

Therefore, in the case of the side force inputted to the wheel as the turning outer wheel, the connect portion between the transverse link member and the wheel hub mechanism WH can be shifted in the inboard direction, and hence the toe-out characteristic can be imparted to the turning outer wheel.

(3) The connect portion between the transverse link member and the vehicle body is located on the rear side of the connect portion between the compression link member and the wheel hub mechanism in the vehicle front and rear direction.

Therefore, it is possible to set or fix the rotational direction in one direction while holding the transverse link member approximately parallel to the axle.

(4) The connect portion between the compression link member and the wheel hub mechanism WH is located on the front side of the axle in the vehicle front and rear direction, and the connect portion between the compression link member and the vehicle body is located on the rear side of the connect portion between the transverse link member and the wheel hub mechanism in the vehicle front and rear direction.

This link arrangement makes it possible to increase the inclination angle of the compression link member with respect to the axle, and to shift the position of the imaginary lower pivot point in the inboard direction to the inside of the vehicle body.

(5) The kingpin axis having a lower pivot point set at the intersection point of the transverse link member and the compression link member in the vehicle top view passes through the tire ground contact surface or contact patch in the state in which the steering wheel is at the neutral position.

This arrangement makes it possible to decrease the moment about the kingpin axis, to steer the wheel with a smaller rack axial force and to control the direction of the wheel with a smaller force. Therefore, it is possible to improve the stability and controllability.

(6) The suspension apparatus is arranged to suspend the steerable wheel steered by the steer-by-wire system. Therefore, by utilizing the steer actuator of the steer-by-wire system, it is possible to perform the control corresponding to the setting of the caster trail according to this embodiment as in the second and third embodiments, and to improve the safety and controllability.

(7) In the vehicle top view, the transverse and compression link members connecting the vehicle body and the wheel are arranged by disposing the transverse link member along the axle and disposing the compression link member so that the compression link member intersects the transverse link member with the wheel's side connect portion of the compression link member being located on the front side of the transverse link member, and the vehicle body's side connect portion of the compression link member being located on the rear side of the transverse link member. Furthermore, the tie rod member for steering the wheel is connected with the wheel hub mechanism WH on the outboard side of the connect portions of the transverse link member and compression link member with the wheel hub mechanism, and connected with the vehicle body on the rear side of the connect portion of the tie rod member with the wheel hub mechanism WH. Therefore, against the longitudinal force in the rearward direction, the wheel's side connect portion of the transverse link member is caused to move in the inboard direction, and the wheel's side connect portion of the tie rod member is caused to move in the outward direction.

Therefore, against the rearward force in the vehicle front and rear direction inputted at the tire ground contact point in the situation in which the longitudinal force in the vehicle front and rear direction is dominant, the wheel's side connect portion of the transverse link member moves in the inboard direction. Moreover, the wheel's side connect portion of the tie rod member rotates about the vehicle body's side connect portion and moves in the outboard direction. The wheel's side connect portion support point of the compression link member moves in the outboard direction.

Therefore, this suspension structure can realize the compliance steer to direct the wheel to the toe-out direction. Accordingly, in the vehicle suspension apparatus, it is possible to obtain an adequate compliance steer characteristic against a longitudinal force in the vehicle front and rear direction.

The fourth embodiment is the same, in the effects of the control/drive circuit 6, as the first embodiment.

Fifth Embodiment

Following is explanation on a fifth embodiment of the present invention.

A motor vehicle 1 according to the fifth embodiment is the same in function and construction as FIG. 1 in the first embodiment. Motor vehicle 1 according to the fifth embodiment is different in the construction of suspension apparatus 1B, from the first embodiment.

Therefore, the following explanation is directed to the construction of suspension apparatus 1B.

Figure 43:
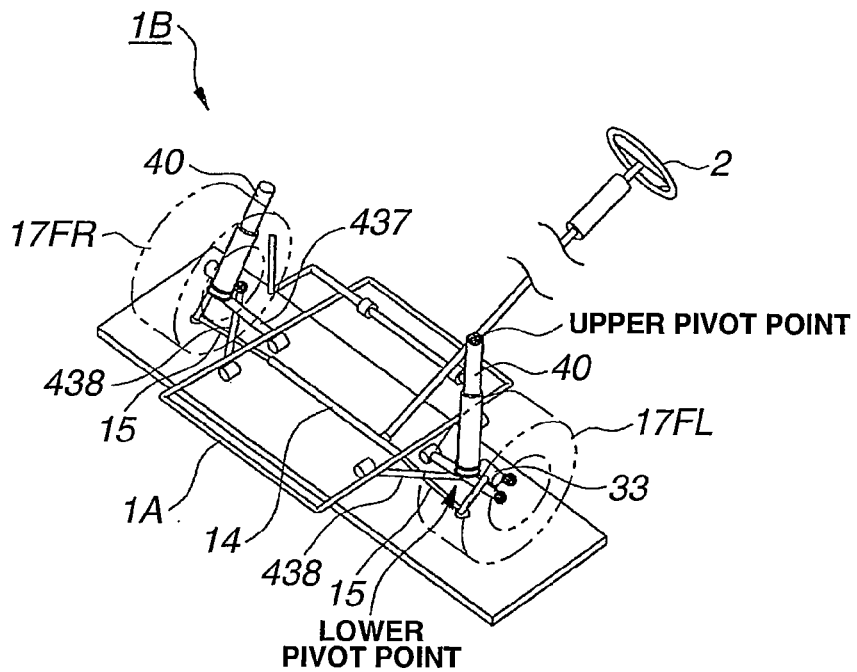
FIG. 43 is a perspective view schematically showing the construction of suspension apparatus 1B according to a fifth embodiment.
Figure 44:
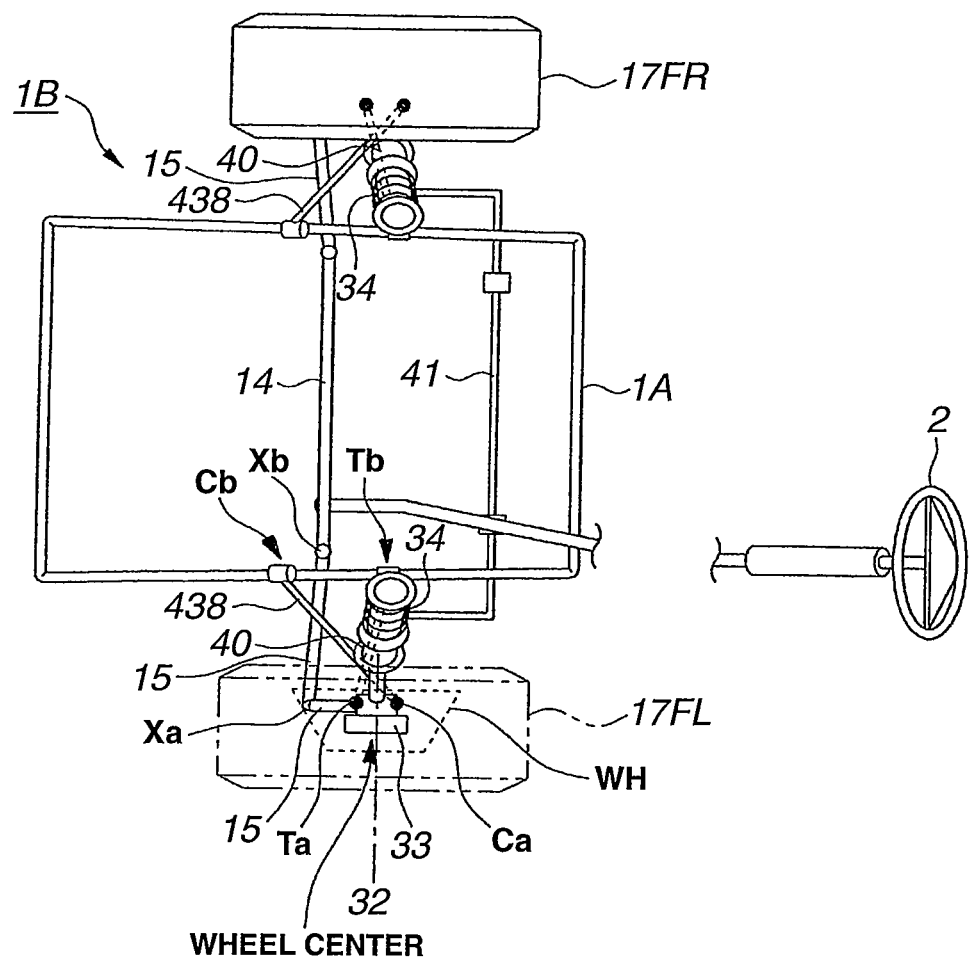
FIG. 44 is a plan view schematically showing the construction of the suspension apparatus 1B of FIG. 43.
Figure 45A:
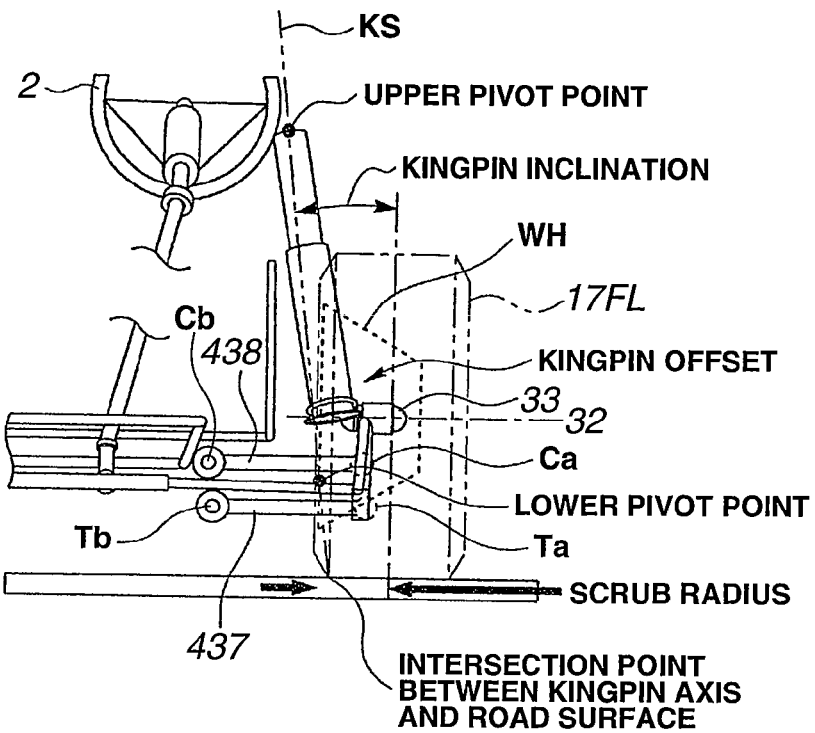
FIGS. 45(a) and 45(b) are partial front view and partial side view schematically showing the construction of the suspension apparatus 1B of FIG. 43.
Figure 45B:
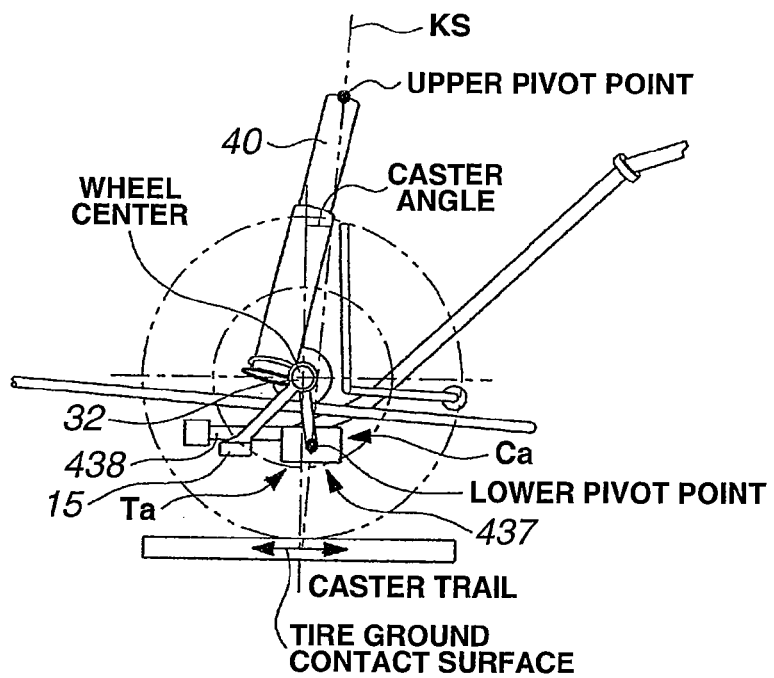
Figure 46A:
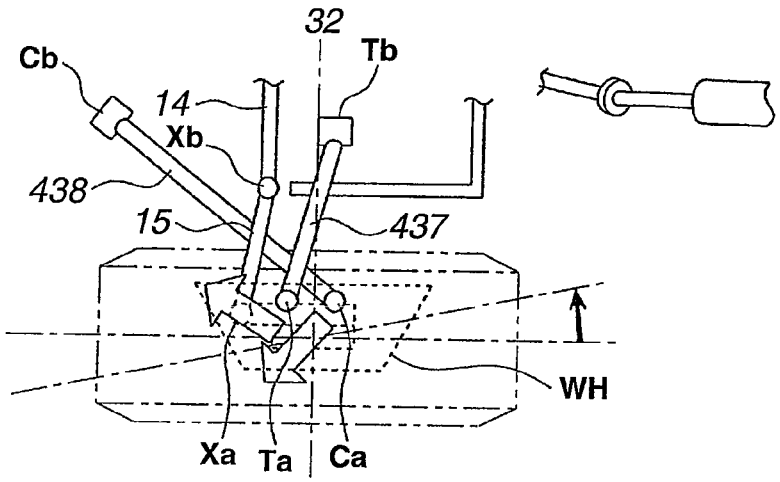
FIG. 46(a) is a partial plan view (the left front wheel) schematically showing the construction of suspension apparatus 1B of FIG. 43.
Figure 46B:
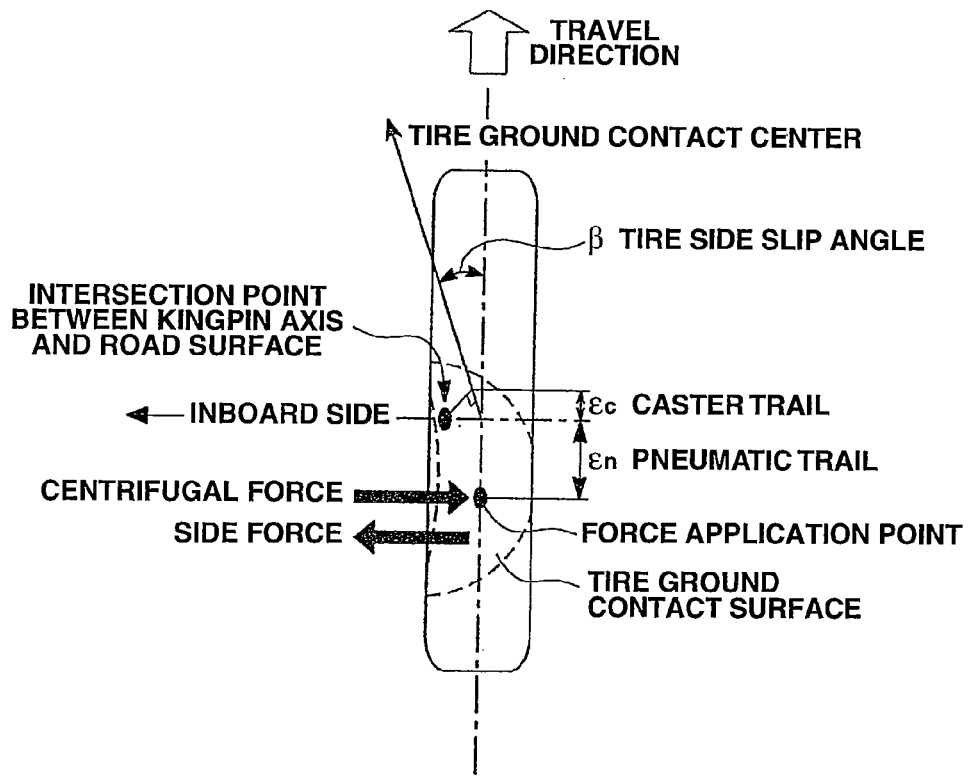
FIG. 46(b) is a view showing a tire ground contact patch (the right front wheel).

FIG. 43 is a perspective view schematically showing the construction of suspension apparatus 1B according to the fifth embodiment. FIG. 44 is a plan view schematically showing the construction of the suspension apparatus 1B of FIG. 43. FIGS. 45(a) and 45(b) are partial front view and partial side view schematically showing the construction of the suspension apparatus 1B of FIG. 43. FIG. 46(a) is a partial plan view (the left front wheel) schematically showing the construction of suspension apparatus 1B of FIG. 43, and FIG. 46(b) is a view showing a tire ground contact patch (the right front wheel).

As shown in FIGS. 43~46, the suspension apparatus or suspension system 1B is a tension type suspension apparatus supporting wheels 17FR and 17FL attached to wheel hub mechanisms WH, and includes, on each of the right and left sides, an axle carrier 33 including an axis or shaft of the wheel (axle) 32 supporting the wheel 17FR or 17FL rotatably, a plurality of link members disposed in the vehicle body widthwise direction from a support portion on the vehicle body's side or inboard side and connected with the axle carrier 33, and a spring member 34 such as a coil spring.

The link members include a transverse link (transverse link member as the first link member) 437 and a tension link (tension link member as the second link member) 438 which are lower link members, a tie rod (tie rod member) 15 and a strut (spring member 34 and a shock absorber 40) ST. In this embodiment, the suspension apparatus 1B is a strut type suspension system, and the strut ST formed as a unit by the spring member 34 and shock absorber 40 extends to an upper end connected with the vehicle body's side support portion located above the axle 32 (hereinafter, the upper end of the strut ST is referred to as "upper pivot point" suitably).

The transverse link 437 and tension link 438 forming the lower links connect the vehicle body's side support portion located below the axle 32, with a lower end of the axle carrier 33. In this embodiment, the transverse link 437 and tension link 438 are in the form of I arm independent from each other. The transverse link 437 and tension link 438 are connected with the vehicle body at two respective support or connect portions, and connected with the axle 32's side at two respective support or connect portions. Moreover, the transverse link 437 and tension link 438 in this embodiment are arranged to connect the vehicle body 1A and the axle 32's side (axle carrier 33) with each other in the crossing or intersecting state in which transverse and tension links 437 and 438 intersect each other (hereinafter, an intersection point between imaginary links formed by transverse link 437 and tension link 438 is referred to as "lower pivot point" suitably).

Among these lower links, the transverse link 437 is disposed so that transverse link 437 is approximately parallel to the axle. In the vehicle top view, the wheel's side support point Ta of transverse link 437 is located on the front side of the center of the wheel (the axle) in the vehicle front and rear direction. The tension link 438 is disposed so that tension link 438 is inclined with respect to the axle, more than transverse link 437 (tension link 438 is oriented so that the wheel's side support point is located on the rear side and the vehicle body's side support point is located on the front side). The wheel's side support point Ca of tension link 438 is located on the rear side of the center of the wheel in the vehicle front and rear direction. The vehicle body's side support point Tb of transverse link 437 is located on the front side of the wheel's side support point Ca of tension link 438 in the vehicle front and rear direction. The vehicle body's side support point Cb of tension link 438 is located on the front side of the wheel's side support point Ta of transverse link 437 in the vehicle front and rear direction.

In this link arrangement, when a centrifugal force toward the turning outer side of the vehicle body acts at the tire ground contact center (force application point) O, as shown in FIG. 46(b), the side force acting toward the turning center, against the centrifugal force can be born mainly by the transverse link 437. Moreover, in this link arrangement, the vehicle body's side support point Tb of transverse link 437 is disposed on the rear side of the wheel center in the vehicle front and rear direction. Therefore, when the side force (acting in the inboard direction) is inputted to the wheel, the wheel's side support point Ta of transverse link 437 is moved in the inboard direction toward the center of the vehicle, and the wheel's side support point Ca of tension link 438 is moved in the outboard direction toward the outer side of the vehicle. Therefore, this link arrangement can realize the compliance steer to direct the wheel to the toe-in direction against the inputted side force.

Tie rod 15 is located on the lower side of axle 32, and arranged to connect a rack shaft 14 with axle carrier 33. Rack shaft 14 is arranged to transmit a rotational force (steering force) inputted from steering wheel 2 and thereby to produce a shaft force or axial force for turning or steering the wheels. Therefore, the axle carrier 33 receives the axial force in the vehicle widthwise direction from tie rod 15 in accordance with the rotation of steering wheel 2, and thereby turns or steer the wheel 17FR or 17FL.

In the suspension apparatus according to this embodiment, in the vehicle top view shown in FIG. 46(a), a wheel's side (axle carrier 33' side) support point Xa of tie rod 15 is located on the outboard side, in the vehicle widthwise direction, of the wheel's side support points Ta and Ca of transverse link 437 and tension link 438. Moreover, a vehicle body's side support point Xb (the position of a ball joint) of tie rod 15 is located on the rear side of the wheel's side support point Xa in the vehicle front and rear direction.

As mentioned above, the wheel's side support point Ca of tension link 438 is located on the rear side of the center of the wheel in the vehicle front and rear direction, and the wheel's side support point Ta of transverse link 437 is located on the front side of the wheel center in the vehicle front and rear direction. The vehicle body's side support point Tb of transverse link 437 is located on the front side of the wheel's side support point Ca of tension link 438 in the vehicle front and rear direction. The vehicle body's side support point Cb of tension link 438 is located on the front side of the wheel's side support point Ta of transverse link 437 in the vehicle front and rear direction.

In this link arrangement, in the situation in which the force in the vehicle front and rear direction or longitudinal direction is dominant (such as a turning brake operation with a relatively hard braking), against the longitudinal force in the vehicle front and rear direction (the rearward force toward the rear of the vehicle) inputted to the tire ground contact point, the wheel's side support point Xa of tie rod 15 rotates about the vehicle body's side support point Xb and moves in the outboard direction toward the outer side of the vehicle. Moreover, the wheel's side support point Ca of tension link 438 moves in the inboard direction. The wheel's side support point Ta of transverse link 437 moves in the outboard direction. Therefore, this link arrangement can realize the compliance steer to direct the wheel in the toe-out direction, and secure the longitudinal compliance steer in the vehicle front and rear direction.

In the suspension apparatus 1B according to this embodiment, as shown in FIG. 39(b), the kingpin axis is so set that the kingpin axis passes through the tire ground contact surface or contact patch in the neutral state in which steering wheel 2 is at the neutral position, and the caster trail is located inside the tire ground contact surface or patch.

Specifically, in the suspension apparatus 1B of this embodiment, the caster angle is set equal to a value close to zero, and the kingpin axis is so set that the caster trail approaches zero. This setting makes it possible to reduce the tire twisting torque at the time of steer operation, and reduce the moment about the kingpin axis. Moreover, the scrub radius is set equal to a positive scrub value greater than or equal to zero. With this setting, the caster trail is generated in an amount corresponding to the scrub radius with respect to a tire side slip angle at the time of steer operation to steer the wheel, and hence the suspension system can ensure the straightness or straight-line running performance.

In this embodiment, the transverse link 437 and tension link 438 serving as the lower link members connect the vehicle body 1 and the axle 32's side (the lower end of axle carrier 33) with each other in the crossing or intersecting state in which transverse link 437 and tension link 438 intersect each other. This crossing arrangement makes it possible to make the initial kingpin inclination (angle) smaller, and make the initial scrub radius greater to the positive scrub side, as compared to the non-crossing arrangement in which transverse and tension links 437 and 438 do not intersect each other. Therefore, the suspension system can decrease the tire twisting torque at the time of steer operation, and reduce the rack axial force required for the steer operation. Furthermore, according to this embodiment, the imaginary lower pivot point is moved to the outboard side of the vehicle body by the side force acting on the wheel at the time of steer operation, so that it is possible to improve the steering response.

(Concrete Construction Examples)

Figure 47:
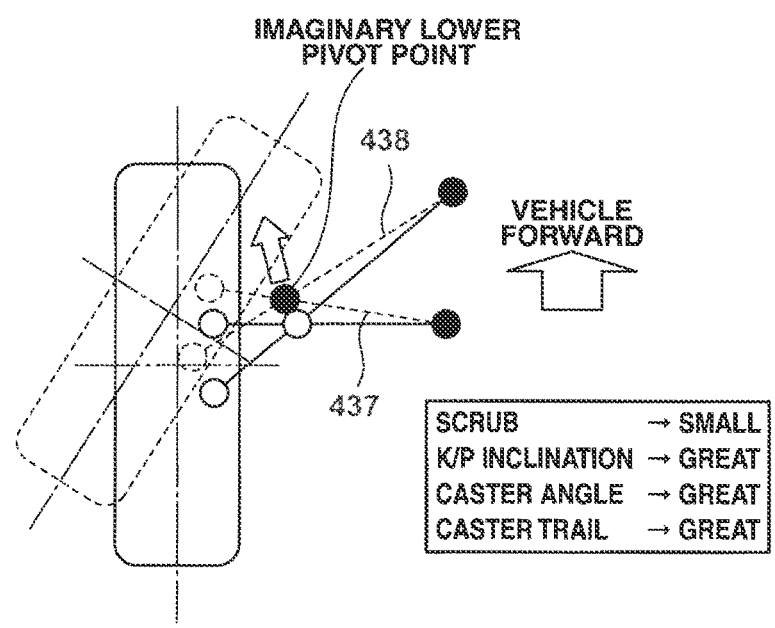
FIG. 47 is a schematic view showing an example in which the suspension apparatus 1B is formed with a tension type suspension system.

FIG. 47 is a schematic view showing an example constructing the suspension apparatus 1B with a suspension apparatus of the tension type. As shown in FIG. 47, in the arrangement of the double pivot type in which the lower link members are arranged to intersect each other in the compression type suspension system, the lower link members enable the steer operation to steer the wheel as the turning outer wheel on the outer side of a turning motion of the vehicle, by rotating forwards toward the front of the vehicle about the vehicle body's side support points (the state shown by broken lines). In this case, the imaginary lower pivot point is positioned at the intersection point between the lower link members. This suspension arrangement can set the imaginary lower pivot point at the position on the vehicle body inner side or inboard side as compared to the non-crossing type suspension arrangement in which the lower link members do not intersect. Therefore, this suspension arrangement can make the initial scrub radius greater in the positive scrub direction.

In the tension type suspension system shown in FIG. 47, because the rotation angle of the tension rod is great in the steer operation, the imaginary lower pivot point is shifted to the outboard side. In this case, in the vehicle top view, from the view point focused on the distance from the tire center line in the tire front and rear direction to the imaginary lower pivot point, the imaginary lower pivot point is moved in the outboard direction from the tire center line on the inboard side of the tire center line, and therefore the scrub radius becomes smaller within the range of the positive scrub. Therefore, in the tension type suspension system, when this embodiment is applied, the rack axial force is increased by the steer operation as the turning outer wheel. However, the initial scrub radius in the non-steering state is set large enough. Therefore, the rack axial force can be set smaller as compared to the non-crossing tension type suspension system.

In the case of the non-crossing tension type suspension system in which the lower link members do not intersect, because the rotation angle of the tension rod is great in the steer operation, the imaginary lower pivot point is shifted to the inboard side. In this case, in the vehicle top view, the distance from the tire center line in the tire front and rear direction to the imaginary lower pivot point is located on the inboard side of the tire center line, and therefore the scrub radius becomes greater in the direction to the positive scrub. Therefore, the rack axial force is decreased by the steer operation. However, since the imaginary lower pivot point is located on an extension of each link, the scrub radius in the initial state with no steer operation is small, and it is not easy to decrease the rack axial force largely.

(Operation)

Following is explanation on operation of the suspension apparatus 1B according to this embodiment.

In the suspension apparatus 1B according to this embodiment, the two lower link members are in the form of I arm. The transverse link 437 is arranged to extend in the vehicle widthwise direction from axle carrier 33, and the tension link 438 is arranged to extend obliquely toward the front of the vehicle from the lower end of axle carrier 33, in the crossing state intersecting the transverse link 437. Specifically, the wheel's side support point Ta of transverse link 437 is located on the front side of the center of the wheel in the vehicle front and rear direction. The wheel's side support point Ca of tension link 438 is located on the rear side of the center of the wheel in the vehicle front and rear direction. The vehicle body's side support point Tb of transverse link 437 is located on the front side of the wheel's side support point Ca of tension link 438 in the vehicle front and rear direction. The vehicle body's side support point Cb of tension link 438 is located on the front side of the wheel's side support point Ta of transverse link 437 in the vehicle front and rear direction.

In this suspension arrangement, the side force inputted to the wheel at the time of steer operation or the like can be born, in a greater part, by the transverse link 437. Moreover, in the case of input of the side force in the inboard direction toward the center of the vehicle to the wheel on the turning outer side, the transverse link 437 rotates to the inboard side, and the tension link 438 rotate to the outboard side. Therefore, this link arrangement can provide the toe-in characteristic to the wheel.

In the suspension apparatus 1B, in the vehicle top view, the wheel's side support point Xa of tie rod 15 is located on the outboard side of the wheel's side support points Ta and Ca of transverse link 437 and tension link 438 in the vehicle widthwise direction. Moreover, the vehicle body's side support point Xb (ball joint position) of tie rod 15 is located on the rear side of the wheel's side support point Xa in the vehicle front and rear direction.

In the case of this suspension structure, against a force in the vehicle front and rear direction (the rearward force toward the rear of the vehicle) inputted at the tire ground contact point in the situation in which the force in the vehicle front and rear direction is dominant, the wheel's side support point Ta of transverse link 437 moves in the outboard direction. Moreover, the wheel's side support point Xa of tie rod 15 rotates about the vehicle body's side support point Xb and moves in the outboard direction. The wheel side support point Ca of tension link 438 moves in the inboard direction. Therefore, this suspension structure can realize the compliance steer to direct the wheel to the toe-out direction.

In the suspension apparatus 1B according to this embodiment, the transverse link 437 is arranged approximately in parallel to the axle, and the wheel's side support point Ta of transverse link 437 is disposed on the front side of the center of the wheel in the vehicle front and rear direction. The tension link 438 is inclined with respect to the transverse link 437 (disposed in such an orientation that the wheel's side support point is on the rear side, and the vehicle body's side support point is on the front side). The wheel's side support point Ca of tension link 438 is located on the rear side of the center of the wheel in the vehicle front and rear direction. The vehicle body's side support point Tb of transverse link 437 is located on the rear side of the wheel's side support point Ca of tension link 438 in the vehicle front and rear direction. The vehicle body's side support point Cb of tension link 438 is located on the front side of the wheel's side support point Ta of transverse link 437 in the vehicle front and rear direction.

In this link arrangement, the side force inputted to the wheel can be born mainly by the transverse link 437. Moreover, in this link arrangement, the vehicle body's side support point Tb of transverse link 437 is disposed on the rear side of the wheel center in the vehicle front and rear direction. Therefore, when the side force (acting in the inboard direction toward the center of the vehicle) is inputted to the wheel, the wheel's side support point Ta of transverse link 437 is moved in the inboard direction toward the center of the vehicle, and the wheel's side support point Ca of tension link 438 is moved in the outboard direction toward the outer side of the vehicle. Therefore, this link arrangement can realize the compliance steer to direct the wheel to the toe-in direction against the inputted side force.

In the suspension apparatus 1B, the wheel's side support point Xa of tie rod 15 is located on the outboard side of the wheel's side support points Ta and Ca of transverse link 437 and tension link 438 in the vehicle widthwise direction. Moreover, the vehicle body's side support point Xb of tie rod 15 is located on the rear side of the wheel's side support point Xa in the vehicle front and rear direction.

In the case of this suspension structure, against the force in the vehicle front and rear direction (the rearward force) inputted at the tire ground contact point in the situation in which the force in the vehicle front and rear direction is dominant, the wheel's side support point Ta of transverse link 437 moves in the outboard direction. Moreover, the wheel's side support point Xa of tie rod 15 rotates about the vehicle body's side support point Xb and moves in the outboard direction. The wheel's side support point Ca of tension link 438 moves in the inboard direction. Therefore, this suspension structure can realize the compliance steer to direct the wheel to the toe-out direction.

Therefore, the vehicle suspension apparatus according to this embodiment can provide an adequate compliance steer characteristic with respect to the longitudinal force of the vehicle.

In the examples of the fourth and fifth embodiments, the present invention is applied to the suspension apparatus having the compression type or tension type link arrangement. However, the present invention is applicable to suspension apparatus of other type.

In this embodiment, the transverse link 437 corresponds to the transverse link member as the first link member, and the tension link 438 corresponds to the tension link member as the second link member. Tie rod 15 corresponds to the tie rod member.

Effects of Fifth Embodiment (1) There is provided the transverse link member connecting the wheel hub mechanism WH and the wheel on the lower side of the axle in the vehicle up and down direction, and extending along the axle. Moreover, there is provided the tension link member. The connection portion of the tension link member with the vehicle body is located on the front side of the connect portion of the transverse link member with the vehicle body in the vehicle front and rear direction, and the connect portion of the tension link member with the wheel hub mechanism is located on the rear side of the connect portion of the transverse link member with the wheel hub mechanism in the vehicle front and rear direction. Furthermore, there is provided the tie rod member connected with the wheel hub mechanism WH on the outboard side of the connect portions of the transverse link member and tension link member with the wheel hub mechanism, connected with the steering rack member on the rear side of the connect portion of the tie rod member with the wheel hub mechanism WH, and arranged to steer the wheel.

Therefore, against a rearward force in the vehicle front and rear direction inputted at the tire ground contact point in the situation in which the longitudinal force in the vehicle front and rear direction is dominant, the wheel's side connect portion of transverse link moves in the outboard direction. Moreover, the wheel's side connect portion of the tie rod member rotates about the vehicle body's side connect portion and moves in the outboard direction. The wheel's side connect portion of the tension link member moves in the inboard direction. Therefore, this suspension structure can realize the compliance steer to direct the wheel to the toe-out direction. Accordingly, in the vehicle suspension apparatus, it is possible to obtain an adequate compliance steer characteristic against a longitudinal force in the vehicle front and rear direction.

(2) The connect portion between the transverse link member and the wheel hub mechanism WH is located on the front side of the axle in the vehicle front and rear direction, and the connect portion between the transverse link member and the vehicle body is located on the rear side of the axle in the vehicle front and rear direction.

Therefore, in the case of the side force inputted to the wheel as the turning outer wheel, the connect portion between the transverse link member and the wheel hub mechanism WH can be shifted in the inboard direction, and hence the toe-in characteristic can be imparted to the turning outer wheel.

(3) The connect portion between the transverse link member and the vehicle body is located on the front side of the connect portion between the tension link member and the wheel hub mechanism WH in the vehicle front and rear direction.

Therefore, it is possible to set or fix the rotational direction in one direction which holding the transverse link member approximately parallel to the axle.

(4) The connect portion between the tension link member and the wheel hub mechanism WH is located on the rear side of the axle in the vehicle front and rear direction, and the connect portion between the tension link member and the vehicle body is located on the front side of the connect portion between the transverse link member and the wheel hub mechanism WH in the vehicle front and rear direction.

This link arrangement makes it possible to increase the inclination angle of the tension link member with respect to the axle, and to shift the position of the imaginary lower pivot point in the inboard direction to the inside of the vehicle body.

(5) In the vehicle top view, the transverse and tension link members connecting the vehicle body and the wheel are arranged by disposing the transverse link member along the axle and disposing the tension link member so that the tension link member intersects the transverse link member with the wheel's side connect portion of the tension link member being located on the rear side of the transverse link member, and the vehicle body's side connect portion of the tension link member being located on the front side of the transverse link member. Furthermore, the tie rod member for steering the wheel is connected with the wheel hub mechanism WH on the outboard side of the connect portions of the transverse link member and tension link member with the wheel hub mechanism, and connected with the steering rack member on the rear side of the connect portion of the tie rod member with the wheel hub mechanism WH. Therefore, against the longitudinal force in the rearward direction, the wheel's side connect portion of the transverse link member is caused to move in the outboard direction, and the wheel's side connect portion of the tie rod member is caused to move in the outward direction.

Therefore, against the rearward force in the vehicle front and rear direction inputted at the tire ground contact point in the situation in which the longitudinal force in the vehicle front and rear direction is dominant, the wheel's side connect portion of the transverse link member moves in the outboard direction. Moreover, the wheel's side connect portion of the tie rod member rotates about the vehicle body's side connect portion and moves in the outboard direction. The wheel's side connect portion support point of the tension link member moves in the inboard direction.

Therefore, this suspension structure can realize the compliance steer to direct the wheel to the toe-out direction. Accordingly, in the vehicle suspension apparatus, it is possible to obtain an adequate compliance steer characteristic against a longitudinal force in the vehicle front and rear direction.

(6) The kingpin axis having a lower pivot point set at the intersection point of the transverse link member and the tension link member in the vehicle top view passes through the tire ground contact surface or contact patch in the state in which the steering wheel is at the neutral position.

This arrangement makes it possible to decrease the moment about the kingpin axis, to steer the wheel with a smaller rack axial force and to control the direction of the wheel with a smaller force. Therefore, it is possible to improve the stability and controllability.

(7) The suspension apparatus is arranged to suspend the steerable wheel steered by the steer-by-wire system.

Therefore, by utilizing the steer actuator of the steer-by-wire system, it is possible to perform the control corresponding to the setting of the kingpin axis according to the present invention, and to improve the safety and controllability.

Application Example 1

Although the third and fourth embodiments are explained by the use of the examples in which the suspension apparatus 1B is applied to the suspension system for the steerable front wheels, the suspension apparatus 1B is applicable also to the suspension system for non-steerable rear wheels.

In this case, when the vehicle is brought by a steer operation into a turning state, and the side force is applied to the rear wheel, the tension link and compression link are bent by the side force, the intersection point of these links in the vehicle top view is moved, and the direction of the wheel is changed with respect to the vehicle body (cf. FIGS. 40 and 47). Namely, the lower link member extending along the axle is small in the amount of movement in the front and rear direction by the side force, and the other lower link member disposed obliquely with respect to the axle to have an angle in the front and rear direction is large in the amount of movement in the front and rear direction by the side force.

By utilizing this characteristic, it is possible to realize an intended compliance steer.

Specifically, the tension type suspension apparatus 1B according to the fifth embodiment can realize the characteristic directing the wheel on the turning outer side to the direction of toe-in, so that this suspension apparatus is effective when used for the rear wheel suspension.

(Effect)

The first and second link members for connecting the wheel hub mechanism and the vehicle body are arranged to intersect each other in the vehicle top view, on the lower side of the axle in the vehicle up and down direction.

Therefore, the link members are bent by the side force at the time of turning, the intersection point of the link members in the vehicle top view is shifted and therefore the direction of the wheel can be changed with respect to the vehicle body. Consequently, it is possible to realize the intended lateral compliance steer.

Application Example 2

Although the fourth and fifth embodiments are explained by the use of the examples in which the suspension apparatus 1B is applied to the suspension system for the steerable front wheels, the suspension apparatus 1B is applicable also to the suspension system for steerable rear wheels.

In this case, too, the imaginary lower pivot point can be shifted to the vehicle inboard side in the vehicle widthwise or lateral direction as in the fourth embodiment. Furthermore, the kingpin axis defined by this imaginary lower pivot point is set so that the caster trail lies within the tire ground contact surface or patch. Therefore, it is possible to decrease the moment about the kingpin axis. Therefore, it is possible to steer the wheels with a smaller rack axial force, control the direction of the wheels with a smaller force and thereby improve the controllability and stability.

Application Example 3

In the fourth and fifth embodiments, the caster trail is set within the tire ground contact surface, and as an example, the caster trail is set at a value close to zero.

By contrast to this setting, in this application example, the setting condition of the caster trail is limited to the range from the center of the tire ground contact patch to the front end of the tire ground contact patch.

(Effect)

In the case of the arrangement of setting the caster trail in the range from the center of the tire ground contact patch to the front end of the tire ground contact patch, it is possible to attain the securement of the straightness and the reduction of the heaviness of steering operation simultaneously, and thereby to improve the controllability and safety.

Application Example 4

In the fourth and fifth embodiments, the region surrounded by the one dot chain line in the coordinate plane shown in FIG. 7 is selected as an example of the region adequate for setting. By contrast, it is possible to set, as the adequate setting region, an inside region (in the decreasing direction of the kingpin inclination and the increasing direction of the scrub radius) inside a range represented by a boundary line determined by an isoplethic line which is used as the boundary line and which is an equal-value line of a rack axial force to which attention is paid.

(Effect)

It is possible to assume a greatest value of the rack axial force and to set the suspension geometry within the range smaller than or equal to the greatest value of the rack axial force.

Application Example 5

In the examples of the fourth and fifth embodiments and the application examples, the suspension apparatus 1B is applied to the vehicle equipped with the steer-by-wire type steering apparatus. However, it is possible to apply the suspension apparatus 1B to the vehicle equipped with other steering apparatus of mechanical steering mechanism or steering linkage.

In this case, the kingpin axis is determined in conformity with the condition according to the above-mentioned analysis results, the caster trail is set within the tire ground contact surface, and the links of the mechanical steering mechanism are arranged in accordance with these settings.

(Effect)

Even in the mechanical steering mechanism, it is possible to decrease the moment about the kingpin, thereby decrease the required steering force or steering effort of the driver, and improve the stability and controllability.

Application Example 6

In the examples of the fourth and fifth embodiments and the application examples, the present invention is applied to the strut type suspension apparatus as an example. However, it is possible to apply the present invention to the suspension apparatus having the upper arm. In this case, the upper pivot point is the connection point between the upper arm and the axle carrier.

Sixth Embodiment

A sixth embodiment of the present invention is explained hereinafter with reference to FIG. 48. The sixth embodiment is different in the configuration of the delay control section 56, from the first embodiment. In the sixth embodiment, delay control section 56 is configured as shown in FIG. 48.

Figure 48:
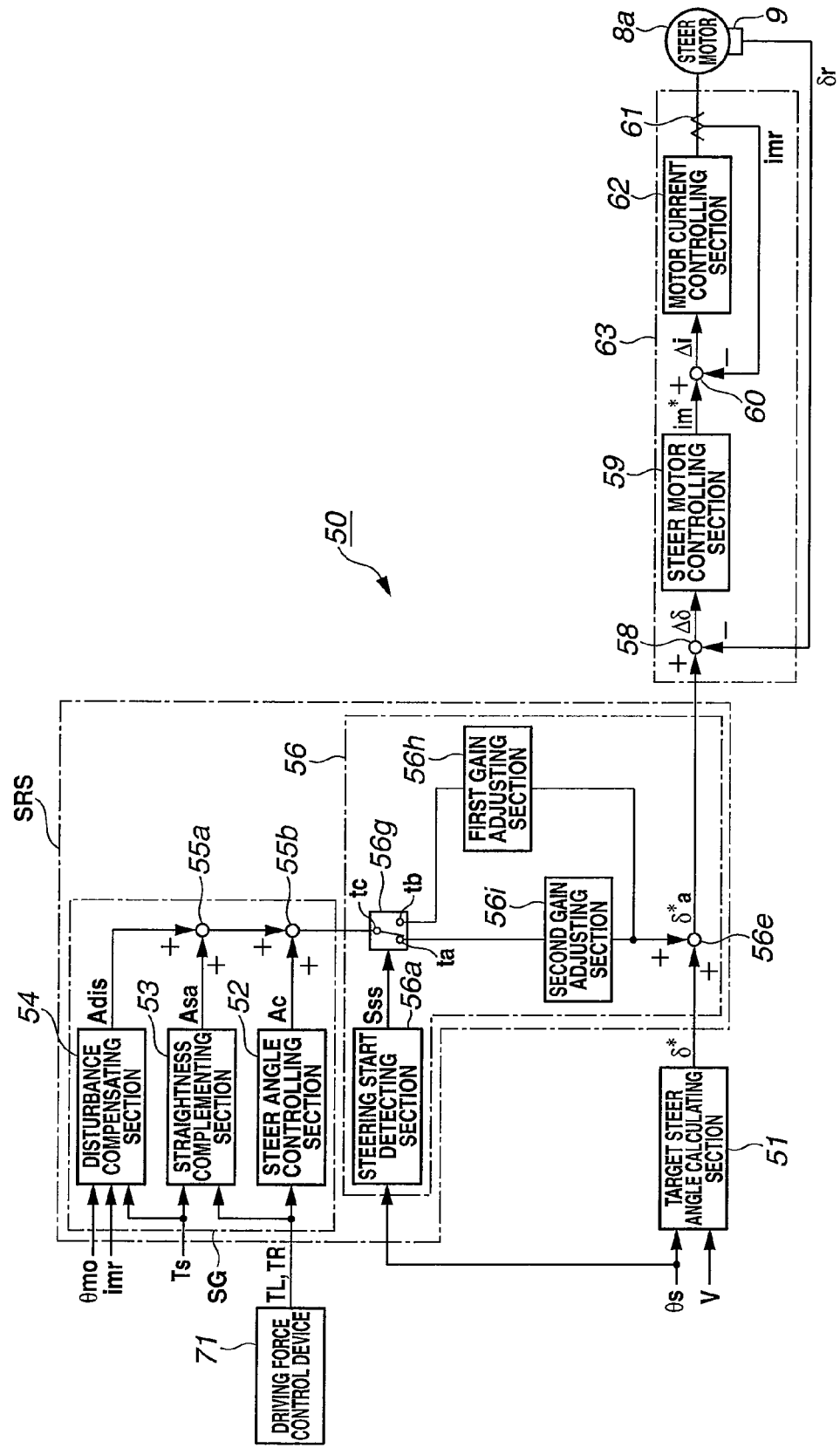
FIG. 48 is a block diagram showing one example of a steer control apparatus according to a sixth embodiment of the present invention.

As shown in FIG. 48, the delay control section 56 includes a steering start detecting section 56a, an adder 56e, a selecting section 56g and a gain adjusting section 56h.

Steering start detecting section 56a produces a steering start signal or steering start sensor signal Sss in accordance with the steering angle θs sensed by steering angle sensor 4, and delivers the steering start signal or steering start sensor signal Sss, to the selecting section 56g. The steering start sensor signal Sss is a signal which is held in an on state from a steering start instant or time point at which a right or left steering operation is started from a state in which the steering wheel 2 is held in the neutral state for a predetermined time duration for allowing judgment of a straight running state, for example, to an instant at which the neutral position is detected next.

Selecting section 56g includes a normally-closed fixed terminal ta, a normally-open fixed terminal tb and a movable terminal tc for selecting one of fixed terminals ta and tb. Movable terminal tc is configured to receive the straightness securing control quantity δa outputted from straightness securing section SG. The normally-closed fixed terminal ta is connected through a second gain adjusting section 56i, with the adder 56e. The normally-open fixed terminal tb is connected through the first gain adjusting section 56h, with the adder 56e.

Selecting section 56g selects a state of connecting the movable terminal tc with normally-closed fixed terminal ta when the steering start sensor signal Sss outputted from steering start detecting section 56a is in the off state. Selecting section 56g selects a state of connecting the movable terminal tc with normally-open fixed terminal tb when the steering start sensor signal Sss outputted from steering start detecting section 56a is in the on state.

The first gain adjusting section 56h stops the straightness securing control for the target steer angle δ* for a predetermined time period, 0.1 sec, for example, corresponding to the before-mentioned early or initial response period T1 when the straightness securing control quantity δa is inputted through selecting section 56g. When the straightness securing control quantity δa is inputted through selecting section 56g to first gain adjusting section 56h, the first gain adjusting section 56h stops the output of the straightness securing control quantity δa (this operation corresponds to the operation of setting control gain Ga to "0" in the second embodiment) during the early or initial response period T1 which is a first period of 0.1 sec, for example. After the expiration of the early response period T1, the gain adjusting section 56h multiplies the straightness securing control quantity δa by the control gain of "0.8", for example, and delivers the product to the adder 56e (this operation is close to the operation of setting control gain Ga to "1" in the second embodiment).

The second gain adjusting section 56i is configured to multiply the straightness securing control quantity δa by the control gain of "1", for example, to secure the straightness sufficiently in the straight ahead driving.

The gain set at the first and second gain adjusting sections 56h and 56i is not limited to the range of 0~1. It is possible to set the gain at appropriate values according to the characteristic of suspension apparatus 1B.

While the steering operation of steering wheel 2 continues, the steering start detecting section 56a in delay control section 56 does not detect a start of steering from the neutral state, hence the selecting section 56g supplies the straightness securing control quantity δa calculated by straightness securing section SG, to the second gain adjusting section 56i. Therefore, the straightness securing control quantity δa is multiplied by the control gain of "1", and hence supplied directly to the adder 56e. As a result, the straightness securing control quantity δa is added to the target steer angle δ* and the straightness securing control is performed properly.

When, on the other hand, a steering start from the neutral state is detected by steering start detecting section 56a, the selecting section 56g is switched to the normal-open fixed terminal tb, and the straightness securing control quantity δa calculated by straightness securing section SG is supplied to thet gain adjusting section 56h. Therefore, gain adjusting section 56h stops the output of straightness securing control quantity δa to adder 56e during the early response period T1 (0.1 sec. for example). Consequently, a start of the straightness securing control by straightness securing control quantity δa to target steer angle δ* is delayed. Thereafter, gain adjusting section 56h sets the control gain Ga to "0.8" after the expiration of a predetermined time period, and thereby sets the straightness securing control quantity δa equal to a slightly restrained value. The thus-set straightness securing control quantity δa is supplied to adder 56e and added to target steer angle δ*. Consequently, the control system starts the straightness securing control for target steer angle δ*, and provides a satisfactory steering response characteristic while restraining fluctuation or unsteadiness generated in suspension apparatus 1B.

Thereafter, when steering wheel 2 is returned to the neutral position, the steering start sensor signal Sss of steering start detecting section 56a is turned to the off state. Therefore, selecting section 56g returns the movable terminal tc to the normally-closed fixed terminal ta, and supplies the straightness securing control quantity δa from straightness securing section SG, to second gain adjusting section 56i. Therefore, the straightness securing control quantity is supplied directly to adder 56e. Accordingly, the control system continues the straightness securing control for target steer angle δ* favorably.

Effects of Sixth Embodiment

Thus, in the sixth embodiment, too, at the time of steering start to turn steering wheel 2 right or left from the state holding the neutral position, the gain adjusting section 56h stops or prevents the output of straightness securing control quantity δa to adder 56e during the early or initial response period T1 of a time period of 0.1 sec, for example. Then, after the expiration of the initial response period T1, the output of straightness securing control quantity δa to adder 56e is started. Therefore, it is possible to obtain effects and operations similar to those of the first embodiment.

Moreover, when steering wheel 2 is returned to the neutral position, the steering start sensor signal Sss outputted from the steering start detecting section 56a is returned to the off state. In this state, even if the movable terminal tc of selecting section 56g is returned to the normally-closed fixed terminal ta, the straightness securing control quantity δa is set to a smaller value. Therefore, the straightness securing control quantity is not varied discontinuously, and the control is changed smoothly.

Variation Example of Sixth Embodiment

In the practical example of the sixth embodiment, during the period from detection of a steering start condition by steering start detecting section 56a to next detection of the neutral state of steering wheel 2, the steering start sensor signal Sss is held in the on state. However, the present invention is not limited to this configuration. When the steering start sensor signal Sss in a pulse shaped form is produced by the steering start detecting section 56a, upon detection of the steering start condition like the first embodiment, it is optional to interpose, between the steering start detecting section 56a and selecting section 56g, a monostable circuit set in the on state from the time point of detection of a steering start, to the end of the later response period T3, for example. With this configuration, during the period from the start of steering to the end of the later response period T3, the movable terminal tc of selecting section 56g is turned to the normally-open fixed terminal tb.

In the example of the sixth embodiment, the steer control device 50 is realized by a hardware configuration. However, this example is not a limitative example. For example, the target steer angle calculating section 51 and straightness securing section SG may be formed by a processing device such as a microcomputer, and this processing device may be configured to perform a steer control process as shown in FIG. 49, for example.

Figure 49:
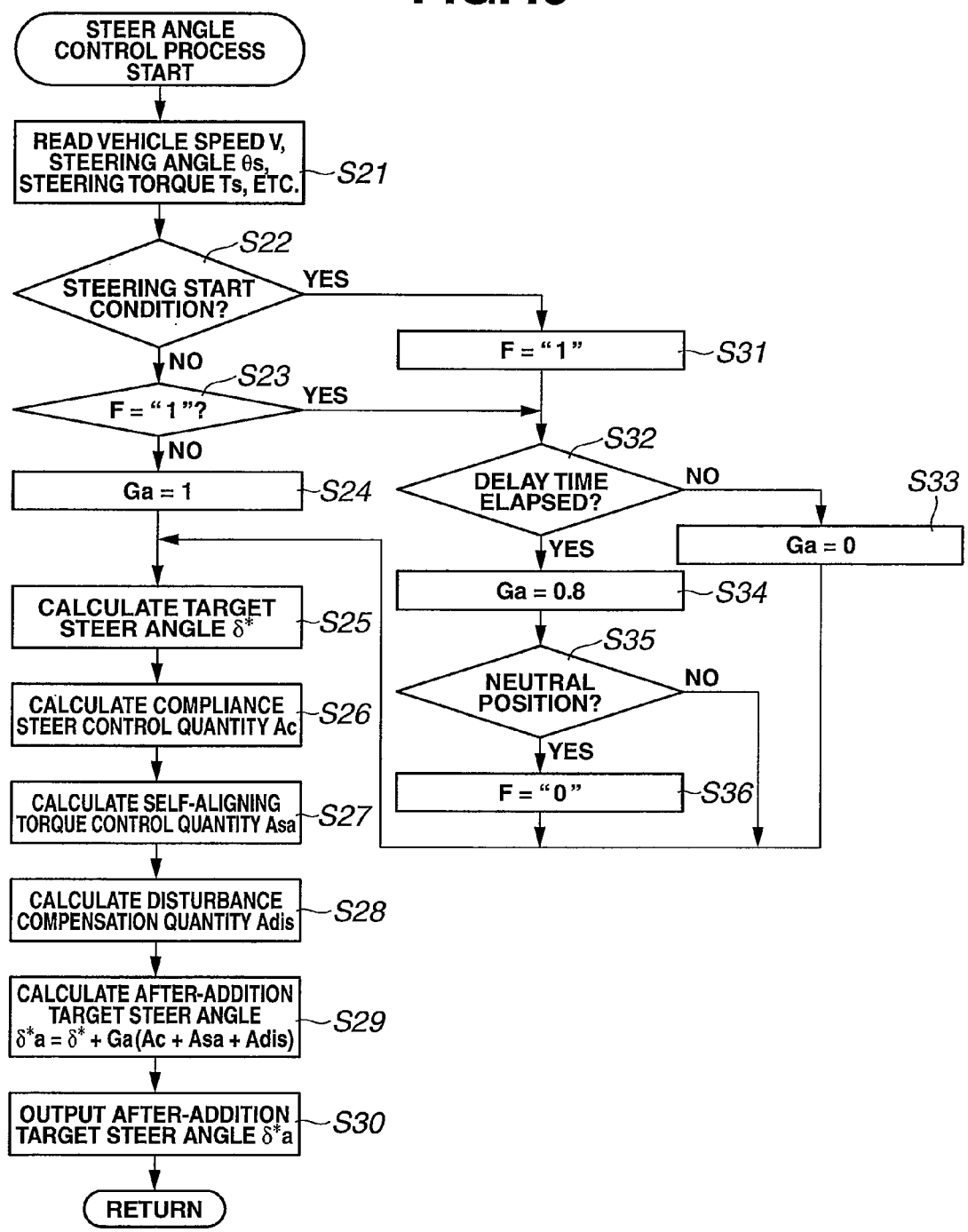
FIG. 49 is a flowchart showing one example of a steer angle control process according to the sixth embodiment.

In this steer control process, as shown in FIG. 49, first, at a step S21, the processing device reads data required for the calculating process, such as the vehicle speed V, steering angle θs sensed by steering angle sensor 4, left and right wheel driving forces TL and TR of driving force control device 71 and steering torque Ts sensed by steering torque sensor 5. Then, the processing device proceeds to a step S22, and examines whether the steering wheel 2 is turned from the state holding the neutral position, leftwards or rightwards to detect the steering start condition, by examining the steering angle θs sensed by steering angle sensor 4. From S22, the processing device proceeds to a step S23 when the steering start condition is not detected.

At step S23, the processing device examines whether a control flag F representing a steering start control state is set at "1" or not. When control flag F is reset at "0", the processing device proceeds to a step S24, sets the control gain Ga to "1", and then proceeds to a step S25.

At the step S25, the processing device calculates the target steer angle δ* in accordance with vehicle speed V and steering angle θs, in the same manner as in target steer angle calculating section 51.

Then, at a step S26, like the steer angle control section 52, the processing device calculates the steer angle variations Δfl and Δfr of the steerable wheels 17FL and 17FR due to compliance steer by multiplying the left wheel driving force TL and right wheel driving force TR by the compliance steer coefficient af, and calculates the compliance steer control quantity or value Ac from these calculated variations.

Then, at a step S27, like the straightness complementing section 53, on the basis of the driving force difference ΔT (=TL☐TR) between the left and right wheel driving forces TL and TR, the processing device estimates the generation torque Th generated by the torque steer phenomenon at the time of steer operation, by looking up in the generation torque estimation control map shown in FIG. 18. Then, the processing device calculates the self-aligning torque Tsa by subtracting the generation torque Th from the steering torque Ts, and calculates the self-aligning torque control quantity or value Asa by multiplying the calculated self-aligning toque Tsa by the predetermined gain Ksa.

Then, at a step S28, the processing device calculates the disturbance compensating quantity. Adis in accordance with the motor rotation angle θmo of steer actuator 8, the motor current imr sensed by motor current sensing section 61 and the steering torque Ts, in the same manner as the disturbance compensating section 54.

Then, at a step S29, the processing device calculates the after-addition target steer angle δ*a, by addition according to a following equation (4), of the target steer angle δ* and the product between the control gain Ga and the sum of compliance steer control quantity Ac, self-aligning torque control quantity Asa and disturbance compensating quantity Adis.

$$\delta^*a = \delta^* + Ga(Ac + Asa + Adis) \quad (4)$$

Then, at a step S30, the processing device delivers the after-addition target steer angle δ*a, to the steer angle deviation calculating section 58 shown in FIG. 48. Thereafter, the processing device returns to step S21.

When the conclusion of step S22 indicates the detection of the steering start condition, the processing device proceeds to a step S31 and sets the control flag F at "1". From S31, the processing device proceeds to a step S32. When the conclusion of step S23 is that the control flag F is set at "1", then the processing device proceeds directly to the step S32.

At this step S32, the processing device examines whether the predetermined delay time (0.1 sec, for example) has elapsed. When the predetermined delay time has not yet elapsed, the processing device proceeds to a step S33, and sets the control gain Ga at "0". From S33, the processing section proceeds to the step S25.

When the conclusion of step S32 indicates the expiration of the predetermined delay time, the processing device proceeds to a step S34, and sets the control gain Ga to "0.8". From S34, the processing device proceeds to a step S35.

At the step S35, the processing device examines whether the steering angle θs sensed by steering angle sensor 4 is in the condition representing the neutral position of steering wheel 2, or not. The conclusion of step S35 is the neutral position, the processing device proceeds to a step. S36, and resets the control flag to "0". After S36, the processing device proceeds to the step S25.

With the steer control process shown in FIG. 49, too, in the absence of the steering start condition of a start of turning the steering wheel 2 leftwards or rightwards from the neutral position, the control system sets the control gain to "1", hence performs the straightness securing control to add, to the target steer angle δ*, the straightness securing control quantity δa obtained by addition of the compliance steer control quantity Ac, self-aligning torque control quantity Asa and disturbance compensating quantity Adis, and thereby secures the straightness of suspension apparatus 1B.

In the case of the steering start condition of the start of turning steering wheel 2 leftwards or rightwards from the neutral position, the control gain Ga is set at "0" until the elapse of the predetermined delay time. Therefore, only the target steer angle δ* is outputted to steer angle deviation calculating section 58 and the steer motor 8a of steer actuator 8 is driven in accordance with the target steer angle δ*. Therefore, the initial or early steer responsiveness is set at the level of the high steer responsiveness of the suspension apparatus per se, and the system can provide the high steer responsiveness.

After the elapse of the delay time, the control gain Ga is set at "0.8", and the rotation of steer motor 8a of steer actuator 8 is controlled in accordance with the after-addition target steer angle δ*a by addition to the target steer angle δ*, of the product between the control gain Ga and the straightness securing control quantity δa including the compliance steer control quantity Ac, self-aligning control quantity Asa and disturbance compensating quantity Adis. Therefore, the high response responsiveness of the suspension apparatus is restrained by the straightness securing control of the steer-by-wire system SBW, and the steer response characteristic is set to an ideal form as shown by a characteristic line L1 in FIG. 20(a).

In the process of FIG. 49, step S25 corresponds to target steer angle calculating section 51, step S26 corresponds to steer angle control section 52, step S27 corresponds to straightness complementing section 53, step S28 corresponds to disturbance compensating section 54, steps S24~S28 and S25~S29 correspond to the straightness securing section SG, steps S22, S23, S31~S33 and S29 correspond to delay control section 56, and steps S21~S37 correspond to steer responsiveness setting section SRS.

Seventh Embodiment

A seventh embodiment of the present invention is explained hereinafter with reference to FIGS. 50~53.

In the seventh embodiment, the delay time τ to start the straightness securing control is variable.

Figure 50:
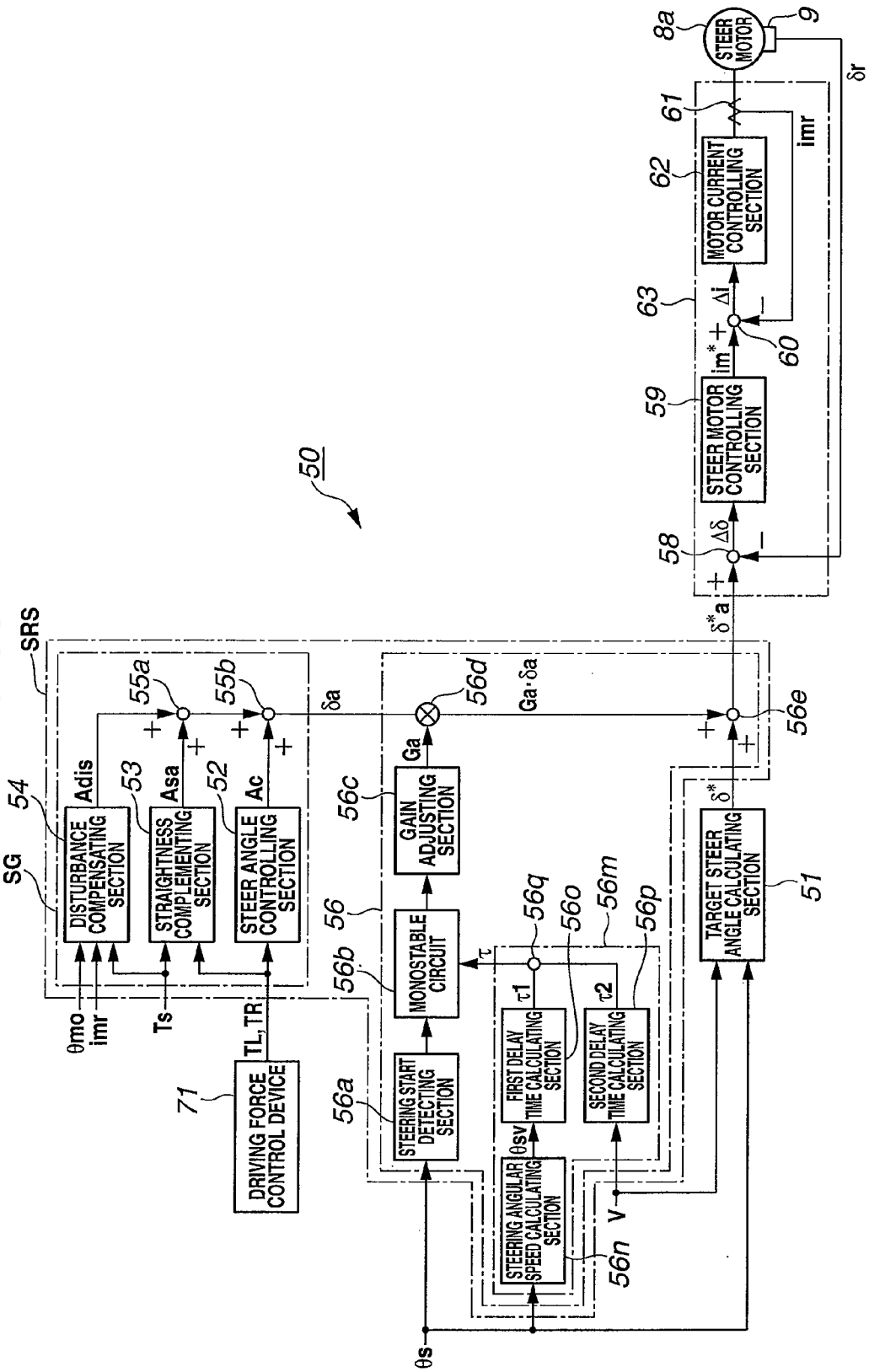
FIG. 50 is a block diagram showing one example of a steer control apparatus according to a seventh embodiment of the present invention.

As shown in FIG. 50, in the seventh embodiment, a delay time setting circuit 56m is provided in delay control section 56. The delay time τ set at delay time setting circuit 56m is supplied to the mono-stable circuit 56b, which sets a pulse width corresponding to delay time τ.

Delay time setting circuit 56m includes a steering angular speed calculating section 56n, a first delay time calculating section 56o, a second delay time calculating section 56p and an adder 56q, as shown in FIG. 50.

The steering angular speed calculating section 56n receives the steering angle θs of steering wheel 2 sensed by steering angle sensor 4, and calculates a steering angular speed or angular velocity θsv by differentiating the steering angle θs.

Figure 51:
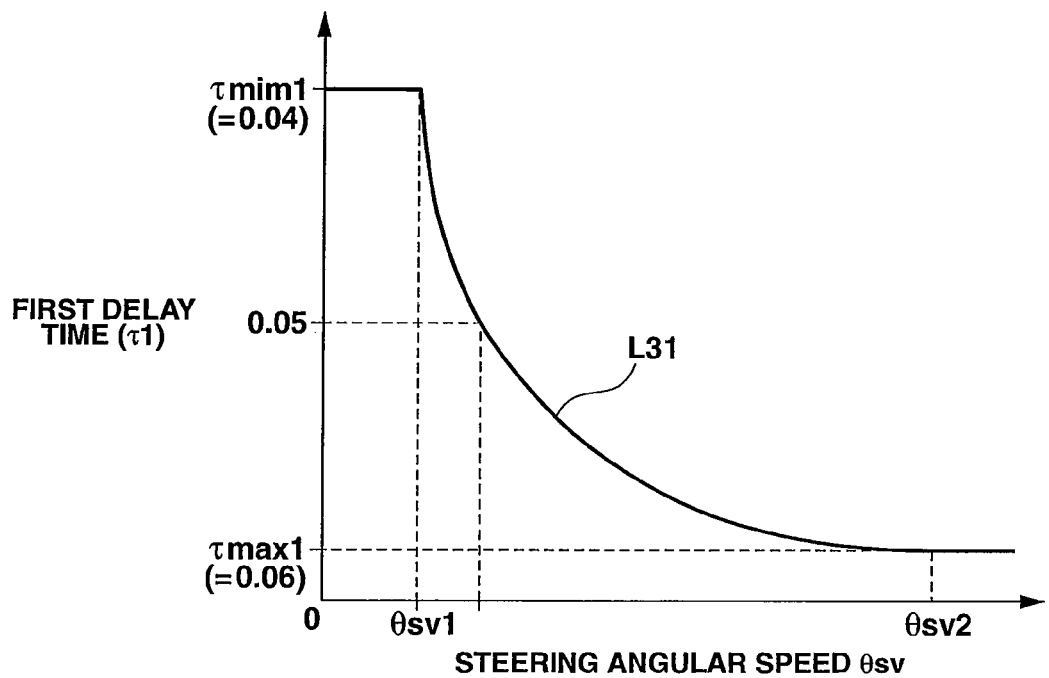
FIG. 51 is a characteristic view showing a first delay time calculation map usable in the seventh embodiment.

The first delay time calculating section 56o calculates a first delay time τ1 from the steering angular speed θsv inputted from steering angular speed calculating section 56n by using a first delay time calculating map shown in FIG. 51. As shown in FIG. 51, the first delay time calculating map includes a characteristic curve L31 shaped like a hyperbolic curve, to set the first delay time τ1 equal to a minimum delay time τmin1 (0.04 sec, for example) in a steering angular speed range of steering angular speed θsv from 0 to a predetermined angular speed value θsv1, and to increase the first delay time τ1 to a maximum delay time τmax1 (0.06 sec, for example) with increase in steering angular speed θsv when steering angular speed θsv is increased beyond the predetermined value θsv1.

Figure 52:
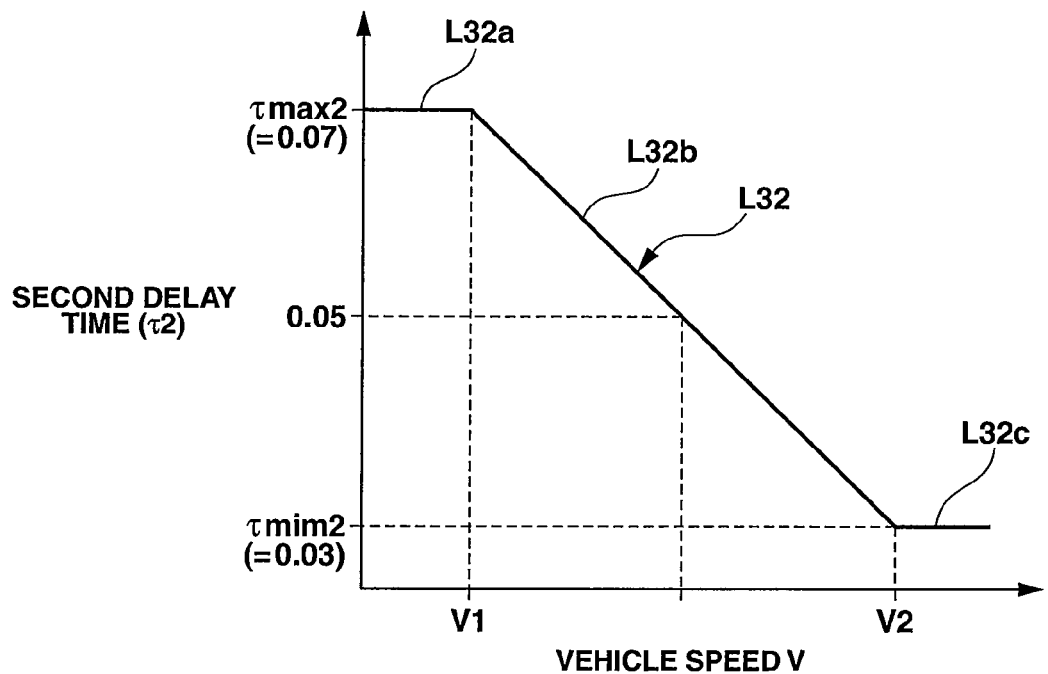
FIG. 52 is a characteristic view showing a second delay time calculation map usable in the seventh embodiment.

The second delay time calculating section 56p receives the vehicle speed V determined by the vehicle parameter obtaining section 21, and calculates a second delay time τ2 from vehicle speed V by using a second delay time calculating map shown in FIG. 52. As shown in FIG. 52, the second delay time calculating map includes a characteristic curve L32. The characteristic curve L32 includes: a line segment L32a to hold the second delay time τ2 equal to a maximum delay time τmax2 (0.07 sec, for example) in a low vehicle speed range in which vehicle speed V is from 0 to a preset vehicle speed value V1; a linear line segment L32b to increase the second delay time τ2 in proportion to an increase quantity of vehicle speed in a vehicle speed range in which vehicle speed V increases beyond preset vehicle speed value V1; and a line segment L32c to hold the second delay time τ2 equal to a minimum delay time τmin2 (0.03 sec, for example) in a vehicle speed range in which vehicle speed V is higher than or equal to a preset vehicle speed value V2 higher than preset vehicle speed value V1.

The adder 56q calculates a delay time τ (τ1+τ2) by adding the first delay time τ1 calculated at first delay time calculating section 56o and the second delay time τ2 calculated at second delay time calculating section 56p, and supplies the delay time τ to mono-stable circuit 56b.

The mono-stable circuit 56b produces a pulse signal which is turned to the on state by being triggered by the steering start detection signal inputted from steering start detecting section 56a and which is held on the on state for a period corresponding to the delay time τ inputted from adder 56q, supplies this pulse signal to gain adjusting section 56c.

In the seventh embodiment, the first delay time 1 dependent on steering angular speed θsv is set short in a slow steering condition in which steering angular speed sv is slow, and set long in a fast steering condition, as shown in FIG. 51. The second delay time 2 dependent on the vehicle speed V is set long when vehicle speed V is low, and set short when vehicle speed V is high, as shown in FIG. 52.

The delay time τ is determined by addition of first and second delay times τ1 and τ2 at adder 56q.

Figure 53:
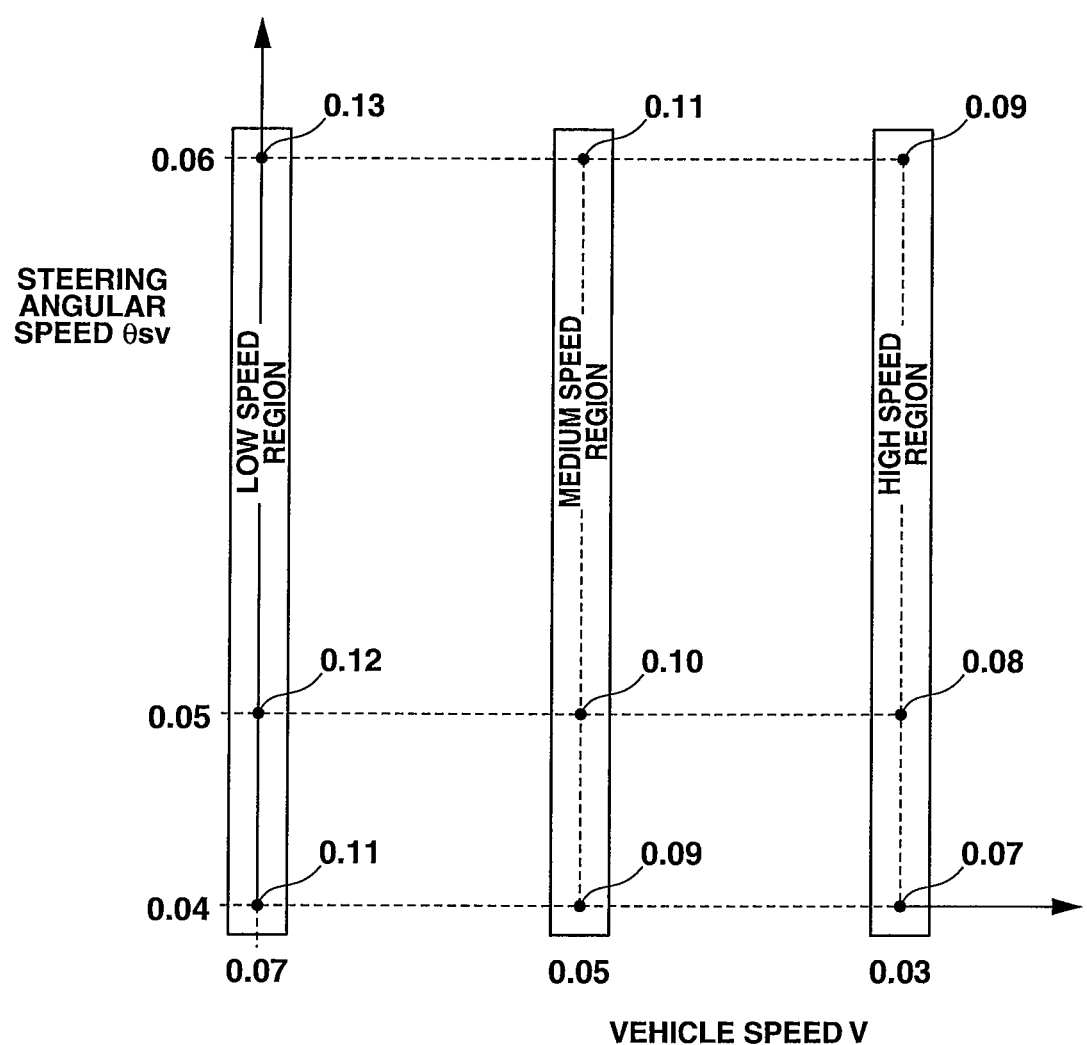
FIG. 53 is a graphic view showing a delay time set in accordance with a relationship between a vehicle speed and a steering angular speed.

Therefore, as shown in FIG. 53, in a low vehicle speed region in which vehicle speed V is low, the delay time τ is equal to a minimum value of 0.11 sec when the steering speed θsv is slow, and the delay time τ is increased up to a maximum delay time of 0.13 sec with increase in the steering angular speed θsv.

In a medium vehicle speed region of vehicle speed V, the delay time τ is equal to a minimum value of 0.09 sec when the steering speed θsv is slow, and the delay time τ is increased up to a maximum delay time of 0.11 sec with increase in the steering angular speed θsv.

In a high vehicle speed region of vehicle speed V, the delay time τ is equal to a minimum value of 0.07 sec when the steering speed θsv is slow, and the delay time τ is increased up to a maximum delay time of 0.09 sec with increase in the steering angular speed θsv.

Therefore, in the low vehicle speed region in which vehicle speed V is low, the delay time τ is long generally and in a range of ±0.01 sec on both sides of a center of delay time τ=0.12. In the medium vehicle speed region, the delay time τ is in a range of ±0.01 sec on both sides of a center of delay time τ=0.10 as set in the first and six embodiments. In the high vehicle speed region, the delay time τ is in a range of ±0.01 sec on both sides of a center of delay time τ=0.08.

Consequently, the start of the straightness securing control is delayed in the low vehicle speed region, and hence it is possible to obtain an active steering condition with a highly responsive steer characteristic of suspension apparatus 1B. In the medium vehicle speed region, the straightness securing control is started in a moderate timing range, and hence it is possible to obtain a steering condition of adequate steering response. In the high vehicle speed region, the straightness securing control is started earlier, and hence it is possible to obtain a stable steering condition with the highly responsive steer characteristic of suspension apparatus 1B being restrained earlier.

Figure 54:
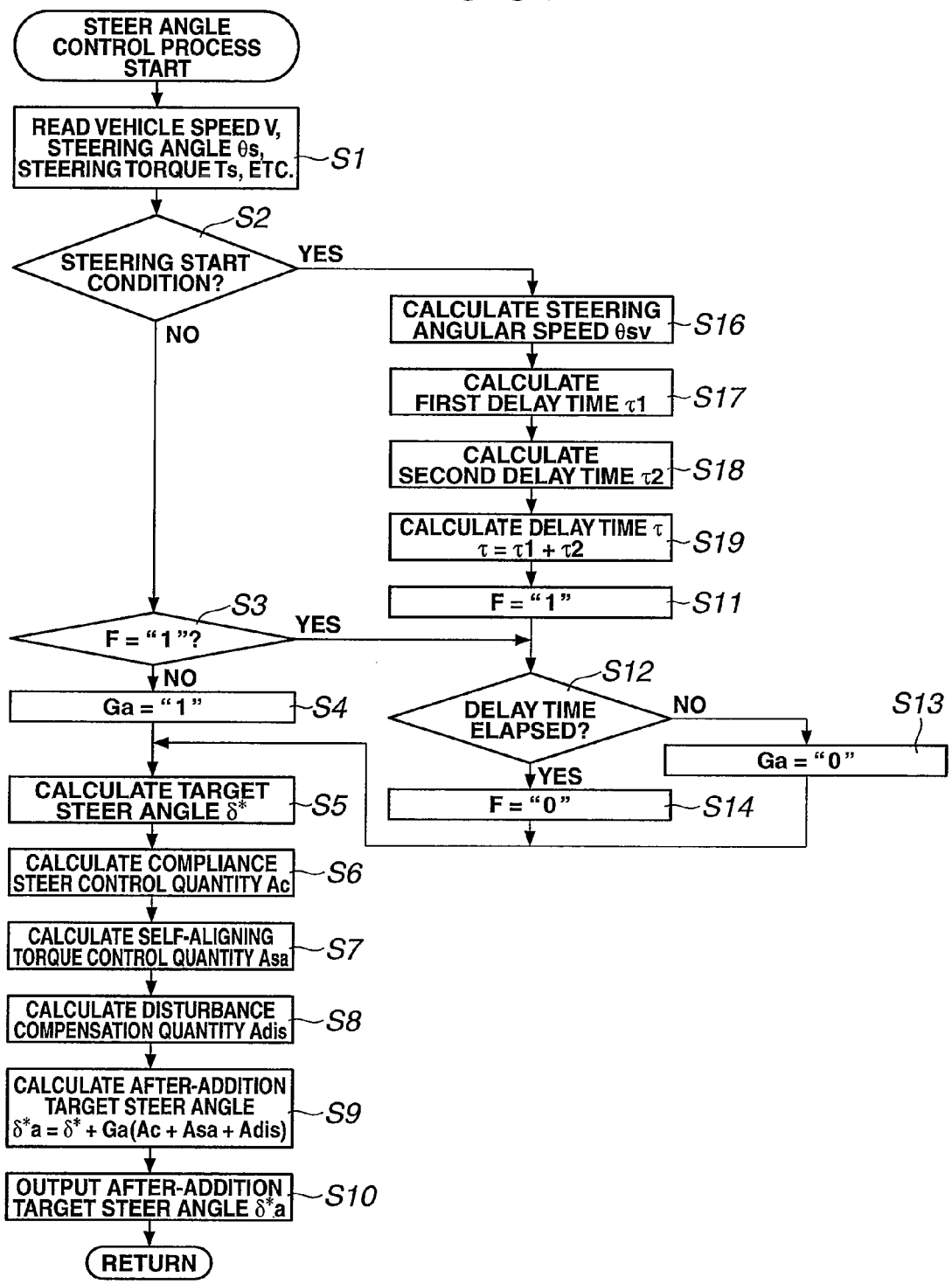
FIG. 54 is a flowchart showing one example of a steer angle control process according to the seventh embodiment.

In the example of the seventh embodiment, the steer control device 50 is realized by a hardware configuration. However, this example is not a limitative example. For example, the target steer angle calculating section 51 and steer responsiveness setting section SRS may be formed by a processing device such as a microcomputer, and this processing device may be configured to perform a steer control process as shown in FIG. 54, for example.

This steer angle control process is the same as the steer angle control process of FIG. 21 except for interposition, between step S2 and step S11, of a step S16 of calculating the steering angular speed θsv, a step S17 of calculating the first delay time τ1, a step S18 of calculating the second delay time τ2, and a step S19 of calculating the delay time τ.

At step S16, the processing device calculates the steering angular speed or angular velocity θsv by differentiating the steering angle θs read at step S1. At step S17, the processing device calculates the first delay time τ1 from the steering angular speed θsv calculated at Step S16 by lookup into the first delay time calculating map shown of FIG. 51 stored in a memory such as a ROM. At step S18, the processing device calculates the second delay time τ2 from vehicle speed V read at step S1, by lookup into the second delay time calculating map of FIG. 52 stored in the memory such as ROM. At step S19, the processing device calculates the delay time τ (=τ1+τ2) by adding the first delay time τ1 calculated at step S17 and the second delay time τ2 calculated at step S18.

After step S11, the processing device proceeds to step S12. At this step S12, the processing device examines whether the predetermined delay time τ calculated at step S18 has elapsed. When the predetermined delay time has not yet elapsed, the processing device sets the control gain Ga at "0". When the predetermined delay time has elapsed, the processing device sets the control gain Ga at "1". Thus, the control system can delay the steer angle control process by the delay time τ.

In the steer angle control process of FIG. 54, like FIG. 50 of the seventh embodiment, upon detection of the steering start condition, the processing device calculates the first delay time τ1 from the steering angular speed θsv, calculates the second delay time τ2 from vehicle speed V, and calculates the delay time τ by adding the first and second delay times.

Then, the control system determines the control gain Ga in accordance with the calculated delay time τ. Therefore, the control system can determine the optimum delay time τ suitable for the steer condition in accordance with vehicle speed V and steering angular speed θsv like the seventh embodiment.

Consequently, the start of the straightness securing control is delayed in the low vehicle speed region, and hence it is possible to obtain an active steering condition with a highly responsive steer characteristic of suspension apparatus 1B. In the medium vehicle speed region, the straightness securing control is started in a moderate timing range, and hence it is possible to obtain a steering condition of adequate steering response. In the high vehicle speed region, the straightness securing control is started earlier, and hence it is possible to obtain a stable steering condition with the highly responsive steer characteristic of suspension apparatus 1B being restrained earlier.

Effects of Seventh Embodiment (1) There are provided the first delay time calculating section to calculate the first delay time τ1 from the steering angular speed θsv, the second delay time calculating section to calculate the second delay time τ2 from vehicle speed V, and the adder to calculate the delay time τ to start the straightness securing control by adding the first and second delay times.

Therefore, the control system can determine the first delay time τ1 dependent on the steering angular speed θsv, and the second delay time τ2 dependent on vehicle speed V separately, and hence determine the optimum delay time suitable to various steering conditions.

(2) The first delay time calculating section calculates the first delay time from the steering angular speed by using the first delay time calculation map having the characteristic decreasing the first delay time with increase in the steering angular speed θsv, for example.

Therefore, the control system can provide a stable steering characteristic by shortening the first delay time and thereby starting the straightness securing control earlier in a slow steering state in which the steering speed θsv is slow, and provide an active steering characteristic by elongating the first delay time and thereby delaying the start of the straightness securing control in a fast steering state in which the steering speed θsv is fast.

(3) The second delay time calculating section calculates the second delay time from the vehicle speed by using the second delay time calculation map having the characteristic increasing the second delay time with increase in the vehicle speed V.

Therefore, the control system can provide an active steering characteristic in the low vehicle speed region in which the vehicle speed V is low, and provide a stable steering characteristic in the high vehicle speed region in which the vehicle speed V is high.

Application Example 1 of Seventh Embodiment

Figure 55:
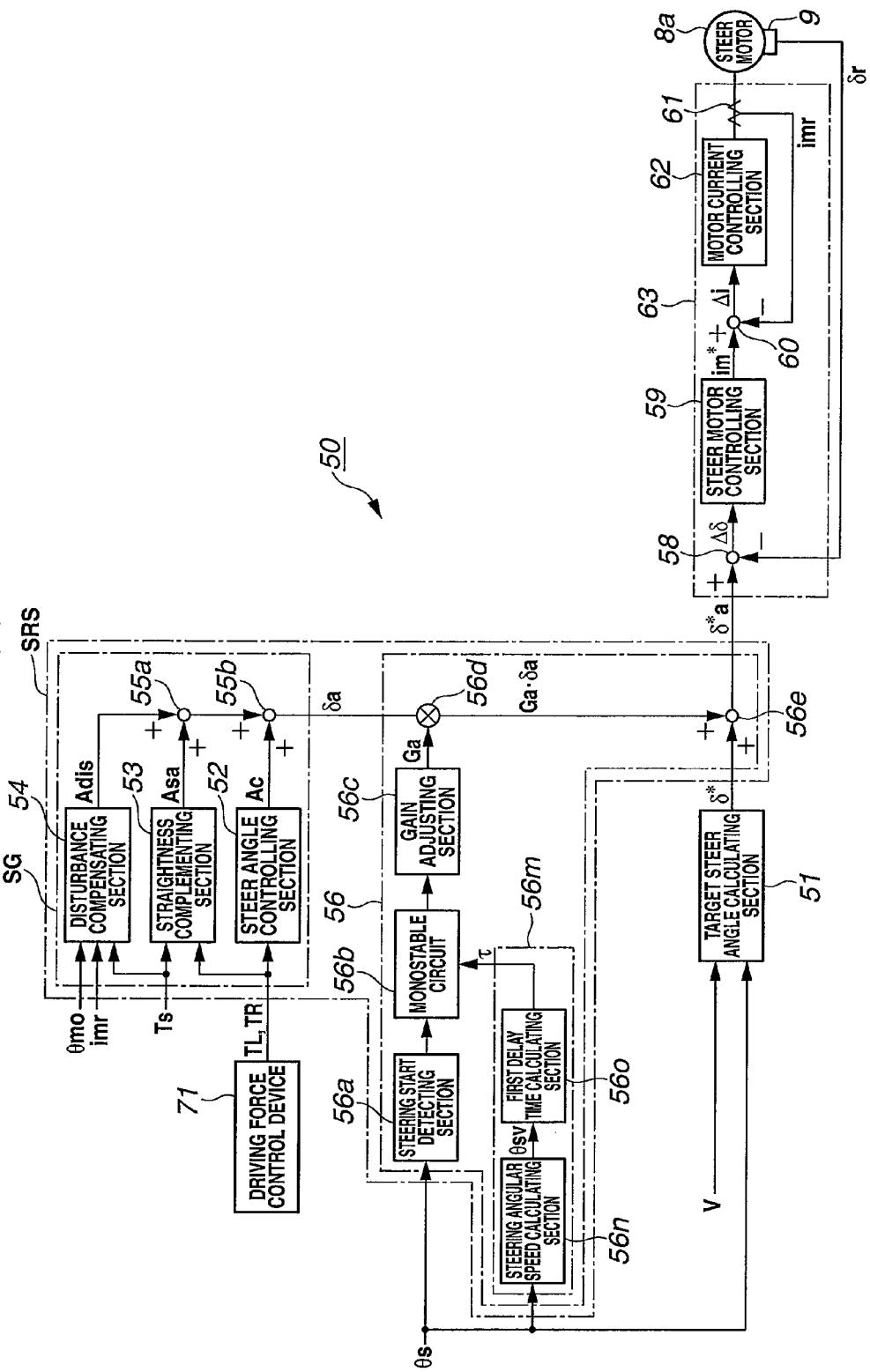
FIG. 55 is a block diagram of a steer control section for showing a variation example of the seventh embodiment.

In the example of the seventh embodiment, the delay time calculating section 56*m* calculates delay time τ for starting the straightness securing control, from both the steering speed θsv and vehicle speed V. However, the present invention is not limited to this configuration. As shown in FIG. 55, it is optional to omit the second delay time calculating section 56*p* and adder 56*q*, and to set the delay time τ only by first delay time calculating section 56*o* setting first delay time τ1 from steering speed θsv.
(Effect)
In this case, the control system can set an optimum steer response characteristic in accordance with the steering speed θsv without regard to vehicle speed V.

Application Example 2 of Seventh Embodiment

Figure 56:
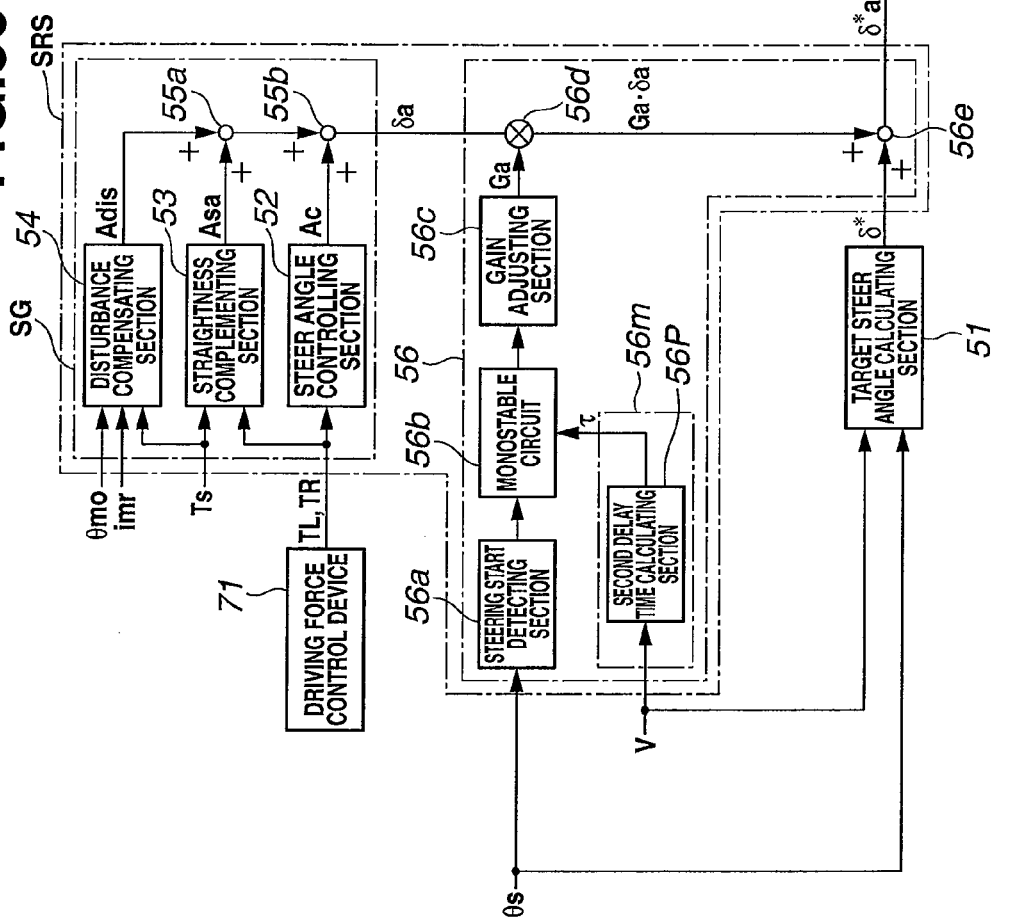
FIG. 56 is a block diagram of the steer control section for showing another variation example of the seventh embodiment.

Moreover, as shown in FIG. 56, it is optional to configure the delay time calculating section 56*m* by omitting the first delay time calculating section 56*o* and adder 56*q*, and to set the delay time τ only by second delay time calculating section 56*p* setting second delay time τ2 from vehicle speed V.
(Effect)
In this case, the control system can set an optimum steer response characteristic in accordance with vehicle speed V without regard to steering speed θsv.

Application Example 3 of Seventh Embodiment

Figure 57:
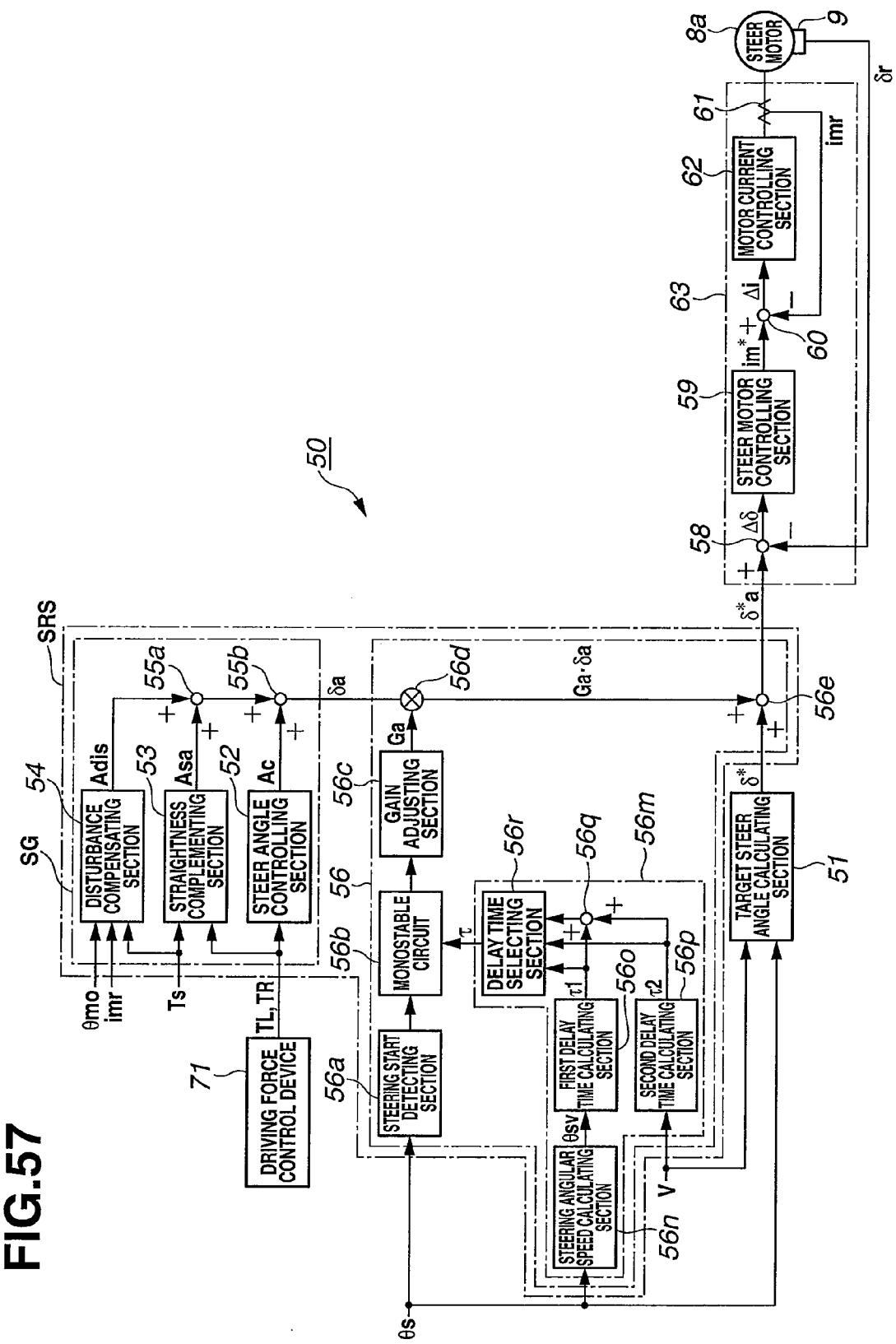
FIG. 57 is a block diagram of a steer control section for showing still another variation example of the seventh embodiment.

Moreover, as shown in FIG. 57, it is optional to configure the delay time calculating section 56*m* by providing a delay time selecting section 56*r* selecting one of the delay times of the first delay time calculating section 56*o*, second delay time calculating section 56*p* and adder 56*q*.
(Effect)
In this case, the control system can select the delay time in accordance with preference of the driver with delay time selecting section 56*r*.

Variation Example of Seventh Embodiment

In the example of the seventh embodiment, the adder 56*q* calculates the delay time τ by adding the first and second delay times τ1 and τ2. However, the invention is not limited to this configuration. It is optional to calculate the delay time τ by multiplication of the first and second delay times τ1 and τ2. In this case, it is possible to setting the second delay time calculated in dependence on vehicle speed V, as a delay gain, and to set the delay gain within a range of 0.7~1.0 in accordance with vehicle speed V.

Variation Example of First, Sixth and Seventh Embodiments

Figure 58:
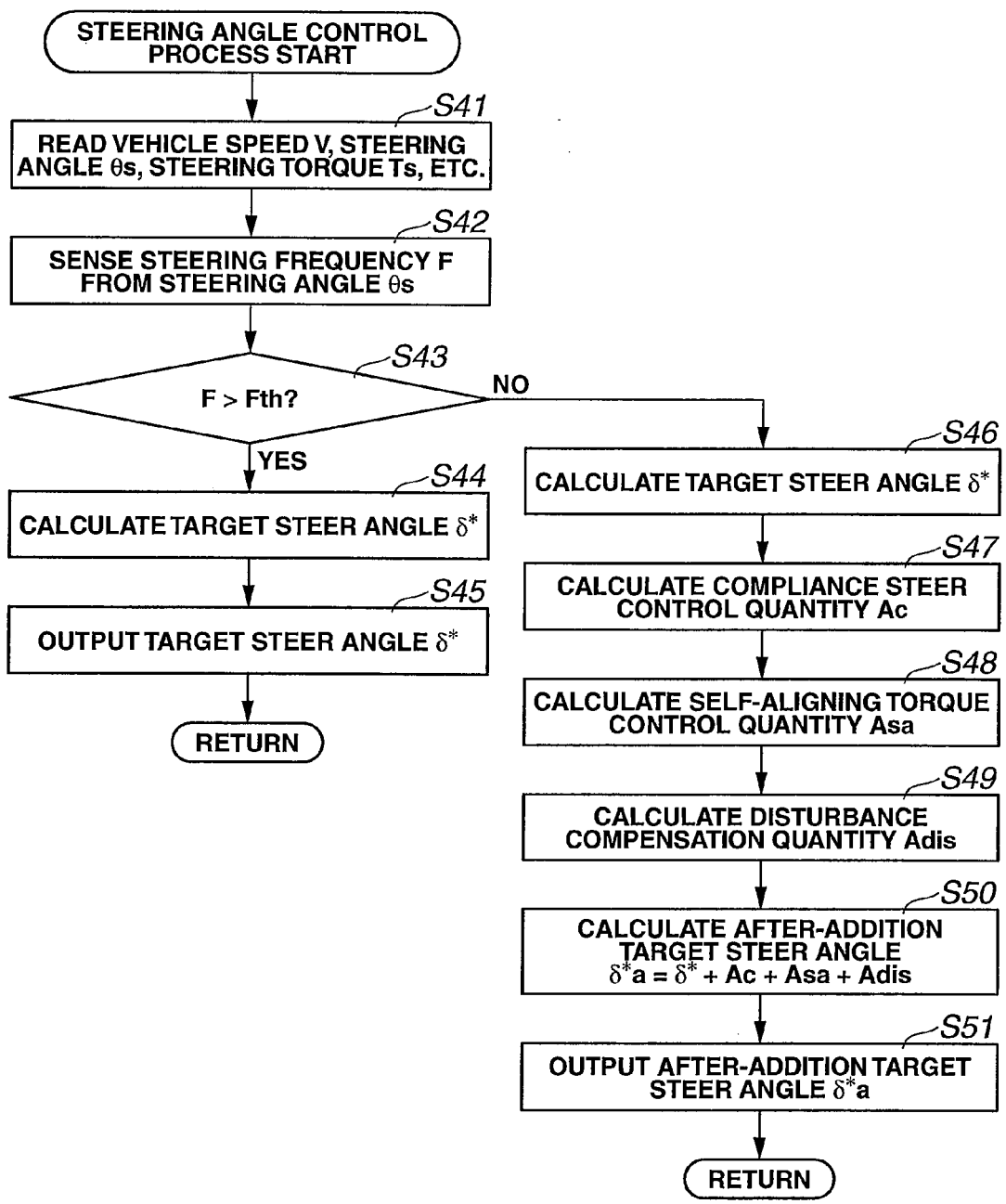
FIG. 58 is a flowchart showing one example of a steer response characteristic adjusting process in the steer control section showing a variation example of the first, sixth and seventh embodiments.

In the examples explained in the first, sixth and seventh embodiments, the straightness securing control for adding the straightness securing control quantity δa to target steer angle δ* is stopped at the time of a start of a left or right steering operation from the state holding the neutral position of steering wheel 2. However, the present invention is not limited to this configuration. As shown in FIG. 58, it is optional to perform a steer responsiveness adjusting process for adjusting the steer responsiveness by using a steering frequency for determining whether or not to perform the straightness securing control to add the control quantity to the target steer angle δ*.

FIG. 58 shows this steer responsiveness adjusting process. At a step S41, the processing device reads data required for the calculating process, such as the vehicle speed V, steering angle θs, rotation angle θmo, and left and right wheel driving forces TL and TR. Then, the processing device proceeds to a step S42, and senses the steering frequency F by using the steering angle θs outputted from steering angle sensor 4. Then, at a step S43, the processing device determines whether the sensed steering frequency F is higher than a predetermined frequency threshold Fth (2 Hz, for example), or not.

When the conclusion of step S43 is that F≥Fth, the processing devices judges that a high steer responsiveness is required, and proceeds to a step S44. At S44, the processing device calculates the target steer angle δ*, and then proceeds to a step S45. At S45, the processing device outputs the calculated target steer angle δ* to the before-mentioned steer angle deviation calculating section 58 shown in FIG. 17, and then returns to step S41.

When the conclusion of step S43 is that F<Fth, the processing devices judges that the high steer responsiveness is not required, and the steering stability is required, and proceeds to a step S46. At S46, the processing device calculates the target steer angle δ*, and then proceeds to a step S47. The processing device calculates the compliance steer control quantity Ac at S47, and then calculates the self-aligning torque control quantity Asc at a next step S48.

Then, at a step S49, the processing device calculates the disturbance compensating quantity Adis. Then, the processing device calculates the after-addition target steer angle δ*a at S50, by adding the calculated target steer angle δ*, compliance steer control quantity Ac, self-aligning torque control quantity Asa and disturbance compensating quantity Adis. Then, at a step S51, the processing device outputs the after-addition target steer angle δa* to the steer angle deviation calculating section 58 shown in FIG. 17, and then returns to step S41.
(Effects)
In this steer responsiveness adjusting process, when the steering frequency F of steering wheel 2 is lower than the frequency threshold value Fth, the control system can judge that the steering stability is required instead of the high responsiveness, perform the steer control by using the after-addition target steer angle δ*a resulting from addition of the straightness securing control quantity δa to target steer angle δ*, and thereby control the steer angle satisfactorily. When steering frequency F is higher than steering frequency threshold Fth, the control system can judge that the high responsiveness is required, and performs the steer control with the steer responsiveness of the suspension apparatus 1B per se.

In this example, the control system examines the steering frequency and thereby determines whether or not to modify the target steer angle δ*. Therefore, the control system can set the steering response at an optimum characteristic suitable for the steering condition. In this case, when F<Fth, by multiplication of a gain set between 0~1 in accordance with the steering frequency F, to the straightness securing control quantity δa, the control system can vary the degree of the correction of the straightness, and control the responsiveness finely.

The present invention is applicable not only to motor vehicles, but also to other vehicles having steer apparatus.

EXPLANATION OF REFERENCE NUMERAL

1 . . . motor vehicle, 1A . . . vehicle body, 1B . . . suspension apparatus, 2 . . . steering wheel, 3 . . . input side steering shaft, 4 . . . steering angle sensor, 5 . . . steering torque sensor, 6 . . . steering reaction actuator, 7 . . . steering reaction actuator angle sensor, 8 . . . steer actuator, 9 . . . steer actuator angle sensor, 10 . . . output side steering shaft, 11 . . . steer torque sensor, 12 . . . pinion gear, 13 . . . pinion angle sensor, 14 . . . rack shaft (steering rack), 15 . . . tie rod(s), 17FR, 17FL, 17RR, 17RL . . . wheels, 21 . . . vehicle parameter obtaining section, 24FR, 24FL, 24RR, 24RL . . . wheel speed sensors, 26 . . . drive circuit, 27 . . . mechanical backup, 32 . . . axle, 33 . . . axle carrier, 34 . . . spring member, 37 . . . first link (first link member), 38 . . . second link (second link member), 40 . . . shock absorber, 137 . . . transverse link (first link member, transverse link member), 138 . . . compression link (second link member, compression link member), 237 . . . transverse link (first link member, transverse link member), 238 . . . tension link (second link member, tension link member), 337 . . . transverse link (first link member, transverse link member), 338 . . . compression link (second link member, compression link member), 437 . . . transverse link (first link member, transverse link member), 438 . . . tension link (second link member, tension link member), 50 . . . steer control section, 51 . . . target steer angle calculating section, 52 . . . steer angle control section, 53 . . . straightness complementing section, 54 . . . disturbance compensating section, 55 . . . adder, 56 . . . delay control section, 56a . . . steering start detecting section, 56b . . . mono stable circuit, 56c . . . gain adjusting section, 56d . . . multiplier, 56e . . . adder, 56g . . . selecting section, 56h . . . gain adjusting section, 56m . . . delay time calculating section, 56n . . . steering angular speed calculating section, 56o . . . first delay time calculating section, 56p . . . second delay time calculating section, 56q . . . adder, 56r . . . delay time selecting section, 57 . . . adder, 58 . . . steer angle deviation calculating section, 59 . . . steer motor control section, 60 . . . current deviation calculating section, 61 . . . motor current sensing section, 62 . . . motor current control section, 63 . . . actuator control section, 111 . . . straightness securing section.

The invention claimed is:

1. A motor vehicle comprising:
a steer control apparatus to steer a steerable wheel by actuating an actuator in accordance with a steering condition of a steering wheel; and
a suspension apparatus to support the steerable wheel to a vehicle body;
wherein the suspension apparatus comprises:
a wheel hub mechanism to support the steerable wheel to be provided with a tire;
a first link member connecting the wheel hub mechanism and the vehicle body on a lower side of an axle in a vehicle up and down direction; and
a second link member connecting the wheel hub mechanism and the vehicle body on the lower side of the axle in the vehicle up and down direction and intersecting the first link member in a vehicle top view;
wherein the steer control apparatus comprises a straightness securing section to secure a straightness of the suspension apparatus, and a steer response setting section to set an early steer response characteristic at a steer response characteristic of the suspension apparatus by adjusting a straightness securing control of the straightness securing section when a steering operation of turning the steering wheel is started from a neutral position of the steering wheel,
wherein the steer response setting section comprises a delay control section to delay the straightness securing control of the straightness securing section when the steering wheel is turned from the neutral position.

2. A motor vehicle comprising:
a steer control apparatus to steer a steerable wheel by actuating an actuator in accordance with a steering condition of a steering wheel; and
a suspension apparatus to support the steerable wheel to a vehicle body;
wherein the suspension apparatus comprises:
a wheel hub mechanism to support the steerable wheel to be provided with a tire;
a first link member connecting the wheel hub mechanism and the vehicle body on a lower side of an axle in a vehicle up and down direction; and
a second link member connecting the wheel hub mechanism and the vehicle body on the lower side of the axle in the vehicle up and down direction and intersecting the first link member in a vehicle top view;
wherein the steer control apparatus comprises a straightness securing section to secure a straightness of the suspension apparatus, and a steer response setting section to set a high steer responsiveness with a steer responsiveness of the suspension apparatus in an early steer state when a steering operation of turning the steering wheel is started from a neutral position of the steering wheel, and to set a required steer responsiveness by a straightness securing control of the straightness securing section in a steer state after the early steer state,
wherein the steer response setting section comprises a delay control section to delay the straightness securing control of the straightness securing section when the steering wheel is turned from the neutral position.

3. A steer control method for a steerable wheel, comprising:
steering the steerable wheel supported by a suspension apparatus comprising: a wheel hub mechanism to support a tire wheel to be provided with the steerable wheel; a first link member connecting the wheel hub mechanism and a vehicle body of a vehicle on a lower side of an axle in a vehicle up and down direction; and a second link member connecting the wheel hub mechanism and the vehicle body on the lower side of the axle in the vehicle up and down direction and intersecting the first link member in a vehicle top view; wherein a kingpin axis of the suspension apparatus is set to pass through a tire ground contact surface at a neutral position of the steering wheel;
actuating an actuator in accordance with a steering condition of a steering wheel in a basic control mode to make use of a steer responsiveness set by intersecting arrangement of the first and second link members and setting of the kingpin axis; and
performing a straightness securing control to restrain the steer responsiveness and to secure a straightness of the vehicle by imparting a restoring force for self-aligning to the steerable wheel by actuating the actuator, wherein the straightness securing control is delayed when the steering wheel is turned from the neutral position.

4. The steer control method as recited in claim 3, wherein the control to secure the straightness of the vehicle is performed by calculating a self-aligning torque and imparting, to the steerable wheel, the calculated self-aligning torque.

5. A steer control method for a steerable wheel, comprising:
sensing a variation of a steering angle in a steering operation turning a steering wheel, and controlling, in accordance with a sensing result, a steer actuator for steering the steerable wheel supported by a suspension apparatus comprising: a wheel hub mechanism to support a tire wheel to be provided with the steerable wheel; a first link member connecting the wheel hub mechanism and a vehicle body of a vehicle on a lower side of an axle in a vehicle up and down direction; and a second link member connecting the wheel hub mechanism and the vehicle body on the lower side of the axle in the vehicle up and down direction and intersecting the first link member in a vehicle top view; wherein a kingpin axis passing through an upper pivot point and a lower pivot point of the link members is set to pass through a tire ground contact surface at a neutral position of the steering wheel;
performing a control to secure a straightness of the vehicle by imparting a restoring force for self-aligning to the steerable wheel by actuating the actuator; and
setting a steer responsiveness set by intersecting arrangement of the first and second link members and setting of the kingpin axis of the suspension apparatus as an initial steer responsiveness at an early steer stage when the steering operation of turning the steering wheel is started from the neutral position of the steering wheel, and starting the control to secure the straightness of the vehicle with the steer actuator after an expiration of an initial set time period, wherein the straightness securing control is delayed when the steering wheel is turned from the neutral position.

6. The steer control method as recited in claim 4, wherein the initial set time period is set equal to 0.1 sec.

7. A motor vehicle comprising:
a steer control apparatus to steer a steerable wheel by actuating an actuator in accordance with a steering condition of a steering wheel; and
a suspension apparatus to support the steerable wheel to a vehicle body;
wherein the suspension apparatus comprises:
a wheel hub mechanism to support the steerable wheel to be provided with a tire;
a first link member connecting the wheel hub mechanism and the vehicle body on a lower side of an axle in a vehicle up and down direction; and
a second link member connecting the wheel hub mechanism and the vehicle body on the lower side of the axle in the vehicle up and down direction and intersecting the first link member in a vehicle top view;
wherein a kingpin axis passing through an upper pivot point of the suspension apparatus and a lower pivot point located at an intersection point of the first link member and the second link member is set to pass through a tire ground contact surface at a neutral position of the steering wheel; and wherein the steer control apparatus is configured to steer the steerable wheel by producing a restoring force for self-aligning in the steerable wheel by actuating the actuator and thereby to secure a straightness of the vehicle,
wherein the steer control apparatus comprises a straightness securing section to secure a straightness of the suspension apparatus, and a steer response setting section to set an early steer response characteristic at a steer response characteristic of the suspension apparatus by adjusting a straightness securing control of the straightness securing section when a steering operation of turning the steering wheel is started from the neutral position of the steering wheel,
wherein the steer response setting section comprises a delay control section to delay the straightness securing control of the straightness securing section when the steering wheel is turned from the neutral position.

8. The motor vehicle as recited in claim 7, wherein the steer response setting section is configured to set a high steer responsiveness with a steer responsiveness of the suspension apparatus in an early steer state when a steering operation of turning the steering wheel is started from the neutral position of the steering wheel, and to set a required steer responsiveness by a straightness securing control of the straightness securing section in a steer state after the early steer state.

9. The motor vehicle as recited in claim 7, wherein the steer control apparatus is configured to secure the straightness of the vehicle by calculating a self-aligning torque.

10. The motor vehicle as recited in claim 7, wherein the steer control apparatus is a steer-by-wire system sensing a variation of a steering angle in an operation of turning the steering wheel which is connected with an input-side steering shaft, and including the actuator which is a steer actuator arranged to rotate an output-side steering shaft which is not directly connected with the input-side steering shaft to steer the steerable wheel through the output-side steering shaft in accordance with a sensing result and an actuator control device to control the steer actuator.

11. The motor vehicle as recited in claim 7, wherein the first link member and the second link member are independent link members connected independently with the vehicle body at vehicle body's side connecting positions, respectively, and connected independently with the wheel hub mechanism at wheel's side connecting positions, respectively, and the vehicle body's side connecting positions of the first and second link members are placed on a rear side of the axle in a vehicle front and rear direction in the vehicle top view.

12. The motor vehicle as recited in claim 7, wherein the first link member and the second link member are independent link members connected independently with the vehicle body at vehicle body's side connecting positions, respectively, and connected independently with the wheel hub mechanism at wheel's side connecting positions, respectively, and the vehicle body's side connecting positions of the first and second link members are placed on a front side of the axle in a vehicle front and rear direction in the vehicle top view.

13. The motor vehicle as recited in claim 7, wherein a steering rack to steer the wheel hub mechanism by moving in a vehicle widthwise direction is disposed on a front side of the axle in the vehicle front and rear direction.

14. The motor vehicle as recited in claim 7, wherein a steering rack to steer the wheel hub mechanism by moving in a vehicle widthwise direction is disposed on a rear side of the axle in a vehicle front and rear direction.

15. The motor vehicle as recited in claim 7, wherein a suspension geometry determined by the kingpin is set to have a positive scrub.

16. The motor vehicle as recited in claim 7, wherein the first link member is a transverse link member, and the second link member is a compression link member.

17. The motor vehicle as recited in claim 16, wherein a connect portion of the compression link member with the vehicle body is located on a rear side of a connect portion of the transverse link member with the vehicle body in a vehicle front and rear direction, and a connect portion of the compression link member with the wheel hub mechanism is located on a front side of a connect portion of the transverse link member with the wheel hub mechanism in the vehicle front and rear direction.

18. The motor vehicle as recited in claim 17, wherein the connect portion between the transverse link member and the wheel hub mechanism is located on a rear side of the axle in the vehicle front and rear direction, and the connect portion between the transverse link member and the vehicle body is located on a front side of the axle in the vehicle front and rear direction.

19. The motor vehicle as recited in claim 17, wherein the connect portion between the transverse link member and the vehicle body is located on a rear side of the connect portion between the compression link member and the wheel hub mechanism in the vehicle front and rear direction.

20. The motor vehicle as recited in claim 17, wherein the connect portion between the compression link member and the wheel hub mechanism is located on a front side of the axle in the vehicle front and rear direction, and the connect portion between the compression link member and the vehicle body is located on a rear side of the connect portion between the transverse link member and the wheel hub mechanism in the vehicle front and rear direction.

21. The motor vehicle as recited in claim 17, wherein the vehicle suspension apparatus further comprises a tie rod member which is connected with the wheel hub mechanism at a connect position on an outboard side of the connect portions of the transverse link member and the compression link member in a vehicle widthwise direction, and which the tie rod member is connected with the vehicle body at a connect position on a rear side of the connect position with the wheel hub mechanism, and which is arranged to steer the steerable wheel.

22. The motor vehicle as recited in claim 7, wherein the first link member is a transverse link member, and the second link member is a tension link member.

23. The motor vehicle as recited in claim 22, wherein a connect portion of the tension link member with the vehicle body is located on a front side of a connect portion of the transverse link member with the vehicle body in a vehicle front and rear direction, and a connect portion of the tension link member with the wheel hub mechanism is located on the rear side of a connect portion of the transverse link member with the wheel hub mechanism in the vehicle front and rear direction.

24. The motor vehicle as recited in claim 23, wherein the connect portion between the transverse link member and the wheel hub mechanism is located on a front side of the axle in the vehicle front and rear direction, and the connect portion between the transverse link member and the vehicle body is located on a rear side of the axle in the vehicle front and rear direction.

25. The motor vehicle as recited in claim 23, wherein the connect portion between the transverse link member and the vehicle body is located on a front side of the connect portion between the tension link member and the wheel hub mechanism in the vehicle front and rear direction.

26. The motor vehicle as recited in claim 23, wherein the connect portion between the tension link member and the wheel hub mechanism is located on a rear side of the axle in the vehicle front and rear direction, and the connect portion between the tension link member and the vehicle body is located on a front side of the connect portion between the transverse link member and the wheel hub mechanism in the vehicle front and rear direction.

27. The motor vehicle as recited in claim 23, wherein the vehicle suspension apparatus further comprises a tie rod member which is connected with the wheel hub mechanism at a connect position on an outboard side of the connect portions of the transverse link member and the tension link member in a vehicle widthwise direction, and which the tie rod member is connected with the vehicle body at a connect position on a rear side of the connect position with the wheel hub mechanism, and which is arranged to steer the steerable wheel.

28. The motor vehicle as recited in claim 7, wherein the steer control apparatus comprises a steer angle control section to estimate a compliance steer and to correct a displacement of the steerable wheel.

29. The motor vehicle as recited in claim 7, wherein the delay control section comprises a gain adjusting section to adjust a start of the straightness securing control by the straightness securing section.

30. The motor vehicle as recited in claim 7, wherein the delay control section is configured to delay the straightness securing control of the straightness securing section, and to start the straightness securing control after a delay of 0.1 sec from a steering start timing of a steering operation of turning the steering wheel right or left from a state holding the neutral state.

31. The motor vehicle as recited in claim 7, wherein the delay control section starts the straightness securing control of the straightness securing section in a manner like a step.

32. The motor vehicle as recited in claim 7, wherein the delay control section starts the straightness securing control of the straightness securing section gradually.

33. The motor vehicle as recited in claim 7, wherein the delay control section comprises at least one of a first delay time calculating section to calculate a first delay time in accordance with a steering angular speed obtained by differentiating the steering angle sensed by a steering angle sensor, and a second delay time calculating section to calculate a second delay time in accordance with a vehicle speed.

34. The motor vehicle as recited in claim 33, wherein the first delay time calculating section has a first delay time calculation map representing a relationship between the steering angular speed and the first delay time, and calculates the first delay time from the steering angular speed by referring to the first delay time calculation map.

35. The motor vehicle as recited in claim 33, wherein the second delay time calculating section has a second delay time calculation map representing a relationship between the vehicle speed and the second delay time, and calculates the second delay time from the vehicle speed by referring to the second delay time calculation map.

36. The motor vehicle as recited in claim 7, wherein the delay control section comprises a first delay time calculating section to calculate a first delay time in accordance with a steering angular speed obtained by differentiating the steering angle, a second delay time calculating section to calculate a second delay time in accordance with a vehicle speed, and an adding section to calculate the delay time by adding the first and second delay times.

37. The motor vehicle as recited in claim 7, wherein the steer control apparatus comprises:
- a target steer angle calculating section to calculate a target steer angle in accordance with a steering angle;
- an adder to add, to the target steer angle calculated by the target steer angle calculating section, a straightness securing control quantity of the straightness securing section;
- a steer motor control section to produce a motor command current to make a rotation angle of a steer motor forming the steer actuator equal to an addition output of the adder; and
- a current control section to produce a motor drive current to be supplied to the steer motor so that the motor drive current becomes equal to the motor command current.

38. The motor vehicle as recited in claim 7, wherein each of the first and second link members is in a form of an I arm independent from each other, and the second link member intersects the first link member to set the lower pivot point at the intersection point between the first and second link members, each of the first link member and the second link member extending from an inboard end to an outboard end, the inboard ends of the first and second link members being connected independently with the vehicle body through first and second inboard connecting portions independent from each other, and the outboard ends of the first and second link members being connected independently with the wheel hub mechanism through first and second outboard connecting portions independent from each other.

39. The motor vehicle as recited in claim 7, wherein the motor vehicle further comprises a tie rod for steering the steerable wheel, and the first and second link members are provided apart from the tie rod, and wherein the steer control apparatus is a steer-by-wire system to steer the steerable wheel with the actuator in a state having no mechanical connection between the steering wheel and the steerable wheel.

\* \* \* \* \*